United States Patent [19]

Fujita et al.

[11] Patent Number: 4,994,990
[45] Date of Patent: Feb. 19, 1991

[54] MICRO-DIMENSIONAL MEASUREMENT APPARATUS

[75] Inventors: Hiroo Fujita, Sayama; Kazuo Takahashi, Komoro, both of Japan

[73] Assignee: Citizen Watch Co., Ltd., Tokyo, Japan

[21] Appl. No.: 436,923

[22] Filed: Nov. 6, 1989

Related U.S. Application Data

[63] Continuation of Ser. No. 151,699, Feb. 2, 1988, abandoned.

[30] Foreign Application Priority Data

Feb. 3, 1987 [JP] Japan .................................. 62-22982
Mar. 6, 1987 [JP] Japan .................................. 62-51617
Apr. 7, 1987 [JP] Japan .................................. 62-85545

[51] Int. Cl.$^5$ ...................... G01B 11/02; G01B 11/00
[52] U.S. Cl. .................................... 364/561; 364/560; 250/560; 356/398; 356/394

[58] Field of Search .................... 364/550, 551.01, 560, 364/561; 250/563, 560, 561; 356/384, 387, 359, 360, 398, 394

[56] References Cited

U.S. PATENT DOCUMENTS

| | | | |
|---|---|---|---|
| 3,373,380 | 3/1968 | Adler | 350/358 |
| 3,644,742 | 2/1972 | Brienza | 350/358 |
| 4,499,383 | 2/1985 | Loose | 356/384 |
| 4,650,330 | 3/1987 | Fujita | 356/349 |
| 4,679,941 | 7/1987 | Fujita | 356/384 |

*Primary Examiner*—Parshotam S. Lall
*Assistant Examiner*—V. N. Trans
*Attorney, Agent, or Firm*—Finnegan, Henderson, Farabow, Garrett and Dunner

[57] ABSTRACT

In micro-dimensional measurement apparatus including an optical scanning system and a processor for optical data obtained therefrom the measurement is based upon a comparison of previously prepared reference data and optical data from an object to be measured, and features use of a twin laser beam in the scanning operation.

70 Claims, 40 Drawing Sheets

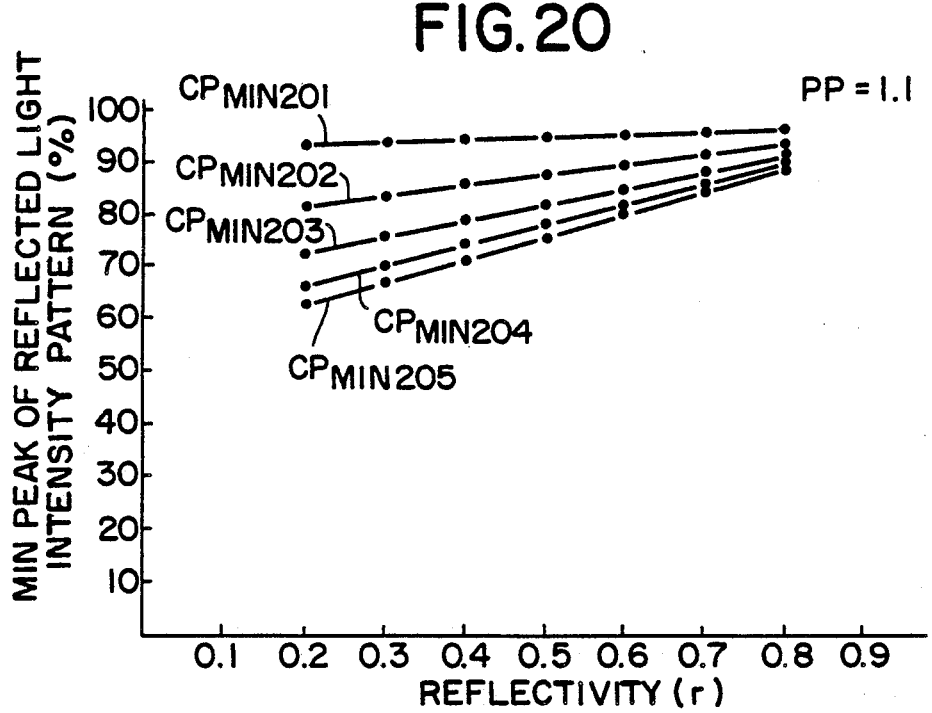
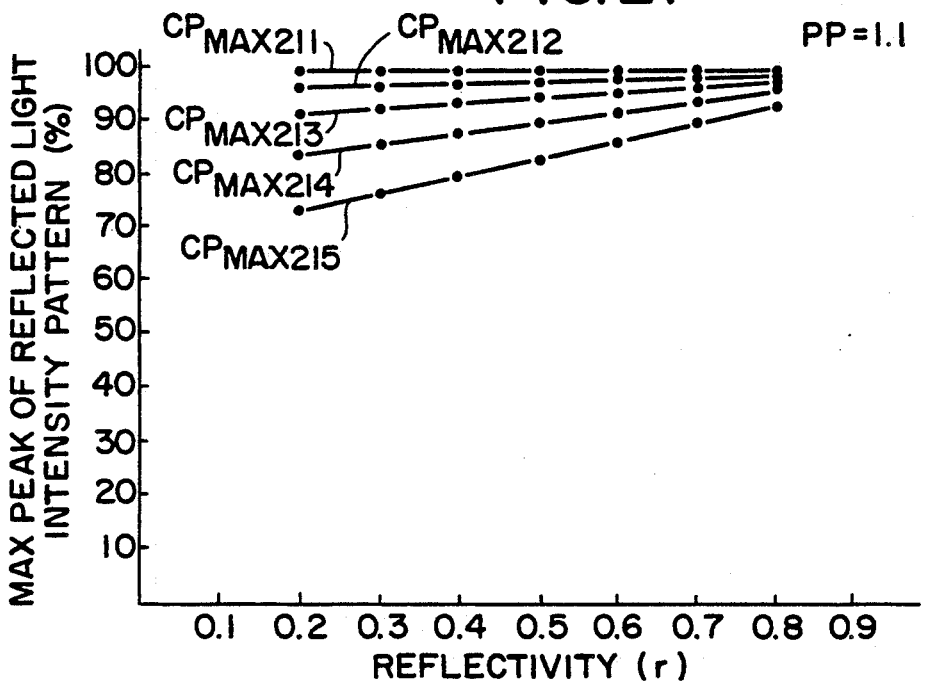

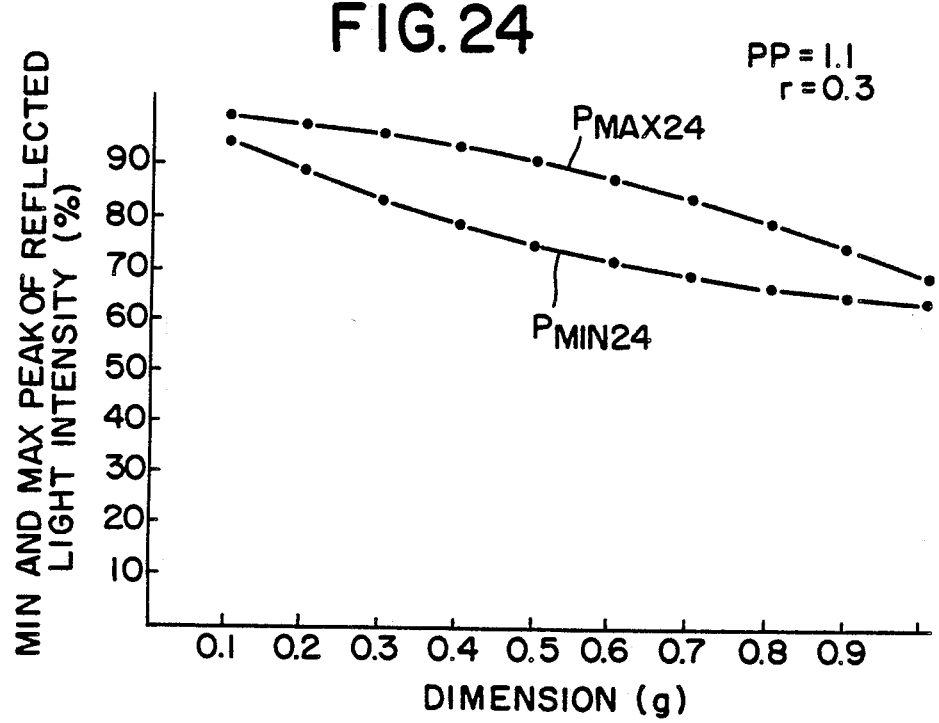
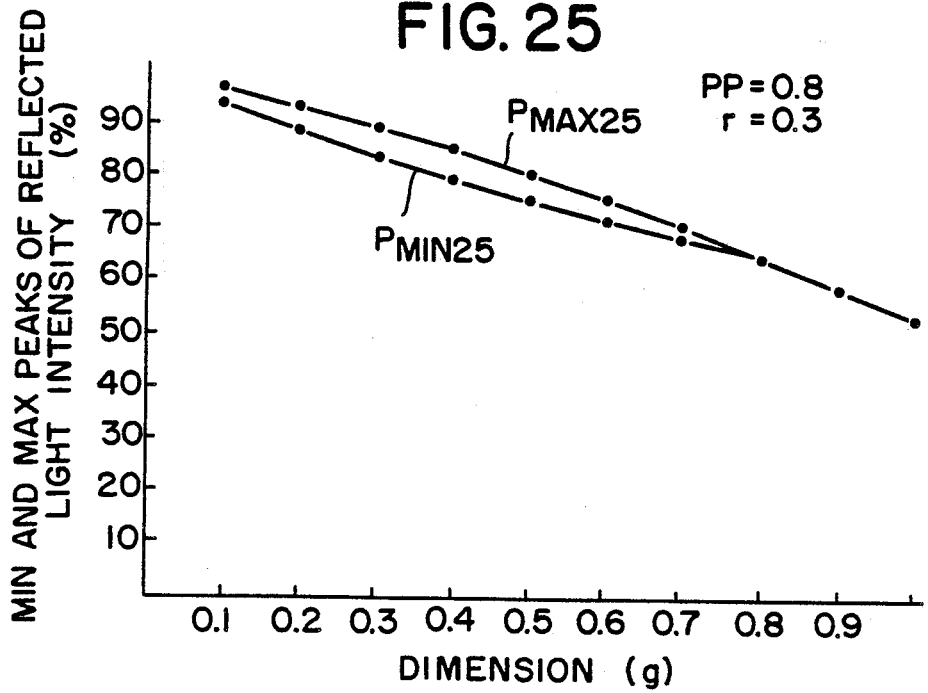

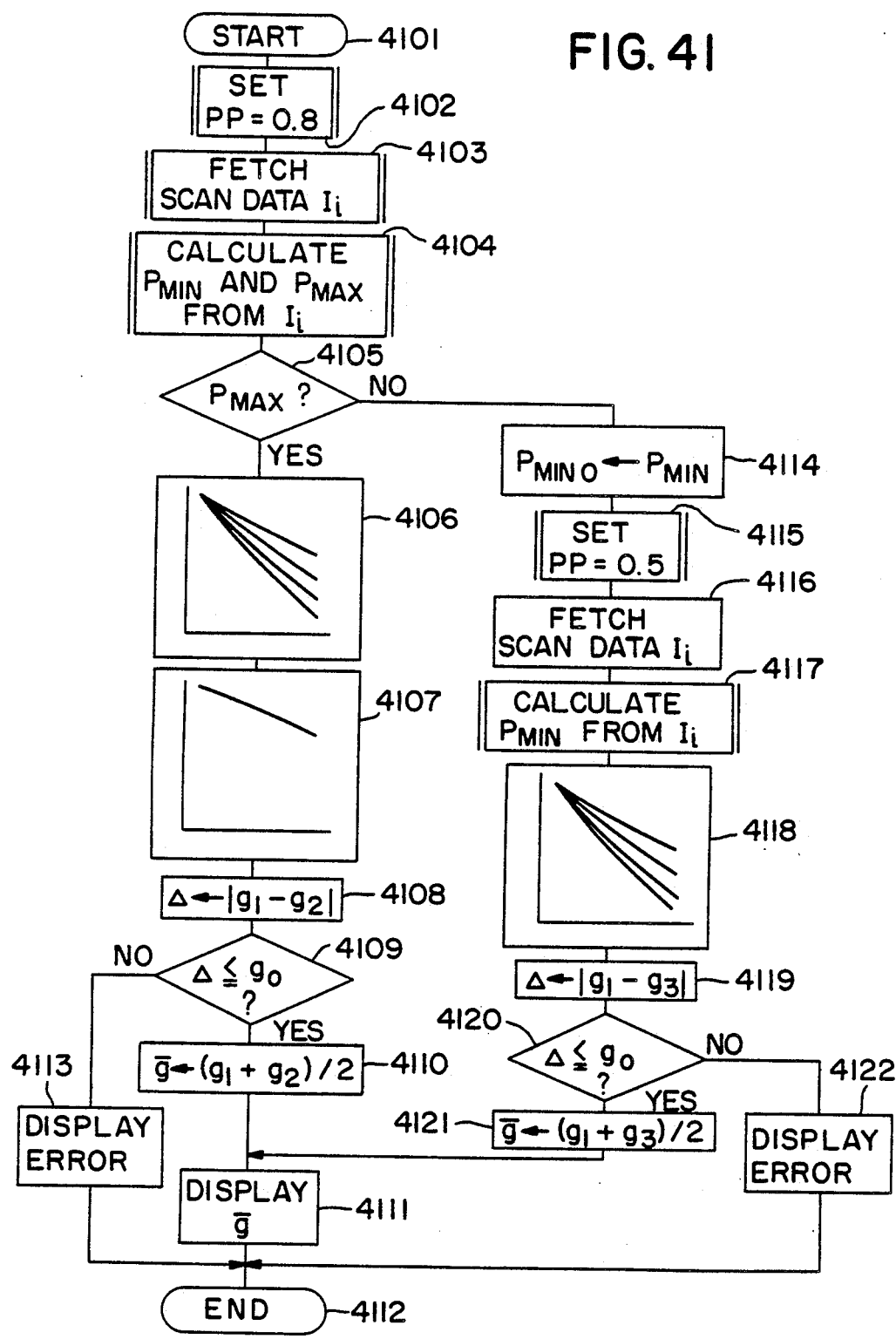

ELECTRON MICROSCOPE

MICRO-DIMENSIONAL MEASUREMENT APPARATUS

This application is a continuation of application Ser. No. 07/151,699, filed Feb. 2, 1988, now abandoned.

BACKGROUND OF THE INVENTION (1) Field of the Invention

The present invention relates to a micro-dimensional apparatus for optically measuring a dimension between opposed edges formed on a substrate, with a zone between the opposed edges and a surface of the substrate having a uniform reflectivity, the reflectivity of the zone between the opposed edges being different from that of the surface of the substrate, and more particularly, to such a micro-dimensional measurement apparatus wherein the measurement is carried out by scanning substrate with a light beam having a predetermined light intensity distribution, such as a Gaussian distribution (2) Description of the Related Art Developments in precision manufacturing now demand a very high accuracy in the working of various precision components. For example, in the manufacturing of a precision component such as an integrated circuit, a magnetic head or the like, the working accuracy must be on the order of less than 1 $\mu$m. Accordingly, there is a pressing need for a micro-dimensional measurement apparatus by which a fine precision component can be dimensionally measured with a high accuracy and reliability.

In this field, it is well known to measure the dimension of a fine object by an optical measurement system with includes a white light source for illuminating the fine object, a microscope for magnifying an image of the illuminated fine object, a television camera for reading optical information as video data from the magnified image, and a processor for processing the video data to calculate a dimension of the fine object.

For example, where the width of a fine gap formed between magnetic portions of a magnetic head is measured by an optical measurement system, the area of the magnetic head which includes the fine gap to be measured is magnified by the microscope under the illumination of the white light source, and optical information is then read by the television camera as a series of video data from the magnified image. The series of video data is processed by the processor so that a light intensity pattern of the light reflected from the measured area is prepared with respect to a series of addresses of picture elements read by an image sensor of the television camera. In other words, the reflected light intensity pattern so obtained can be considered to be a function of a distance measured along a line which crosses the fine gap at the measured area. Since the gap zone of the magnetic head has a lower reflectivity than that of the magnetic portions thereof, the reflected light intensity pattern has a minimum peak which corresponds to a middle point between the gap edges. In particular, the reflected light intensity pattern shows a profile of a curve descending gradually toward the minimum peak and then ascending gradually therefrom.

In this prior optical measurement system, in order to measure a width of the gap zone, a slice pitch obtained by slicing the reflected light intensity pattern at a predetermined slice level is calculated by the processor. This slice pitch corresponds to the number of picture elements read by the television camera at the gap zone along the line crossing the measured area. Accordingly, if some reference slice pitch data obtained from known widths of sample gap dimensions in the same manner as mentioned above are previously prepared, it is possible to calculate a width of the gap zone from the measured slice pitch on the basis of the reference slice pitch data.

Nevertheless, the optical measurement system as mentioned above suffers from drawbacks brought by the use of the white light source. In particular, it is impossible to carry out the measurement with a high accuracy and reliability because it is difficult to stabilize an intensity distribution of the white light source with the passage of time. Also, when a fine dimension on the order of less than 1 $\mu$m is measured, the accuracy of the measurement is not satisfactory because it is very difficult to obtain a fine spot for the illumination from the white light source, so that the light picked up from the fine gap zone is affected by the light reflected from the zone other the measured area.

British Patent No. 2147097 discloses another type of optical measurement system for dimensionally measuring a fine object, which system includes a laser light source for emitting a laser beam having a Gaussian distribution, an acoustic-optical device for a stepped deflection of the laser beam, to scan the fine object to be measured with the laser beam, a detector for detecting the laser beam reflected from the fine object, and a processor for processing the reflection data obtained from the detector to calculate a dimension of the fine object.

This prior optical measurement system is directed to measuring a dimension between opposed edges formed on a substrate by scanning the substrate with a laser beam under the condition that, when the laser beam is projected on an edge line of the opposed edges, a portion of the projected laser beam at one side of the edge line is detected by the detector, but the other portion thereof at the other side of the edge line is not detected by the detector. For example, if an element having a trapezoid cross-section (i.e. an IC conductor element) is provided on the substrate, it is possible to measure a dimension between opposed edges of such an element by this prior optical measurement system, because these edges satisfy the condition mentioned above, in that when the laser beam is projected, the part of the laser beam impinging on an oblique face extending from each of the edge lines toward the substrate surface is not detected by the detector.

In this measurement, a substrate having the element as mentioned above is step-scanned while the laser beam is controlled by the acoustic-optical device, so that the laser beam crosses each of the edge lines of the element. The laser beams reflected from the substrate at the scanning steps are detected by the detector as a series of reflection data, and the processor prepares a reflected light intensity pattern on the basis of the series of reflection data with respect to a series of deflection voltage values, each of which is applied to the acoustic-optical device to deflect the laser beam at each of the scanning steps. Also, the processor arithmetically processes the reflected light intensity pattern to determine two positions of the edges of the element. In other words, two deflection voltage values corresponding to the two positions of the element edges are determined by the processor. Accordingly, it is possible to calculate a dimension between the element edges from a difference of voltage between the two deflection voltages, which corresponds to a distance of deflection between the two positions of the element edges.

The optical measurement system as disclosed in the above-mentioned British patent is directed to the measurement of a dimension of a fine object which is larger than a spot diameter of the laser beam, which can generally be reduced to the order of 1 μm, and accordingly, the measurement of such a fine object can be satisfactorily carried out with a high accuracy and reliability. But when a dimension to be measured between edges of the fine object is less than 1 μm, the accuracy and reliability of the measurement is considerably reduced.

The pending U.S. Pat. No. 014619, filed by the same applicant, discloses two types of micro-dimensional measurement apparatus similar to the British patent mentioned above. One of these micro-dimensional measurement apparatuses is directed to an improvement of the optical measurement system disclosed in the British patent, so that a dimension between opposed edges formed on a substrate can be measured with a high accuracy and reliability, although the dimension to be measured is less than a spot diameter of the laser beam. The other of the micro-dimensional measurement apparatuses is also arranged to be able to measure a dimension less than a spot diameter of the laser beam with a high accuracy and reliability, but the measurement is carried out on the condition that a zone between the opposed edges and a surface of the substrate have respective uniform reflectivities which are different from each other.

In the micro-dimensional measurement apparatus mentioned later, the substrate is scanned with the laser beam controlled by the acoustic-optical device in the same manner as mentioned above, and the laser beams reflected from the substrate at the scanning steps are detected by the detector as a series of reflection data. The processor prepares a reflected light intensity data pattern on the basis of the series of the reflection data, and then reads at least two data from the reflected light intensity data pattern. The processor stores two kinds of reference data corresponding to the two read data, and calculates a distance value as a true dimension to be measured between the opposed edges from the two kinds of sample data on the basis of the two read data. The two kinds of reference data are read from a series of reflected light intensity sample patterns previously prepared on a theoretical basis and/or an experimental basis with respect to sample distance values selected as a dimension to be measured between the opposed edges.

SUMMARY OF THE INVENTION

It is an object of the present invention to provide a micro-dimensional measurement apparatus for optically measuring a fine dimension between opposed edges formed on a substrate by scanning the substrate with a twin light beam having a predetermined light intensity distribution, wherein the measurement is carried out under the condition that a zone between the opposed edges and a surface of the substrate have respective uniform reflectivities which are different from each other.

Note, the twin light beam is defined as a beam composed of two parallel light beams having substantially the same spot diameter and substantially the same light intensity distribution having a maximum peak intensity at the center of the spot thereof, so that the twin light beam has a light intensity distribution composed of both light intensity distribution of the two parallel light beams.

It is also an object of the present invention to provide a micro-dimensional measurement apparatus as mentioned above, wherein although a reflectivity of the measuring zone is variable, it is possible to carry out the measurement with a high accuracy and reliability.

It is a further object of the present invention to provide a micro-dimensional measurement apparatus as mentioned above, wherein although a reflectivity of the measuring zone is not known, it is possible to carry out the measurement with a high accuracy and reliability.

It is a further object of the present invention to provide a micro-dimensional measurement apparatus as mentioned above, which is characterized in that prior to the measurement, a shape of a reflected light intensity data pattern is determined whether or not it is correct to enhance the reliability of the measurement.

It is a further object of the present invention to provide a micro-dimensional measurement apparatus as mentioned above, wherein a peak pitch of the twin light beam is adjustable so that the scanning operation can be repeated at least twice in such a manner that a peak pitch of the twin light beam used in the first scanning operation is different from that of the twin light beam used the second scanning operation.

It is a further object of the present invention to provide a micro-dimensional measurement apparatus as mentioned above, wherein a peak pitch of the twin light beam is adjustable so that the peak pitch can be utilized as a parameter for the measurement.

In accordance with an aspect of the present invention, there is provided a micro-dimensional measurement apparatus for optically measuring a dimension between opposed edges formed on a surface of a substrate, the zone between the opposed edges and the surface of the substrate having a uniform reflectivity, the reflectivity of the zone between the opposed edges being different from that of the substrate surface, and the reflectivity of the zone between said opposed edges being known. This apparatus comprises: an optical scanning system for scanning the substrate with a twin light beam so that the beam crosses a distance between the opposed edges of said substrate, said twin light beam being defined as a beam composed of two parallel light beams having substantially the same spot diameter and substantially the same light intensity distribution having a maximum peak intensity at a center of the spot thereof, so that a light intensity distribution of the twin light beam is composed of both light intensity distribution of the two parallel light beams; means for detecting light intensity information of the twin light beam reflected from the substrate during the scanning operation; means for preparing a reflected light intensity data pattern on the basis of the detected light intensity information; means for calculating a minimum peak value and a maximum peak value from the reflected light intensity data pattern; means for storing two kinds of reference data which correspond to the minimum and maximum peak values, respectively, the two kinds of reference data being obtained from a series of reflected light intensity sample patterns prepared with respect to predetermined sample dimensions; means for calculating two distance values as a dimension to be measured between the opposed edges from the two kinds of reference data, respectively, on the basis of the minimum and maximum peak values calculated from the reflected light intensity data pattern; means for calculating a difference value between the two distance values; means for determining whether or not the difference value falls within a permissible range; and means for calculating a mean value from the distance values to evaluate that value as a true dimension to be measured between the opposed edges when the difference value falls within said permissible range.

According to the present invention, there is also provided a micro-dimensional measurement apparatus for optically measuring a dimension between opposed edges formed on a surface of a substrate, the zone between the opposed edges and the surface of the substrate having a uniform reflectivity, the reflectivity of the zone between the opposed edges being different from that of the substrate surface, and the reflectivity of the zone between the opposed edges being not known. The apparatus comprises: an optical scanning system for scanning the substrate with a twin light beam so that the beam crosses a distance between the opposed edges of the substrate, the twin light beam being defined as a beam composed of two parallel light beams having substantially the same spot diameter and substantially the same light intensity distribution having a maximum peak intensity at a center of the spot thereof, so that a light intensity distribution of the twin light beam is composed of both light intensity distributions of the two parallel light beams; means for detecting light intensity information of the twin light beam reflected from the substrate during the scanning operation; means for preparing a reflected light intensity data pattern on the basis of the detected light intensity information; means for calculating at least two of a minimum peak value, a maximum peak value and an integrated value from the reflected light intensity data pattern; means for storing two kinds of reference data which correspond to the two values selected from the minimum peak value, maximum peak value and integrated value, respectively, the two kinds of reference data being obtained from a series of reflected light intensity sample patterns prepared with respect to predetermined sample dimensions which are selected on each of predetermined sample reflectivities; means for calculating two distance values as a dimension to be measured between the opposed edges from the two kinds of reference data, respectively, on the basis of the selected two values calculated from the reflected light intensity data pattern; means for calculating a difference value between the two distance values; means for determining whether or not the difference value falls within a permissible range; and means for calculating a mean value from the two distance values to evaluate that value as a true dimension to be measured between said opposed edges when the difference value falls within the permissible range.

According to the present invention, there is further provided a micro-dimensional measurement apparatus for optically measuring a dimension between opposed edges formed on a surface of a substrate, the zone between the opposed edges and the surface of the substrate having a uniform reflectivity, the reflectivity of the zone between the opposed edges being different from that of the substrate surface, and the reflectivity of the zone between said opposed edges being not known. The apparatus comprises: an optical scanning system for scanning the substrate with a twin light beam so that the beam crosses a distance between the opposed edges of the substrate, the twin light beam being defined as a beam composed of two parallel light beams having substantially the same spot diameter and substantially the same light intensity distribution having a maximum peak intensity at a center of the spot thereof, so that a light intensity distribution of the twin light beam is composed of both light intensity distributions of the two parallel light beams; means for detecting light intensity information of the twin light beam reflected from the substrate during the scanning operation; means for preparing a reflected light intensity data pattern on the basis of the detected light intensity information; means for calculating a minimum peak value, a maximum peak value, and an integrated value from the reflected light intensity data pattern; means for storing three kinds of reference data which correspond to the minimum peak value, maximum peak value, and integrated value, respectively, the three kinds of reference data being obtained from a series of reflected light intensity sample patterns prepared with respect to predetermined sample dimensions selected on each of predetermined sample reflectivities; means for calculating three distance values as a dimension to be measured between the opposed edges from the three kinds of reference data, respectively, on the basis of the minimum peak value, the maximum peak value, and the integrated value calculated from said reflected light intensity data pattern; means for calculating three difference values among the three distance values; means for determining whether or not the three difference values fall within a permissible range; and means for calculating a mean value form the three distance values to evaluate that value as a true dimension to be measured between the opposed edges when the difference value falls within the permissible range.

According to the present invention, there is further provided a micro-dimensional measurement apparatus for optically measuring a dimension between opposed edges formed on a surface of a substrate, the zone between the opposed edges and the surface of the substrate having a uniform reflectivity, the reflectivity of the zone between the opposed edges being different from that of the substrate surface, and the reflectivity of the zone between the opposed edges being not known. The apparatus comprises: an optical scanning system for scanning the substrate with a twin light beam so that the beam crosses a distance between the opposed edges of the substrate, the twin light beam being defined as a beam composed of two parallel light beams having substantially the same spot diameter and substantially the same light intensity distribution having a maximum peak intensity at a center of the spot thereof, so that a light intensity distribution of the twin light beam is composed of both light intensity distributions of the two parallel light beams; means for detecting light intensity information of the twin light beam reflected from the substrate during the scanning operation; means for preparing a reflected light intensity data pattern on the basis of the detected light intensity information; means for calculating a minimum peak value, a maximum peak value, and an integrated value from the reflected light intensity data pattern; means for storing three kinds of reference data which correspond to the minimum peak value, maximum peak value, and integrated value, respectively, the three kinds of reference data being obtained from a series of reflected light intensity sample patterns prepared with respect to predetermined sample dimensions selected on each of predetermined sample reflectivities; means for calculating a distance value as a dimension to be measured between the opposed edges from two kinds of the three kinds of reference data, respectively, on the basis of the corresponding two values of the minimum peak value, the maximum peak value, and the integrated value calculated from the reflected light intensity data pattern; means for calculating a distance value as a dimension to be measured between the opposed edges from another two kinds of the three kinds of reference data, respectively, on the basis of the corresponding two values of the minimum peak value, the maximum peak value, and the integrated value calculated from the reflected light intensity data pattern; means for calculating a difference value between the two distance values; means for determining whether or not the difference value fall within a permissible range; and means for calculating a mean value form the two distance values to evaluate that value as a true dimension to be measured between the opposed edges when the difference value falls within the permissible range.

According to the present invention, there is further provided a micro-dimensional measurement apparatus for optically measuring a dimension between opposed edges formed on a surface of a substrate, the zone between the opposed edges and the surface of said substrate having a uniform reflectivity, the reflectivity of the zone between the opposed edges being different from that of the substrate surface, and the reflectivity of the zone between the opposed edges being not known. The apparatus comprises: an optical scanning system for scanning the substrate with a twin light beam so that the beam crosses a distance between the opposed edges of the substrate, the twin light beam being defined as a beam composed of two parallel light beams having substantially the same spot diameter and substantially the same light intensity distribution having a maximum peak intensity at a center of the spot thereof, so that a light intensity distribution of the twin light beam is composed of both light intensity distributions of the two parallel light beams, a peak distance between the two maximum peaks of light intensity of the two parallel light beams being adjustable so that one of at least two peak distance values, namely, a first peak distance value and a second peak distance value narrower than the first peak distance value, is selected, whereby the substrate can be scanned by one of a first twin light beam having the first peak distance value and a second twin light beam having the second peak distance value; a detection means for detecting light intensity information of the twin light beam reflected from the substrate during the scanning operation; a first data-pattern preparation means for preparing a first reflected light intensity data pattern on the basis of the reflected light intensity information detected by the detection means when the substrate is scanned with the first twin light beam by the optical scanning system; a pattern-shape determination means for determining whether or not the first reflected light intensity data pattern is a suitable W-shaped pattern; a first peak-value calculation means for calculating a minimum peak value and a maximum peak value from the first reflected light intensity data pattern when that pattern is determined as the suitable W-shaped pattern by the pattern-shape determination means; a first-peak value determination means for determining whether or not the minimum and maximum peak values fall within minimum and maximum peak value ranges, respectively; the optical scanning system scanning the substrate with the second twin light beam when the minimum and maximum peak values do not fall within the minimum and maximum peak value ranges, respectively; a second data-pattern preparation means for preparing a second reflected light intensity data pattern on the basis of the reflected light intensity information detected by the detection means when the substrate is scanned with the second twin light beam by the optical scanning system; a second peak-value calculation means for calculating a minimum peak value and a maximum peak value from the second reflected light intensity data pattern; a reference-data storage means for storing a first group of two kinds of reference data corresponding to the minimum and maximum peak values calculated from the first reflected light intensity data pattern, and a second group of two kinds of reference data corresponding to the minimum and maximum peak values calculated from the second reflected light intensity data pattern, the first and second groups of two kinds of reference data being obtained from two series of reflected light intensity sample patterns, respectively, prepared with respect to predetermined sample dimensions selected on each of predetermined sample reflectivities, the sample dimensions and the sample reflectivities being able to be individually selected on each of the two series of reflected light intensity sample patterns; a first distance-value calculation means for calculating two distance values as a dimension to be measured between the opposed edges from the first group of two kinds of reference data, respectively, on the basis of the minimum and maximum peak values calculated from the first reflected light intensity data pattern when these values fall within the minimum and maximum peak value permissible ranges, respectively; a first difference-value calculation means for calculating a difference value between the two distance values calculated by the first distance-value calculation means; a first difference-value determination means for determining whether or not the difference value calculated by the first difference-value calculation means falls within a first difference-value permissible range; a first mean-value calculation means for calculating a mean value form the two distance values to evaluate that value as a true dimension to be measured between the opposed edges when the difference value falls within the second permissible range; a second distance-value calculation means for calculating two distance values as a dimension to be measured between the opposed edges from the second group of two kinds of reference data, respectively, on the basis of the minimum and maximum peak values calculated from the second reflected light intensity data pattern when the minimum and maximum peak values calculated from the first reflected light intensity data pattern by the first peak-value calculation means do not fall within the minimum and maximum peak value permissible ranges; a second difference-value calculation means for calculating a difference value between the two distance values calculated from the second group of two kinds of reference data by the second distance-value calculation means; a second difference-value determination means for determining whether or not the difference value between the two distance values calculated from the second group of two kinds of reference data by the second distance-value calculation means falls within a second difference-value permissible range; and a second mean-value calculation means for calculating a mean value form the two distance values, which are calculated from the second group of two kinds of reference data by the second distance-value calculation means, to evaluate that value as a true dimension to be measured between the opposed edges when the difference value calculated by the second difference-value calculation means falls within the second difference-value permissible range.

According to the present invention, there is further provided a micro-dimensional measurement apparatus for optically measuring a dimension between opposed edges formed on a surface of a substrate, the zone between the opposed edges and the surface of the substrate having a uniform reflectivity, the reflectivity of the zone between the opposed edges being different from that of said substrate surface, and the reflectivity of the zone between the opposed edges being not known. The apparatus comprises: an optical scanning system for scanning the substrate with a twin light beam so that the beam crosses a distance between the opposed edges of the substrate, the twin light beam being defined as a beam composed of two parallel light beams having substantially the same spot diameter and substantially the same light intensity distribution having a maximum peak intensity at a center of the spot thereof, so that a light intensity distribution of the twin light beam is composed of both light intensity distributions of the two parallel light beams, a peak distance between the two maximum peaks of light intensity of the two parallel light beams being adjustable so that one of at least two peak distance values, namely, a first peak distance value and a second peak distance value narrower than the first peak distance value, is selected, whereby the substrate can be scanned by one of a first twin light beam having the first peak distance value and a second twin light beam having the second peak distance value; a detection means for detecting light intensity information of the twin light beam reflected from the substrate during the scanning operation; a first data-pattern preparation means for preparing a first reflected light intensity data pattern on the basis of the reflected light intensity information detected by the detection means when the substrate is scanned with the first twin light beam by the optical scanning system; a pattern-shape determination means for determining whether or not the first reflected light intensity data pattern is a suitable W-shaped pattern; a first peak-value calculation means for calculating a minimum peak value and a maximum peak value from the first reflected light intensity data pattern when this data pattern is determined as a suitable W-shaped pattern by the pattern-shape determination means; a second data-pattern preparation means for preparing a second reflected light intensity data pattern on the basis of the reflected light intensity information detected by the detection means when the substrate is scanned with the second twin light beam by the optical scanning system; a second peak-value calculation means for calculating a minimum peak value and a maximum peak value from the second reflected light intensity data pattern; a reference-data storage means for storing a first group of two kinds of reference data corresponding to the minimum and maximum peak values calculated from the first reflected light intensity data pattern, and a second group of two of kinds reference data corresponding to the minimum and maximum peak values calculated from the second reflected light intensity data pattern, the first and second groups of two kinds of reference data being obtained from two series of reflected light intensity sample patterns, respectively, prepared with respect to predetermined sample dimensions selected on each of predetermined sample reflectivities, the sample dimensions and the sample reflectivities being able to be individually selected on each of the two series of reflected light intensity sample patterns; a first distance-value calculation means for calculating a first distance value as a dimension to be measured between the opposed edges, on the basis of one of the minimum and maximum peak values calculated by the first peak-value calculation means, from the corresponding one kind of reference data included in the first group of two kinds of reference data; a second distance-value calculation means for calculating a second distance value as a dimension to be measured between the opposed edges, on the basis of one of the minimum and maximum peak values calculated by the second peak-value calculation means, from the corresponding one kind of reference data included in the second group of two kinds of reference data; the one of the minimum and maximum peak values calculated by the first peak-value calculation means and the one of the minimum and maximum peak values calculated by the second peak-value calculation means being different from each other in peak value type; a difference-value calculation means for calculating a difference value between the first and second distance values calculated by the first distance-value means and by the second distance-value calculation means, respectively; a difference-value determination means for determining whether or not the difference value falls within a permissible range; and a mean-value calculation means for calculating a mean value form the first and second distance values to evaluate that value as a true dimension to be measured between the opposed edges when the difference value falls within said permissible range.

According to the present invention, there is further provided a micro-dimensional measurement apparatus for optically measuring a dimension between opposed edges formed on a surface of a substrate, the zone between the opposed edges and the surface of the substrate having a uniform reflectivity, the reflectivity of the zone between the opposed edges being different from that of the substrate surface, and the reflectivity of the zone between the opposed edges being known. The apparatus comprises: an optical scanning system for scanning the substrate with a twin light beam so that the beam crosses a distance between the opposed edges of the substrate, the twin light beam being defined as a beam composed of two parallel light beams having substantially the same spot diameter and substantially the same light intensity distribution having a maximum peak intensity at a center of the spot thereof, so that a light intensity distribution of twin light beam is composed of both light intensity distributions of the two parallel light beams, a peak distance between the two maximum peaks of light intensity of the two parallel light beams being adjustable; a detection means for detecting light intensity information of the twin light beam reflected from the substrate when the scanning operation is repeated at least two times, the peak distance being altered in each of the scanning operations; a first data-pattern preparation means for preparing a first reflected light intensity data pattern on the basis of the reflected light intensity information detected by the detection means when the substrate is scanned with the twin light beam in the first scanning operation; a second data-pattern preparation means for preparing a second reflected light intensity data pattern on the basis of the reflected light intensity information detected by the detection means when the substrate is scanned with the twin light beam in the second scanning operation; a first peak-value calculation means for calculating a minimum peak value and/or a maximum peak value from the first reflected light intensity data pattern; a second peak-value calculation means for calculating a minimum peak value and/or a maximum peak value from the first reflected light intensity data pattern; a reference-data storage means for storing reference peak data corresponding to the minimum and maximum peak values calculated from each of the first and second reflected light intensity data patterns by the peak-value calculation means, the reference peak data being obtained from a series of reflected light intensity sample patterns prepared with respect to predetermined sample dimensions selected on each of predetermined sample peak distances concerning the two parallel light beams; a first distance-value calculation means for calculating a first distance value as a dimension to be measured between the opposed edges from the reference peak data on the basis of the minimum and/or maximum peak values calculated from the first reflected light intensity data pattern by the first peak-value calculation means; a second distance-value calculation means for calculating a second distance value as a dimension to be measured between the opposed edges from the reference peak data on the basis of the minimum and/or maximum peak values calculated from the second reflected light intensity data pattern by the second peak-value calculation means; a difference-value calculation means for calculating a difference value between the first and second distance values calculated by the first distance-value calculation means and by the second distance-value calculation means, respectively; a difference-value determination means for determining whether or not the difference value calculated by the difference-value calculation means falls within a permissible range; and a mean-value calculation means for calculating a mean value from the first and second distance values to evaluate that value as a true dimension to be measured between the opposed edges when the difference value falls within the permissible range.

BRIEF DESCRIPTION OF THE DRAWINGS

These and other objects of the present invention will be better understood from the following description, with reference to the accompanying drawings, in which:

FIGS. 20 to 23 are graphs for explaining the principle of the present invention, showing characteristics of minimum and maximum peak values of the series of reflected light intensity patterns;

FIGS. 24 and 25 are graphs for explaining the principle of the present invention, showing characteristics of minimum and maximum peak values of the series of reflected light intensity patterns;

FIGS. 31 to 36, 37A-1 to 37A-4, 37B-1 to 37B-3 and 38A to 38C are flow charts showing the operation of the control circuit of FIG. 1;

FIGS. 40 and 41 are flow charts showing the operation of the control circuit of FIG. 1.

DESCRIPTION OF THE PREFERRED EMBODIMENTS

Figure 1:
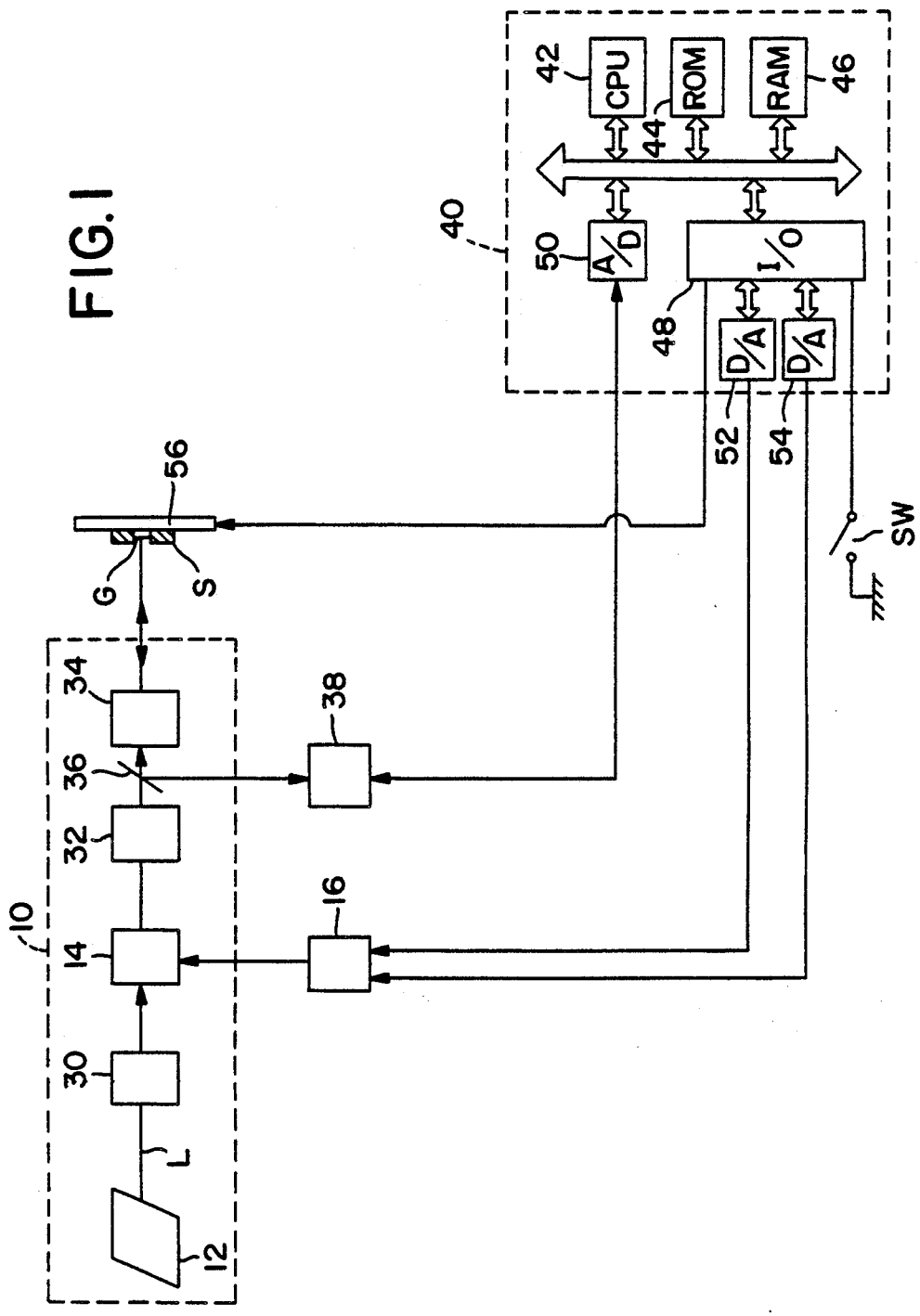
FIG. 1 is a schematic block diagram of a micro-dimensional measurement apparatus according to the present invention.

FIG. 1 shows a block diagram of a micro-dimensional measurement apparatus which is arranged so as to optically measure a fine dimension of less than 1 $\mu$m under a scanning operation in which the twin light beam as defined hereinbefore is used. In this embodiment, a fine dimension to be measured is shown by way of example as a gap width $G_w$ between edges of a fine gap G formed on a surface of a substrate S.

The micro-dimensional measurement apparatus comprises an optical scanning system 10 which includes a light source unit 12 for emitting a laser beam L having a Gaussian intensity distribution. The light source unit 12 may be arranged so as to generate an He-Ne laser having a spot diameter which can be reduced to the order of 1 μm, or an Ar-laser having a spot diameter which can be further reduced to a fine diameter less than 1 μm. The optical scanning system 10 also includes an acoustic-optical element 14 entered by the laser beam L and actuated by an acoustic-optical element driver 16, so that the laser beam L passing through the acoustic-optical element 14 is converted into two laser beams and these two laser beams are deflected within a predetermined range of deflection.

Figure 2:
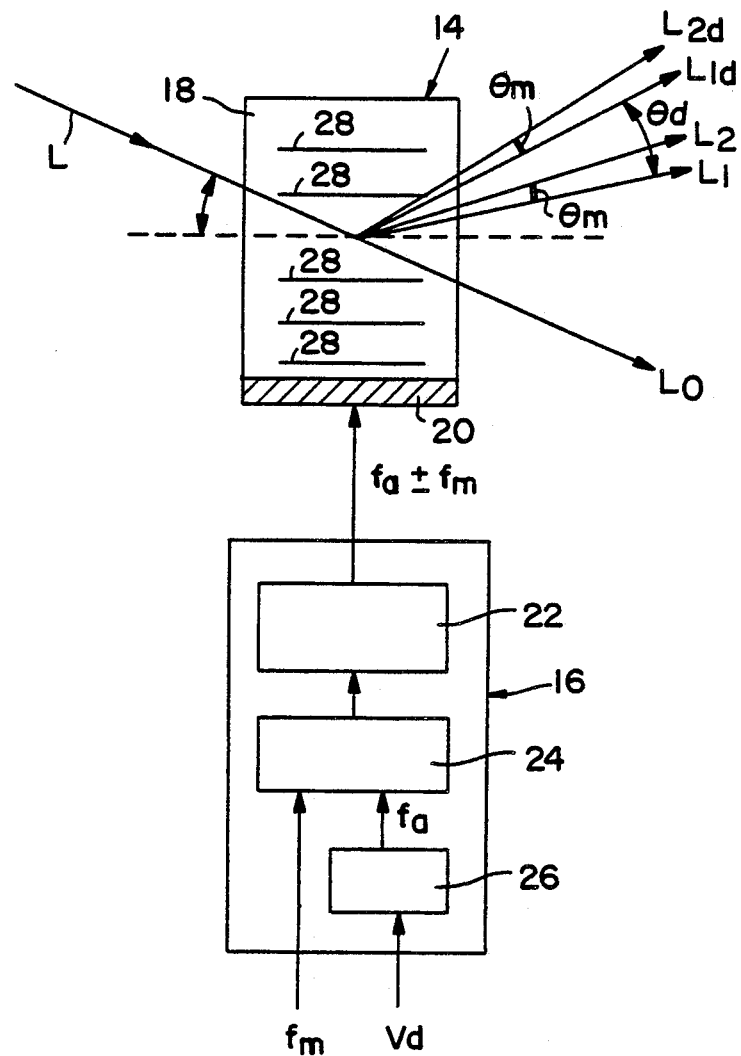
FIG. 2 is a schematic view of an acoustic-optical element and an acoustic-optical element driver in detail.

The acoustic-optical element 14 and the acoustic-optical element driver 16 are illustrated in detail in FIG. 2. The acoustic-optical element 14 basically comprises an optically transparent medium 18 through which the laser L can pass, and an electro-acoustic transducer 20, such as a piezo-electric transducer, acoustically coupled to the optically transparent medium 18. The acoustic-optical element driver 16 basically comprises a power amplifier circuit 22, a double-balanced modulator circuit 24, and a voltage control oscillator 26.

When a ramp voltage signal $V_d$, which is varied between zero volt and one volt, is applied to the voltage control oscillator 26, a high-frequency carrier signal $f_a$ (several tens of MHz) is output therefrom and then input to the double-balanced modulator circuit 24. While a low-frequency sinusoidal waveform signal $f_m$ (several hundreds of kHz) is input to the double-balanced modulator circuit 24, the high-frequency carrier signal $f_a$ is modulated by the low-frequency sinusoidal waveform signal $f_m$ so that the double-balanced modulator circuit 24 outputs a signal which comprises the sideband frequency components $(f_a+f_m)$ and $(f_a-f_m)$. This signal $(f_a \pm f_m)$ is amplified by the power amplifier circuit 22, and is then applied to the electro-acoustic transducer 20 of the acoustic-optical element 14 so that ultrasonic traveling acoustic waves are generated from the electro-acoustic transducer 20 and propagated in the optically transparent medium 18 to produce a periodical change of coefficient of refraction therein, as schematically illustrated by parallel lines 28 in FIG. 2. In short, when the acoustic-optical element 14 is actuated by the acoustic-optical element driver 16, the element serves only as a diffraction grating, so that the laser beam L entering the optically transparent medium 18 at a Bragg angle $\theta_B$ with respect to the transverse direction of the traveling acoustic waves is split into a non-diffracted beam $L_0$ and two diffracted beams $L_1$ and $L_2$. In this case, the two diffracted laser beams $L_1$ and $L_2$ are mainly affected by the Doppler shift so that the two diffracted laser beams $L_1$ and $L_2$ have the frequencies $(f_n+f_a+f_m)$ and $f_n+f_a-f_m)$, respectively. This diffraction phenomenon is described in detail in the monograph by Baronian presented at the IEEE 1974 Region Six Conference, entitled "Acoustic-optic Bragg Diffraction Device and Their Application".

The two laser beams $L_1$ and $L_2$ can be deflected by varying the ramp voltage signal $V_d$, and therefore, the high-frequency carrier signal $f_a$. In FIG. 2, the two laser beams deflected by an angle $\theta_d$ are designated by symbols $L_{1d}$ and $L_{2d}$. On the other hand an angle $\theta_m$ defined by the two beams $L_1$ and $L_2$ is adjustable by varying the low-frequency sinusoidal waveform signal $f_m$. In particular, the deflection angle $\theta_d$ and the angle $\theta_m$ are represented by the formulae below, respectively:

$$\theta_d = \lambda \cdot \Delta f_a / v$$

$$\theta_m = \lambda \cdot 2 f_m / v$$

Wherein: $\lambda$ is a wavelength of the original laser beam L; $\Delta f_a$ is a rate of change by which the high-frequency carrier signal $f_a$ is varied when the ramp voltage signal, namely, deflection voltage signal $V_d$ is varied to deflect the two laser beams $L_1$ and $L_2$ by the deflection angle $\theta_d$; and v is a velocity at which the ultrasonic traveling acoustic waves propagates in the optically transparent medium 18 of the acoustic-optical element 14. Accordingly, it is possible to control the deflection angle $\theta_d$ and the angle $\theta_m$ by adjusting the high-frequency carrier signal $f_a$ and the low-frequency sinusoidal waveform signal $f_m$.

Note, the acoustic-optical element and the acoustic-optical element driver, as mentioned above, are commercially available, for example, from IntraAction Corp. as Models DE-40M and ADM-40.

The optical scanning system 10 further includes first, second, and third groups of optical lens elements 30, 32, and 34, respectively, and an photo-isolator 36 which may be replaced by a beam splitter. The laser beam L emitted from the light source unit 12 enters the first group of lens elements 30 which suitably deforms the laser beam L in a cross-sectional shape thereof so that the beam L can be effectively deflected by the optically transparent medium 18 of the acoustic-optical element 14. Since the two laser beams $L_1$ and $L_2$ derived from the deformed laser beam L are also deformed, they are restored to the original shape thereof by the second group of lens element 32, and are emitted therefrom as a pair of parallel laser beams; thus forming the twin light beam defined hereinbefore. The twin laser beam passes through the photo-isolator 36, is projected from the third group of lens elements 34 on the substrate, and then is focussed on the substrate S. The projected twin laser beam is deflected by controlling the deflection voltage signal $V_d$ applied to the acoustic-optical element 16, so that the substrate S is scanned with the twin laser beam over a predetermined scanning range. During the scanning operation, the projected twin laser beam is reflected from the substrate S and is then returned to the optical scanning system 10. The reflected twin laser beam is output from the optical scanning system 10 by the photo-isolator 36 and then detected by a photo-detector 38 for detecting a reflected light intensity thereof.

As mentioned above, the two laser beams $L_1$ and $L_2$ forming the twin laser beam have the frequencies $(f_n+f_a+f_m)$ and $(f_n+f_a-f_m)$, respectively. Wherein: $f_n$ is a frequency of the original laser beam L.

Since a difference between the frequencies is a constant value of $2f_m$, which is relatively small, the two laser beams $L_1$ and $L_2$ are affected by the heterodyne interference to cause a beat in the laser beams having a beat frequency of $2f_m$, as disclosed in U.S. Pat. No. 4,650,330 of the same applicant. A light intensity of such a beat laser beam can be obtained as follows:

If a light beam having a frequency $f_p$ is designated as a magnitude $E_1$ of an electric field vector, and if a light beam having a frequency $f_q$ is designated as a magnitude $E_2$ of an electric field vector the magnitudes $E_1$ and $E_2$ can be represented by the formulae below:

$$E_1 = A_1 \cos(2\pi f_p t + \phi_1)$$

$$E_2 = A_2 \cos(2\pi f_q t + \phi_2)$$

Wherein: $A_1$ and $A_2$ are an amplitude; and $\phi_1$ and $\phi_2$ are a phase. When the light beam having the frequency $f_p$ and the light beam having the frequency $f_q$ are affected by interference, the interfered with light beam has a light intensity I represented by the formula below:

$$I = |E_1 + E_2|^2$$

When the interfered with light beam is detected by a photo-detector and the light intensity I thereof is converted into an electric current i, it is represented by the formula below:

$$i \propto A_1^2 + A_2^2 + 2A_1 A_2 \cos(2\pi \Delta f t + \Delta\phi)$$

Wherein: $\Delta f = f_p - f_q$; and $\Delta\phi = \phi_1 - \phi_2$. Therefore, when the light intensity of the beat laser beam is converted into an electric current, this can be also represented by the formula mentioned above, provided that $\Delta f$ is replaced by $2f_m$.

According to the present invention, the reflected light intensity of the twin laser beam is detected by the photo-detector 38, and only a direct current component $(A_1^2 + A_2^2)$ of the formula mentioned above is selected as light intensity information of the twin laser beam reflected from the substrate S. The photo-detector 38 may include a photoelectric conversion device such a PIN-photo diode, which outputs an analog voltage signal in proportion to the light intensity of the reflected twin laser beam; the analog voltage signal corresponding to the direct current component $(A_1^2 + A_2^2)$ of the above-mentioned formula.

The micro-dimensional measurement apparatus further comprises a control circuit 40 for commanding an overall operation thereof. In particular, the control circuit 40 may be constructed by a microcomputer as shown in FIG. 1, which comprises a central processing unit (CPU) 42, a read-only memory (ROM) 44 for storing a routine, tables (maps), constants, etc., a random access memory (RAM) 46 for storing temporary data, and an input/output interface (I/O) 48. The control circuit 40 further comprises an analog-to-digital (A/D) converter 50 and two digital-to-analog (D/A) converters 52 and 54. The analog-to-digital (A/D) converter 50 converts the analog voltage signal output from the photo-detector into a digital voltage signal. The digital-to-analog (D/A) converter 52 outputs the ramp voltage signal or deflection voltage signal $V_d$ applied to the voltage control oscillator 26 of the acoustic-optical element driver 16, and thus the high-frequency carrier signal $f_a$ is generated therefrom, as mentioned hereinbefore. On the other hand, the digital-to-analog (D/A) converter 54 outputs the low-frequency sinusoidal waveform signal $f_m$ applied to the double-balanced modulator circuit 24 of the acoustic-optical element driver 16.

The micro-dimensional measurement apparatus may include a movable carrier 56 on which a plurality of substrates S are placed (in FIG. 1, only one substrate S is illustrated). Movement of the movable carrier 56 is controlled by the control circuit 40 so that the substrates S are brought successively to a measuring position to be scanned with the twin laser beam In the embodiment shown in FIG. 1, although a combination of the acoustic-optical element 14 and the acoustic-element driver 16 for generating and deflecting the twin beam is used, the laser source unit 12 may include a pair of laser sources arranged to generate the twin laser beam as defined hereinbefore. In this case, the twin laser beam may be deflected by the acoustic-optical element, but it is possible to use another type of optical scanning device such as a polygon mirror type scanning device, an electromagnetically type scanning device, or the like.

Figure 3A:
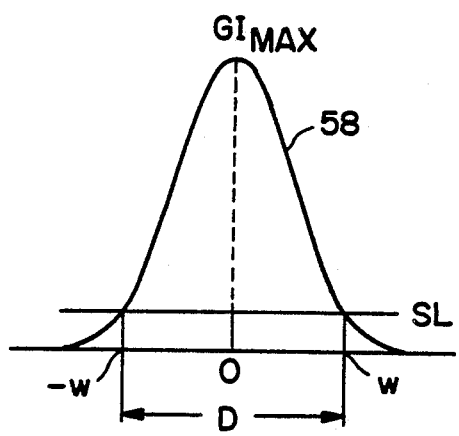
FIG. 3A is a view of a light intensity distribution of a laser beam.

For a better understanding of the present invention, the principle thereof will be explained as follows:

FIG. 3A shows a Gaussian intensity distribution 58 of the original laser beam L directly emitted from the laser source unit 12. An intensity GI of the Gaussian intensity distribution 12 is represented by the formula below:

$$GI = GI_{MAX} \exp(-2 \cdot x^2 / w^2)$$

Wherein: $GI_{MAX}$ is the maximum peak intensity of the Gaussian intensity distribution 58; w is a Gaussian beam radius generally defined as one half of a slice pitch obtained by slicing the Gaussian intensity distribution at a 13.5% level of the maximum peak of intensity $GI_{MAX}$, as shown by a slice line SL in FIG. 3; and x is a distance measured from a zero origin of the slice line SL. In this case, a spot diameter D of the Gaussian beam is defined as follows:

$$D = 2w$$

Figure 3B:
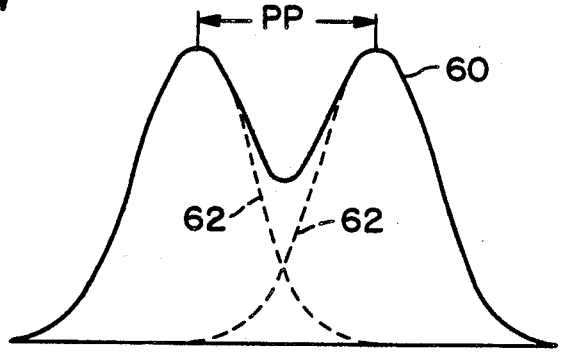
FIGS. 3B and 3C are views of a light intensity distribution of a twin laser beam derived from the laser beam of FIG. 3A.
Figure 3C:
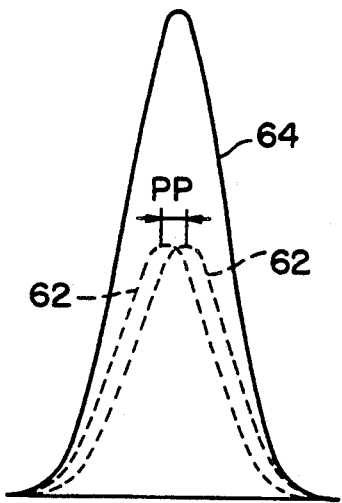

FIG. 3B shows a light intensity distribution 60 of the twin beam, which is illustrated by a solid line. The light intensity distribution 60 is composed of two Gaussian intensity distributions 62, which are illustrated by broken lines and which partially overlap the light intensity distribution 60 of the twin beam. The two Gaussian intensity distributions 62 correspond to these of the two parallel laser beams $L_1$ and $L_2$ forming the twin beam. Herein, a distance between the maximum peaks of the two Gaussian intensity distribution 62 is defined as a peak pitch PP of the twin beam. As shown in FIG. 3B, when the peak pitch PP is relatively large, the light intensity distribution 60 of the twin beam has an M-shaped pattern. FIG. 3C shows another light intensity distribution 64 of the twin laser beam in which the peak pitch PP becomes smaller and has a reversed V-shaped pattern.

Figure 4:
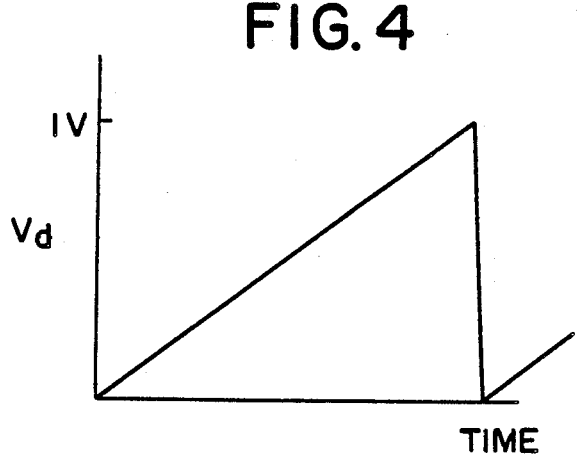
FIG. 4 is a graph showing a characteristic of a ramp voltage applied to the acoustic-optical element driver.

FIG. 4 shows a ramp wave of the deflection voltage signal $V_d$ supplied from the digital-analog converter 52 to the voltage control oscillator 26 of the acoustic-element driver 16. As apparent from FIG. 4 the deflection voltage signal $V_d$ is linearly increased from zero volt to one volt and then immediately decreased to zero volt. When the deflection voltage signal $V_d$ is increased from zero volt to one volt, the twin laser beam is deflected so that the beam spot thereof projected on the substrate S is shifted from a zero-volt position to a one-volt position, and thus one scanning operation is completed.

FIGS. 5A to 5G show representative steps of the scanning operation wherein the fine gap G formed on the substrate S is scanned with a twin laser beam having the M-shaped intensity pattern as shown in FIG. 3B. In particular, the twin beam spot is shifted along a line crossing a measuring zone or a gap zone between the gap edges. In this case, it is assumed that the scanning operation is carried out under the following conditions:

(a) PP=1.0

The peak pitch PP is given as a normalized value. That is, the peak pitch PP is normalized with respect to the spot diameter D of the original laser beam L, which is assumed to be 1.

(b) g=0.5

A gap width $G_w$ of the fine gap G is also given as a normalized value g. That is, g is normalized with respect to the spot diameter D of the original laser beam L, which is assumed to be 1. Namely, g is defined as shown below:

$$g = G_w/D$$

(c) r=0.5

A reflectivity r of the gap zone is given as a relative reflectivity. That is, r is a ratio of the absolute reflectivity $r_g$ of the gap zone to the absolute reflectivity $r_s$ of the surface of the substrate S. Namely, r is defined as below:

$$r = r_g/r_s$$

Figure 5A:
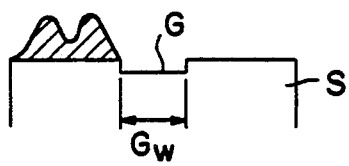
FIGS. 5A to 5G are views for explaining representative scanning steps of a scanning operation.

In FIG. 5A, the twin beam spot is shifted so that a leading edge thereof is in contact with one of the gap edges G. In this step, the reflected light intensity of the twin laser beam is not yet affected by the gap zone, and thus has the maximum value.

Figure 5E:
Figure 5B:
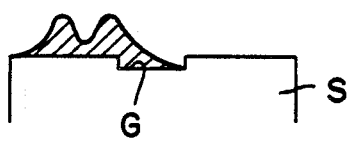

In FIG. 5B, the twin beam spot is further shifted so that the leading edge thereof is close to the other of the gap edges. In this step, a reflected light intensity of the twin laser beam is decreased from the maximum value due to the affect thereon of the gap zone having the lower reflectivity In FIG. 5C, the twin beam spot is shifted to a position where one of the maximum peaks thereof matches a middle point of the gap zone, so that a reflected light intensity of the twin laser beam is lower than that in the step of FIG. 5B.

Figure 5F:
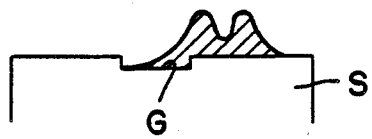
Figure 5C:
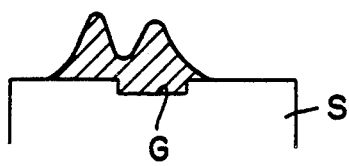
Figure 5G:
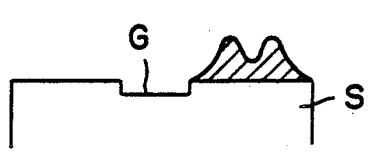
Figure 5D:
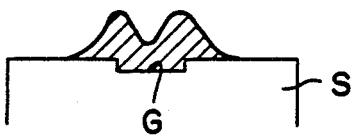

In FIG. 5D, the twin beam spot is further shifted to a position where a center thereof or the minimum peak thereof, matches the middle point of the gap zone, so that a reflected light intensity of the twin laser beam is higher than that in the step of FIG. 5C.

The step in FIG. 5E, corresponds to that of FIG. 5C, because the other of the maximum peaks of the twin laser beam matches the middle point of the gap zone, and therefore, a reflected light intensity of the twin beam is substantially the same as in the step of FIG. 5C.

The step in FIG. 5F, corresponds to that of FIG. 5B, in that a trailing edge of the twin beam spot is close to one of the gap edges, and thus, a reflected light intensity of the twin laser beam is substantially the same as in the step of FIG. 5B.

The step in FIG. 5G, corresponds to that of FIG. 5A, in that the trailing edge of the twin beam spot matches the other of the gap edges, and thus a reflected light intensity of the twin laser beam is substantially the same as in the step of FIG. 5A.

Figure 6A:
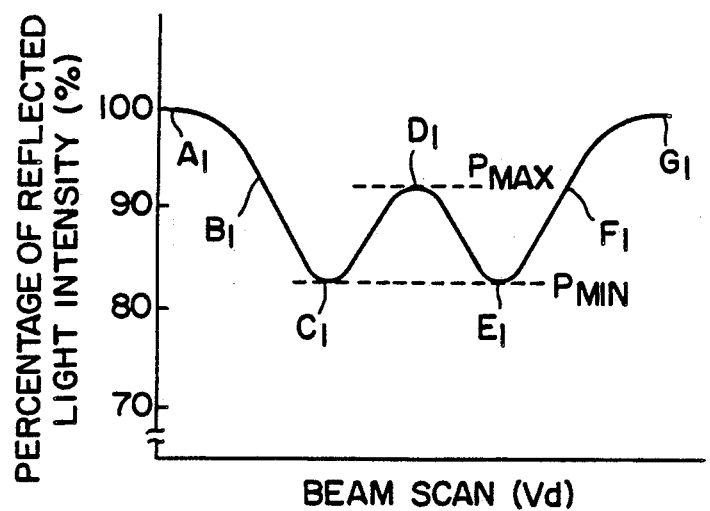
FIGS. 6A to 6C are views of a representative light intensity pattern reflected from a measuring zone.

FIG. 6A shows a reflected light intensity pattern prepared on the basis of the reflected light intensity information detected by the photo-detector 38 during the scanning operation shown in FIGS. 5A to 5G. In FIG. 6A, symbols $A_1$, $B_1$, $C_1$, $D_1$, $E_1$, $F_1$, and $G_1$ designate percentages of reflected light intensities detected at the steps of FIGS. 5A to 5G, respectively. As seen from FIG. 6A, the reflected light intensity pattern has a W-shape under the conditions PP=1.0, g=0.5, and r=0.5. This W-shaped pattern includes three peaks at the steps of FIGS. 5C, 5D, and 5E, respectively. The peak value obtained at the step of FIG. 5D will be referred to as a maximum peak hereinafter, and is designated by a symbol $P_{MAX}$. The other two peak values obtained at the steps of FIGS. 5C and 5E, which are substantially identical with each other, will be referred to as a minimum peak hereinafter, and designated by a symbol $P_{MIN}$.

Figure 6B:
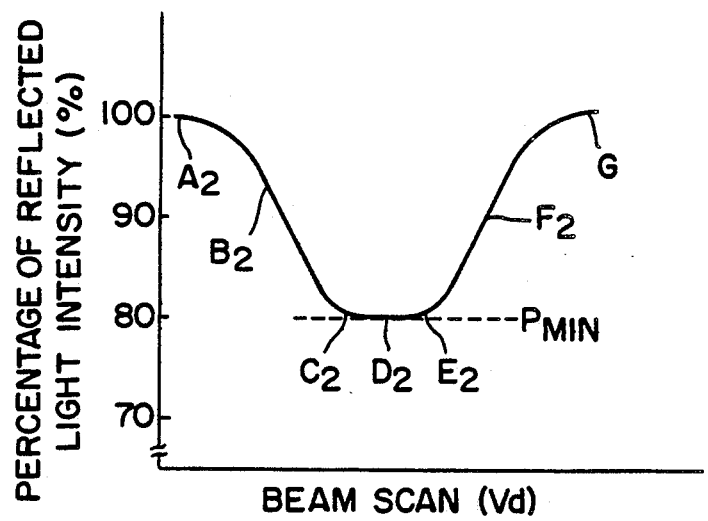

FIG. 6B shows a reflected light intensity pattern obtained when the scanning operation is carried out under the conditions PP=0.6, g=0.5, and r=0.5. In FIG. 6A, symbols $A_2$, $B_2$, $C_2$, $D_2$, $E_2$, $F_2$, and $G_2$ designate percentages of reflected light intensities detected at the steps corresponding to FIGS. 5A to 5G, respectively. As seen from FIG. 6B, the reflected light intensity pattern has a U-shape. In this U-shaped pattern, the percentages of reflected light intensities are substantially identical over a range between the step corresponding to FIG. 5C and the step corresponding to FIG. 5E. These percentages of reflected light intensities are also referred to as a minimum peak hereinafter, and designated by the symbol $P_{MIN}$.

Figure 6C:
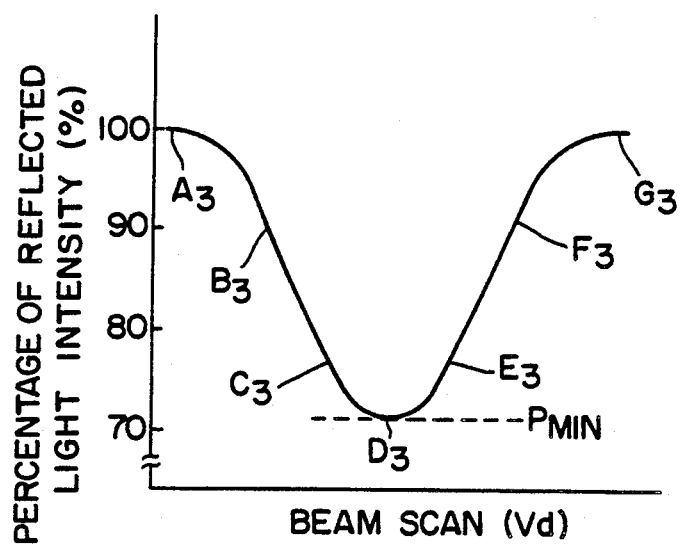

FIG. 6C shows a reflected light intensity pattern obtained when the scanning operation is carried out under the conditions PP=0.6, g=0.7, and r=0.5. In FIG. 6C, symbols $A_3$, $B_3$, $C_3$, $D_3$, $E_3$, $F_3$, and $G_3$ designate percentages of reflected light intensities detected at the steps corresponding to FIGS. 5A to 5G, respectively. As seen from FIG. 6C, the reflected light intensity pattern has a V-shape. This V-shaped pattern includes only one peak value, which is obtained at the step corresponding to FIG. 5D. This peak value will be referred to as a minimum peak hereinafter, and also designated by the symbol $P_{MIN}$.

Note, in FIGS. 6A, 6B and 6C, a percentage of reflected light intensity obtained at each of the scanning steps is given as a normalized value. For this normalization, a reflected light intensity which is obtained when the beam spot is projected on the surface of the substrate S is selected and assumed to be 100%.

Figure 7A:
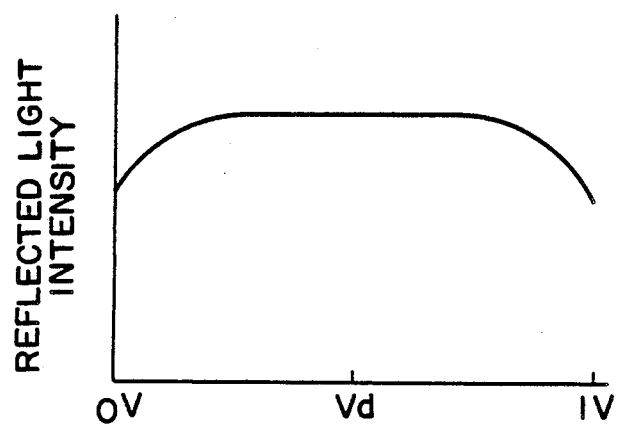
FIG. 7A is a view of a characteristic of light intensity distribution reflected from a surface of a substrate during the scanning operation.

In particular, FIG. 7A shows a reflected light intensity pattern obtained when the scanning operation is actually carried out on a surface portion of the substrate S by the acoustic-optical element and the driver thereof, and prepared with respect to the full range of the deflection voltage $V_d$. Since the surface portion does not includes the gap zone and has a uniform reflectivity, a characteristic of the reflected light intensity pattern so obtained must be flat, but in practice, is uneven in the starting and ending ranges of the pattern characteristic. As can be seen from FIG. 7A, the pattern characteristic has a good flatness in a middle range except for the starting and ending ranges, and accordingly, it is possible to assume that any one of the reflected light intensities obtained from the middle range of the pattern characteristic, is 100% for the normalization as mentioned above. It is preferable to assume that a mean of the reflected light intensities obtained from the middle range of the pattern characteristic, is 100%.

Figure 7B:
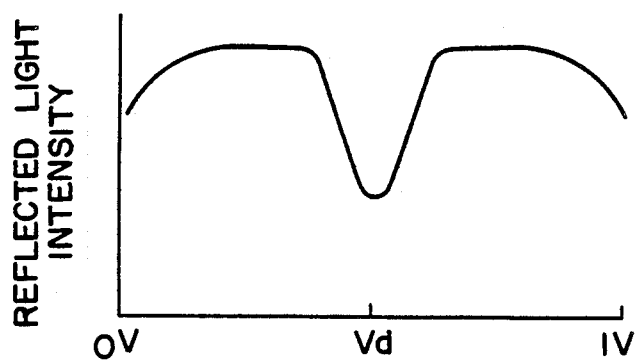
FIG. 7B is a view similar to FIG. A, of a characteristic of light intensity distribution reflected from the subtract surface including the measuring zone.

FIG. 7B shows a reflected light intensity pattern obtained when the scanning operation is actually carried out on a measuring area of the substrate S including a gap zone by the acoustic-optical element and the driver thereof, and also prepared with respect to the full range of the deflection voltage $V_d$. In FIG. 7B, a V- shaped pattern which appears in the middle range of the pattern characteristic between the starting and ending ranges shows the existence of the gap zone. As can be seen from FIG. 7B, the good flatness of the pattern characteristic is maintained between the starting and ending ranges and the range of the V-shaped pattern. Accordingly, during the scanning operation, it is possible to select any one of the reflected light intensities obtained from the flat range of the pattern characteristic, for the normalization as mentioned above The principle of the present invention is based upon the concept that, when a measuring zone between opposed edges formed on a surface of a substrate has a reflectivity different from that of the substrate surface, a reflected light intensity pattern obtained when the substrate is scanned with the twin beam in the manner mentioned above possesses a specific characteristic derived from an individual dimension between the opposed edges. In other words, an unknown dimension between the opposed edges can be found by comparing a reflected light intensity pattern derived therefrom with a series of reflected light intensity patterns derived from known sample dimensions selected to be measured between the opposed edges.

According to one aspect of the present invention, a dimension between the opposed edges formed on a substrate is measured under the condition that a reflectivity $r$ of the measuring zone between the opposed edges to a surface of the substrate is known. In this case, to compare a reflected light intensity data pattern derived from a dimension to be measured between the opposed edges with a series of reflected light intensity sample patterns prepared with respect to predetermined sample dimensions, at least one kind of reference data is selected from the series of reflected light intensity sample patterns. In particular, the kind of reference data may consist of the maximum peak values $P_{MAX}$ of the series of reflected light intensity sample patterns, the minimum peaks $P_{MIN}$ thereof, or the integrated value thereof.

Figure 8:
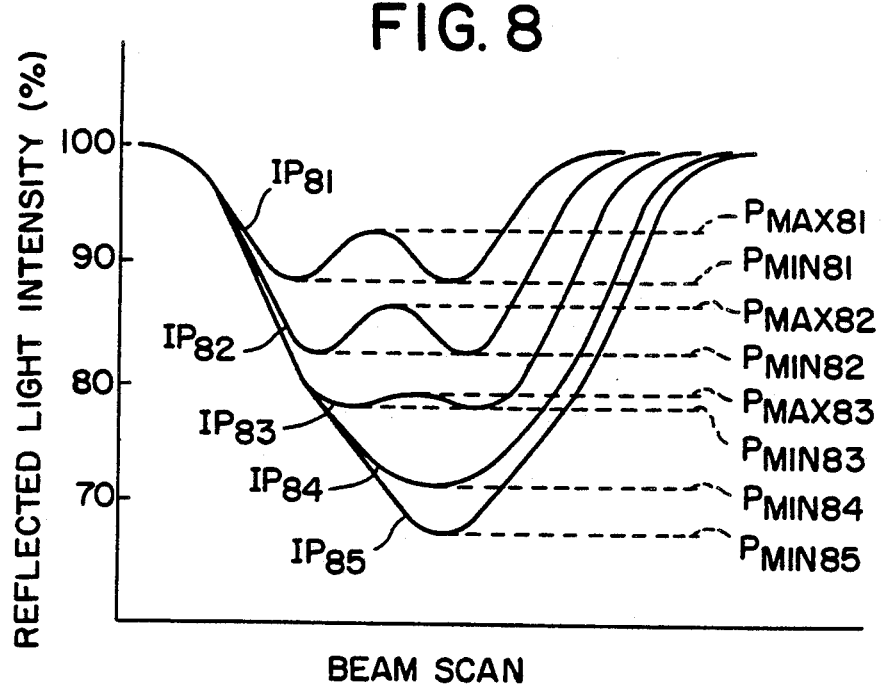
FIGS. 8 and 9 are graphs for explaining the principle of the present invention, showing a series of reflected light intensity patterns derived from sample dimensions under the scanning operation using the twin laser beam.

FIG. 8 shows, by way of example, a series of reflected light intensity sample patterns $IP_{81}$, $IP_{82}$, $IP_{83}$, $IP_{84}$, and $IP_{85}$ prepared with respect to sample dimensions $g=0.3$, $g=0.5$, $g=0.7$, $g=0.9$ and $g=1.0$, respectively, under the conditions PP (peak pitch of the twin light beam)=0.8 and $r$ (reflectivity of the measuring zone)=0.5. As can be understood from the foregoing, a reflected light intensity distribution represented by each of the sample intensity patterns $IP_{81}$, $IP_{82}$, $IP_{83}$, $IP_{84}$, and $IP_{85}$ normalized with respect to the reflected light intensity of the twin light beam reflected from the surface of the substrate, which is assumed to be 100%. As can be seen from FIG. 8, the intensity patterns $IP_{81}$, $IP_{82}$ and $IP_{83}$ have a W-shape and the intensity patterns $IP_{84}$ and $IP_{85}$ have a V-shape. From this, it can be assumed that as $g$ becomes larger, a reflected light intensity pattern gradually changes from the W-shape to the V-shape. Although a reflected light intensity pattern having the U-shape is not shown in FIG. 8, it can be assumed that the U-shaped intensity pattern exists between the intensity patterns $IP_{83}$ and $IP_{84}$ (0.7 < g < 0.9).

As shown in FIG. 8, the intensity patterns $IP_{81}$, $IP_{82}$, and $IP_{83}$ include the maximum peak values $P_{MAX81}$, $P_{MAX82}$, and $P_{MAX83}$, and the minimum peak values $P_{MIN81}$, $P_{MIN82}$, and $P_{MAX83}$, respectively, and the intensity patterns $IP_{84}$ and $IP_{85}$ include the minimum peak values $P_{MIN84}$ and $P_{MIN85}$, respectively. In other words, the maximum peak values $P_{MAX81}$, $P_{MAX82}$, and $P_{MAX83}$ represent the intensity patterns $IP_{81}$, $IP_{82}$, and $IP_{83}$, respectively, and the minimum peak values $P_{MIN81}$, $P_{MIN82}$, $P_{MIN83}$, $P_{MIN84}$, and $P_{MIN85}$ represent the intensity patterns $IP_{81}$, $IP_{82}$, $IP_{83}$, $IP_{84}$, and $IP_{85}$, respectively.

Figure 9:
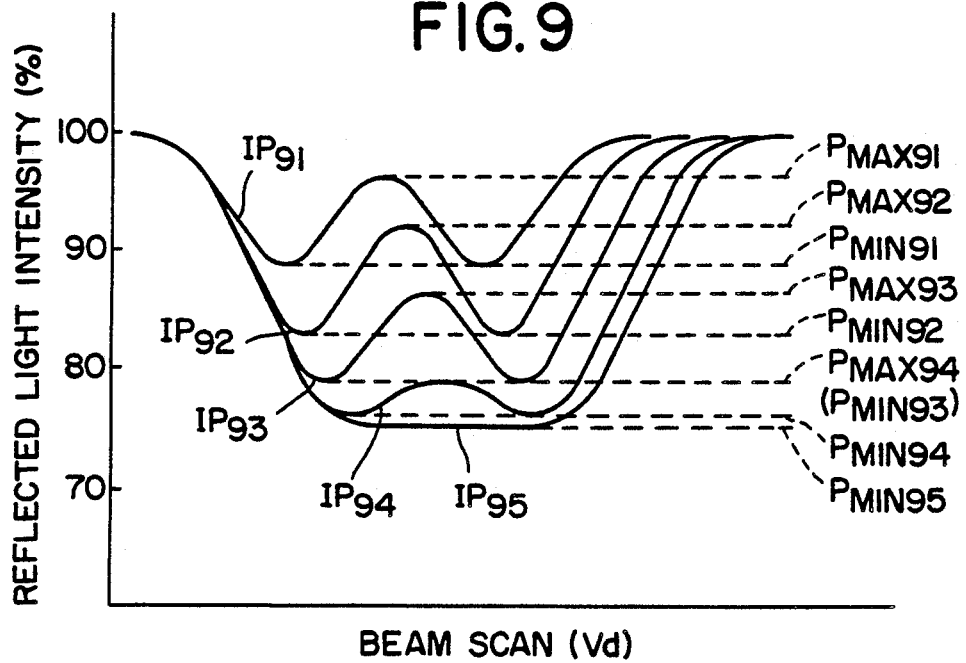

FIG. 9 shows another series of reflected light intensity sample patterns $IP_{91}$, $IP_{92}$, $IP_{93}$, $IP_{94}$, and $IP_{95}$ prepared with respect to sample dimensions $g=0.3$, $g=0.5$, $g=0.7$, $g=0.9$, and $g=1.0$, respectively, under the conditions PP=1.0 and $r=0.5$. As can be seen from FIG. 9, the intensity patterns $IP_{91}$, $IP_{92}$, $IP_{93}$, and $IP_{94}$ have a W-shape and only the intensity pattern $IP_{95}$ has a U-shape. As can be seen from FIG. 9, the intensity patterns $IP_{91}$, $IP_{92}$, $IP_{93}$, and $IP_{95}$ have the W-shape and only the intensity pattern $IP_{95}$ has the U-shape. Accordingly, it can be assumed that, as g becomes larger, a reflected light intensity pattern gradually changes from the W-shape to the U-shape. This tendency is similar to that of FIG. 8.

In FIG. 9, it should be noted that the intensity pattern $IP_{95}$ derived from the sample dimension g (1.0) which is equal to the peak pitch PP (1.0), has the U-shape. Accordingly, it can be assumed that a reflected light intensity pattern derived from a sample dimension larger than the peak pitch PP (1.0) has the V-shape Also, it can be assumed that, in FIG. 8, a reflected light intensity pattern derived from a sample dimension g (0.8) equal to the peak pitch PP (0.8) has a complete U-shape. Namely, when the peak pitch PP of the twin light beam is fixed, it can be assumed that a reflected light intensity pattern derived from a dimension smaller than the peak pitch PP has the W-shape, and that a reflected light intensity pattern derived from a dimension larger than the peak pitch PP has the V-shape.

As shown in FIG. 9, the maximum peak values $P_{MAX91}$, $P_{MAX92}$, $P_{MAX93}$, and $P_{MAX94}$ represent the intensity patterns $IP_{91}$, $IP_{92}$, $IP_{93}$, and $IP_{94}$, respectively, and the minimum peak values $P_{MIN91}$, $P_{MIN92}$, $P_{MIN93}$, $P_{MIN94}$ and $P_{MIN95}$ represent the intensity patterns $IP_{91}$, $IP_{92}$, $IP_{93}$, $IP_{94}$, and $IP_{95}$, respectively.

Figure 10:
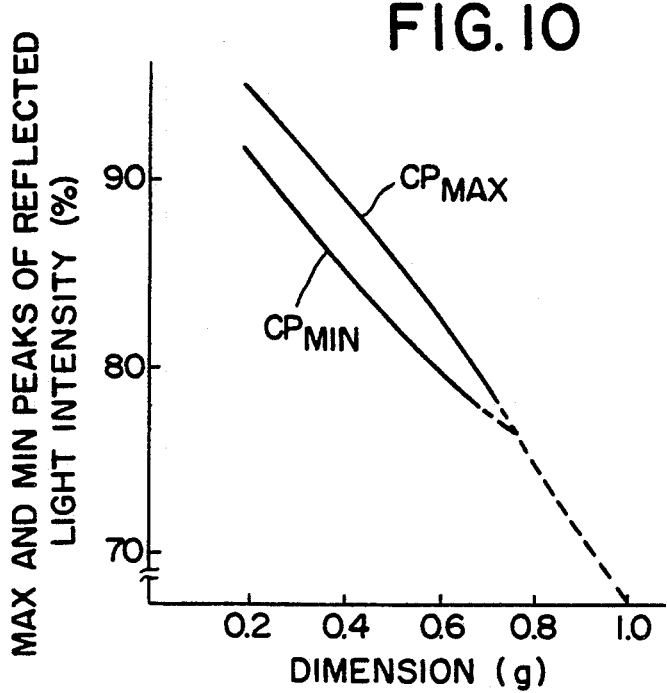
FIG. 10 is a graph for explaining the principle of the present invention, showing characteristic curves of minimum and maximum peak values obtained from the series of reflected light intensity patterns.

FIG. 10 shows a graph in which two characteristics $CP_{MAX}$ and $CP_{MIN}$ are drawn. The characteristic $CP_{MAX}$ is a curve obtained by plotting the maximum peak values $P_{MAX81}$, $P_{MAX82}$, and $P_{MAX83}$ read from the series of reflected light intensity patterns $IP_{81}$, $IP_{82}$, $IP_{83}$, $IP_{84}$, and $IP_{85}$, and the characteristic $CP_{MIN}$ is a curve obtained by plotting the minimum peak values $P_{MIN81}$, $P_{MIN82}$, $P_{MIN83}$, $P_{MIN84}$, and $P_{MIN85}$ read therefrom.

By using the characteristics $CP_{MAX}$ and $CP_{MIN}$, it is possible to find an unknown dimension $g_0$. In particular, a reflected light intensity data pattern is prepared on the basis of a reflected light intensity information detected when a measuring zone including the unknown dimension g is scanned with the twin light beam. Maximum and minimum peaks are then read from the reflected light intensity data pattern, and thus it is possible to read two distance values $g_1$ and $g_2$ from the characteristics $CP_{MAX}$ and $CP_{MIN}$ corresponding to the maximum and minimum peak values, respectively, obtained from the reflected light intensity data pattern. The distance values $g_1$ and $g_2$ are expected to be the same, but in practice, rarely match. Therefore, when a difference between the distance values $g_1$ and $g_2$ falls within a permissible range, a mean value of the different distance values $g_1$ and $g_2$ is evaluated as a true value of the unknown dimension $g_0$.

According to another aspect of the present invention, a dimension between the opposed edges formed on a substrate is measured under the condition that a reflectivity $r$ of the measuring zone between the opposed edges is not known. In this case, to compare a reflected light intensity data pattern derived from a dimension to be measured between the opposed edges with a series of reflected light intensity sample patterns prepared with respect to predetermined sample dimensions selected on each of predetermined sample reflectivities, at least two kinds of reference data are selected from the series of reflected light intensity sample patterns. In particular, two kinds of reference data may consist of two kinds of the maximum peak values $P_{MAX}$ of the series of reflected light intensity sample patterns, the minimum peak values $P_{MIN}$ thereof, and the integrated values $V_{INT}$ thereof.

Figure 11:
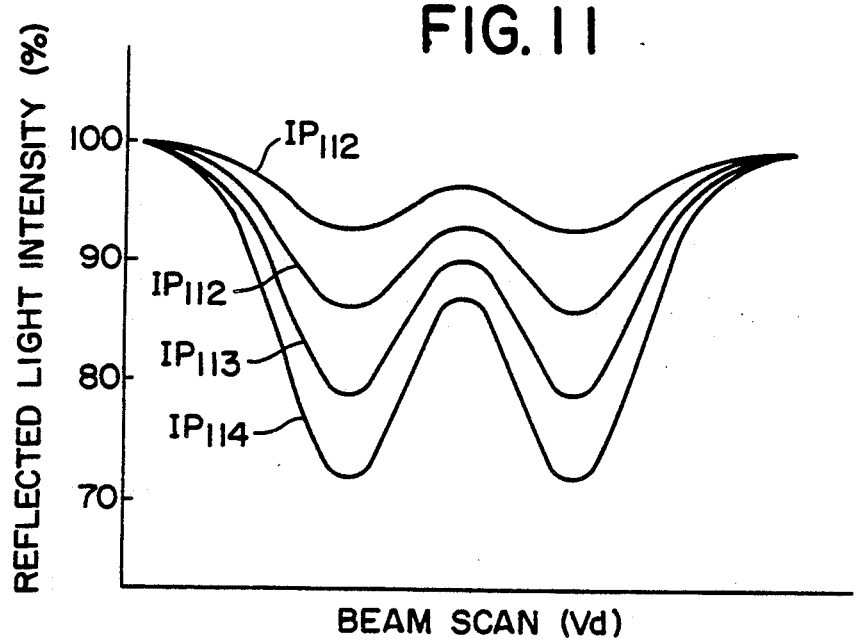
FIG. 11 is a graph for explaining the principle of the present invention, showing a series of reflected light intensity patterns derived from sample dimensions under the scanning operation using the twin laser beam.

FIG. 11 shows, by way of example, a series of reflected light intensity sample patterns $IP_{111}$, $IP_{112}$, $IP_{113}$, and $IP_{114}$ which are prepared with respect to sample reflectivities $r=0.8$, $r=0.6$ $r=0.4$ and $r=0.2$, respectively under the conditions $g=0.5$ and $PP=1.0$. Similarly, a series of reflected light intensity patterns can be prepared with respect to the sample reflectivities $r=0.8$, $r=0.6$, $r=0.4$ and $r=0.2$ on each of other sample dimensions such as $g=0.3$, $g=0.7$, $g=0.9$ and $g=1.0$, the peak pitch $PP=1.0$ being fixed. Each of the reflected light patterns included in each series has the minimum and maximum peak values $P_{MIN}$ and $P_{MAX}$ as long as it is the W-shaped pattern. As apparent from the foregoing, one of the various minimum and maximum peak values $P_{MIN}$ and $P_{MAX}$ represents the corresponding intensity pattern. As one kind of reference data, it is possible to pick up an integrated value $V_{INT}$ from each of the reflected light patterns included in each series, this integrated value $V_{INT}$ also representing the corresponding intensity pattern. These kinds of reference data are used to obtain the various characteristics shown in FIGS. 12, 13, and 14.

Figure 12:
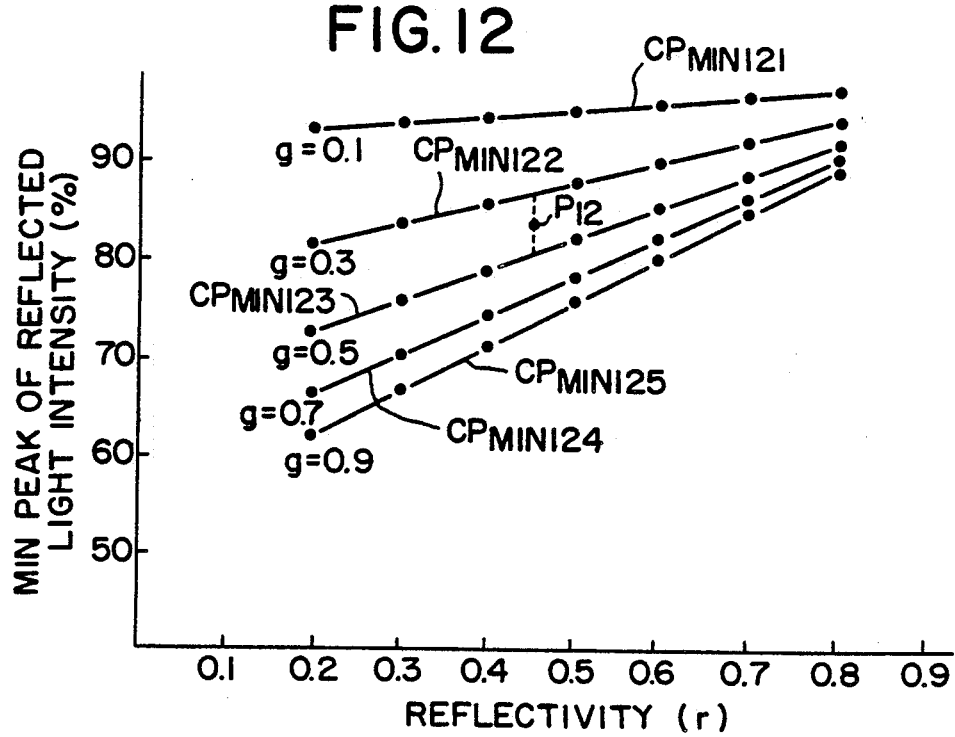
FIGS. 12 to 14 are graphs for explaining the principle of the present invention, showing characteristics of the minimum and maximum peak values and integrated values of the series of reflected light intensity patterns.

FIG. 12 shows a graph in which five characteristics $CP_{MIN121}$, $CP_{MIN122}$, $CP_{MIN123}$, $CP_{MIN124}$, and $CP_{MIN125}$ are drawn. The characteristics $CP_{MIN121}$, $CP_{MIN122}$, $CP_{MIN123}$, $CP_{MIN124}$, and $CP_{MIN125}$ are obtained by plotting the various minimum peak values $P_{MIN}$ with respect to the sample reflectivities $r$. As can be seen from FIG. 12, the characteristics $CP_{MIN121}$ shows a relationship between the reflectivities $r$ and the various minimum peak values $P_{MIN}$ when $g=0.1$, the characteristic $CP_{MIN122}$ shows a relationship between the reflectivities $r$ and the various minimum peak values $P_{MIN}$ when $g=0.3$, the characteristic $CP_{MIN123}$ shows a relationship between the reflectivities $r$ and the various minimum peak values $P_{MIN}$ when $g=0.5$, the characteristic $CP_{MIN124}$ shows a relationship between the reflectivities $r$ and the various minimum peak values $P_{MIN}$ when $g=0.7$, and the characteristic $CP_{MIN125}$ shows a relationship between the reflectivities $r$ and the various minimum peak values $P_{MIN}$ when $g=0.9$.

Figure 13:
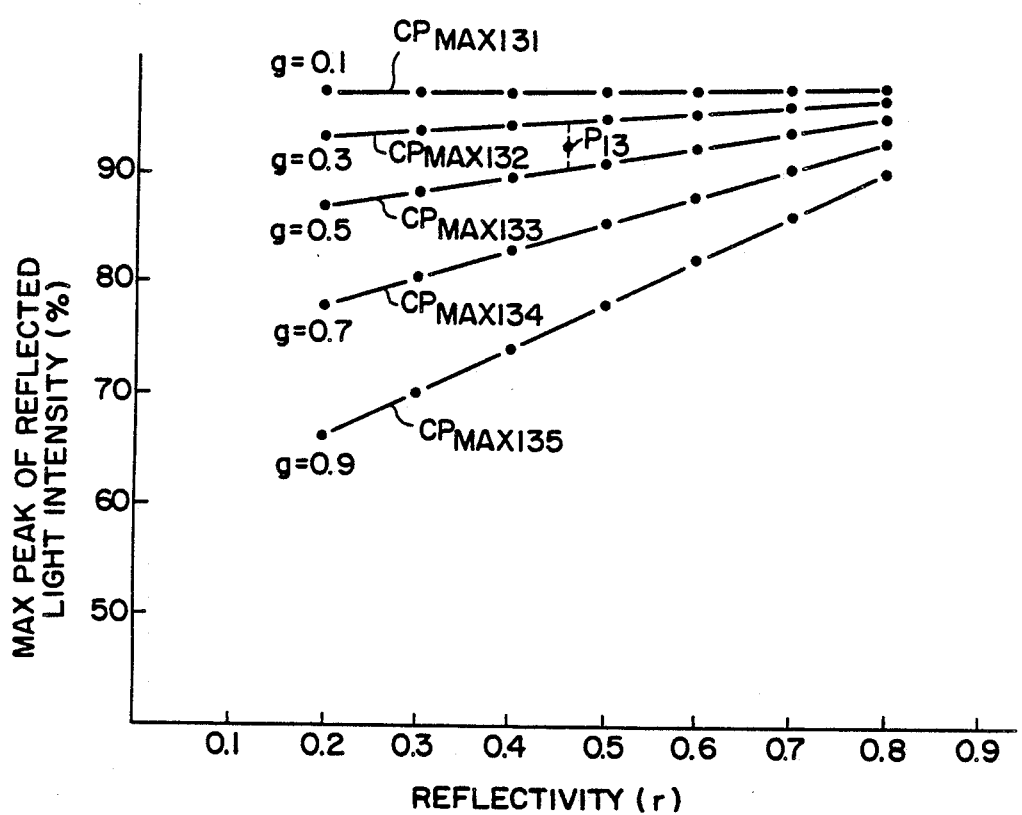

FIG. 13 shows a graph in which five characteristics $CP_{MAX131}$, $CP_{MAX132}$, $CP_{MAX133}$, $CP_{MAX134}$, and $CP_{MAX135}$ are drawn. The characteristics $CP_{MAX131}$, $CP_{MAX132}$, $CP_{MAX133}$, $CP_{MAX134}$, and $CP_{MAX135}$ are obtained by plotting the various maximum peak values $CP_{MAX}$ with respect to the sample reflectivities $r$. As can be seen from FIG. 13, the characteristic $CP_{MAX131}$ shows a relationship between the reflectivities $r$ and the various maximum peak values $P_{MAX}$ when $g=0.1$, the characteristic $CP_{MAX132}$ shows a relationship between the reflectivities $r$ and the various maximum peak values $P_{MAX}$ when $g=0.3$, the characteristic $CP_{MAX133}$ shows a relationship between the reflectivities $r$ and the various maximum peak values $P_{MAX}$ when $g=0.5$, the characteristic $CP_{MAX134}$ shows a relationship between the reflectivities $r$ and the various maximum peak values $P_{MAX}$ when $g=0.7$ and the characteristic $CP_{MAX135}$ shows a relationship between the reflectivities $r$ and the various maximum peak values $P_{MAX}$ when $g=0.9$.

Figure 14:
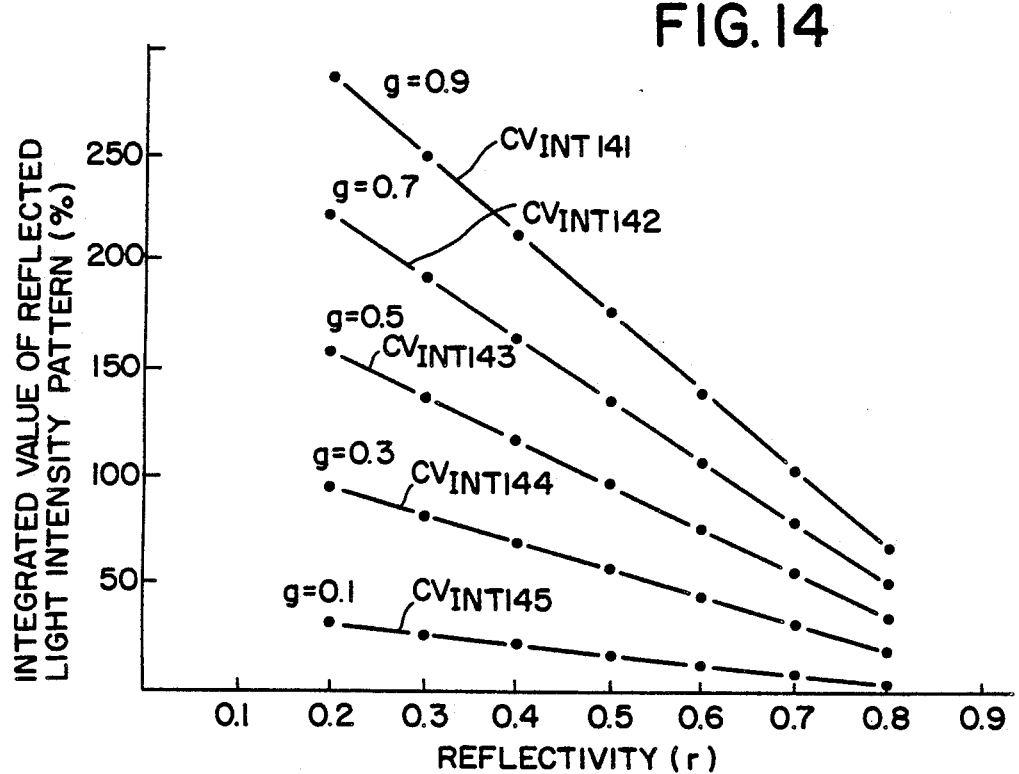
Figure 15:
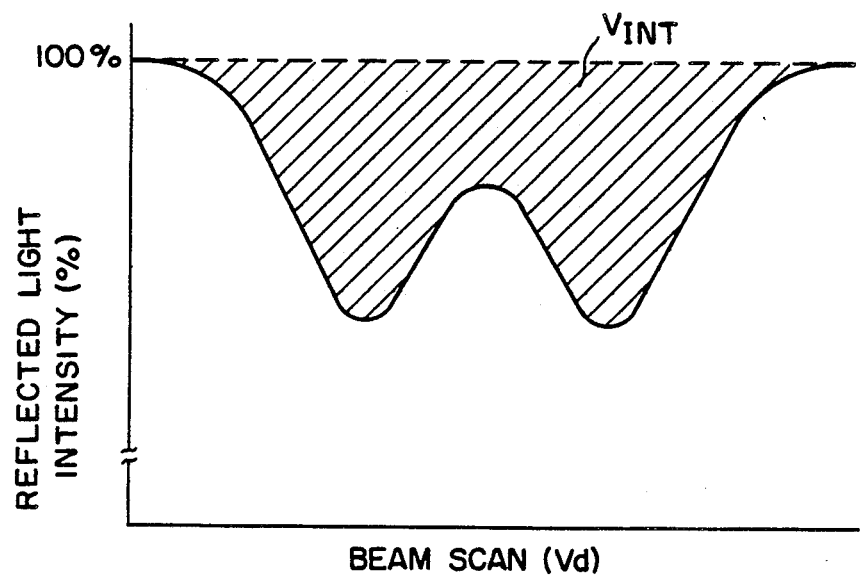
FIG. 15 is a graph for explaining the principle of the present invention, showing an integrated value as a hatched area of a representative reflected light intensity pattern.

FIG. 14 shows a graph in which five characteristics $CV_{INT141}$, $CV_{INT142}$, $CV_{INT143}$, $CV_{INT144}$, and $CV_{INT145}$ are drawn. The characteristics $CV_{INT141}$, $CV_{INT142}$, $CV_{INT143}$, $CV_{INT144}$, and $CV_{INT145}$ are obtained by plotting the various integrated values $V_{INT}$ with respect to the sample reflectivities $r$. The various integrated values $V_{INT}$ are also given as a normalized value. For this normalization, an integrated value $V_{INT}$ of a reflected light intensity pattern shown in FIG. 15 is selected and is assumed to be 100%. In FIG. 15, the integrated value $V_{INT}$ is shown as a hatched area. Accordingly, the other various integrated values $V_{INT}$ are also shown as an area corresponding to the hatched area of FIG. 15. Note, the reflected light intensity pattern of FIG. 15 is obtained under the conditions $PP=1.0$, $g=0.5$ and $r=0.5$. As can be seen from FIG. 14, the characteristic $CV_{INT141}$ shows a relationship between the reflectivities $r$ and the various integrated values $V_{INT}$ when $g=0.9$, the characteristic $CV_{INT142}$ shows a relationship between the reflectivities $r$ and the various integrated values $V_{INT}$ when $g=0.7$, the characteristic $CV_{INT143}$ shows a relationship between the reflectivities $r$ and the various integrated values $V_{INT}$ when $g=0.5$, the characteristic $CV_{INT144}$ shows a relationship between the reflectivities $r$ and the various integrated values $V_{INT}$ when $g=0.3$, and the characteristic $CV_{INT145}$ shows a relationship between the reflectivities $r$ and the various integrated values $V_{INT}$ when $g=0.1$.

If at least one kind of data selected from a minimum peak value, a maximum peak value, and an integrated value are obtained from a reflected light intensity data pattern prepared for an unknown dimension $g_0$, and if a reflectivity of the measuring zone to be scanned with the twin beam is previously known by, for example, carrying out an actual measurement, by using at least two of the characteristics $CP_{MAX}$, $CP_{MIN}$ and $CV_{INT}$, it is possible to find a value of the unknown dimension $g_0$. It is also possible to read two values $g_1$ and $g_2$ as a distance value to be measured from two of the characteristics $CP_{MAX}$, $CP_{MIN}$ and $CV_{INT}$ obtained from the reflected light intensity data pattern, in substantially the same manner as mentioned above. For example, if a minimum peak and a maximum peak are obtained from the reflected light intensity data pattern as a value of 83% and a value of 92%, respectively, and if the reflectivity $r$ is known as a ratio of 0.45, two plots $P_{12}$ and $P_{13}$ can be obtained in FIGS. 12 and 13, respectively, so that the two values $g_1$ and $g_2$ (about 0.4) can be found by an interpolation, whereby a mean of the two values $g_1$ and $g_2$ may be evaluated as a true distance value of the unknown dimension $g_0$.

Even if it is impossible to determine a reflectivity $r$ of the measuring zone, the measurement can be carried out by at least two kinds of the three kinds of reference data consisting of the minimum peak values $P_{MIN}$, the maximum peak values $P_{MAX}$ and the integrated values $V_{INT}$, respectively.

Figure 16:
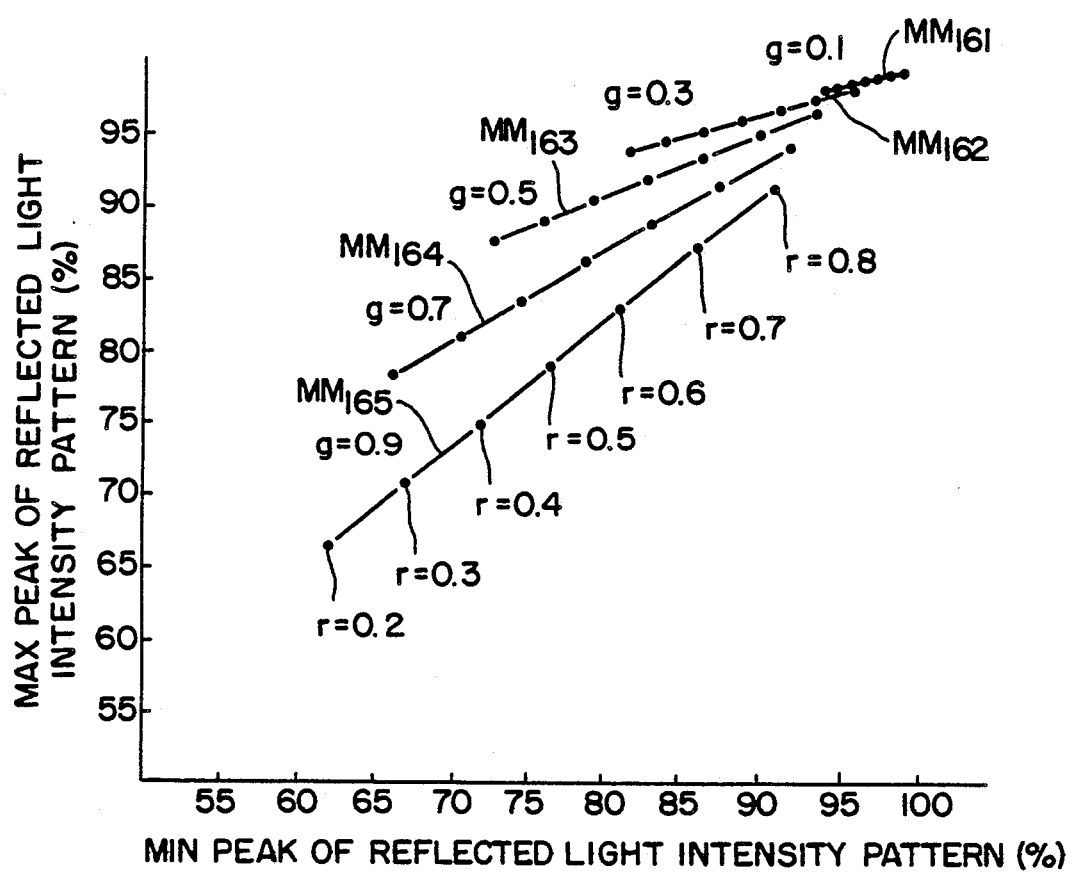
FIGS. 16 and 17 are graphs for explaining the principle of the present invention, showing characteristics among the minimum and maximum peak values and the integrated values of the series of reflected light intensity patterns.

FIG. 16 shows a graph in which five characteristics $MM_{161}$, $MM_{162}$, $MM_{163}$, $MM_{164}$, and $MM_{165}$ are drawn. The characteristics $MM_{161}$ $MM_{162}$, $MM_{163}$, $MM_{164}$, and $MM_{165}$ are obtained by plotting the minimum peak values $P_{MIN}$ and the maximum peak values $P_{MAX}$ as parameters of the sample dimensions g and the sample reflectivity r.

Figure 17:
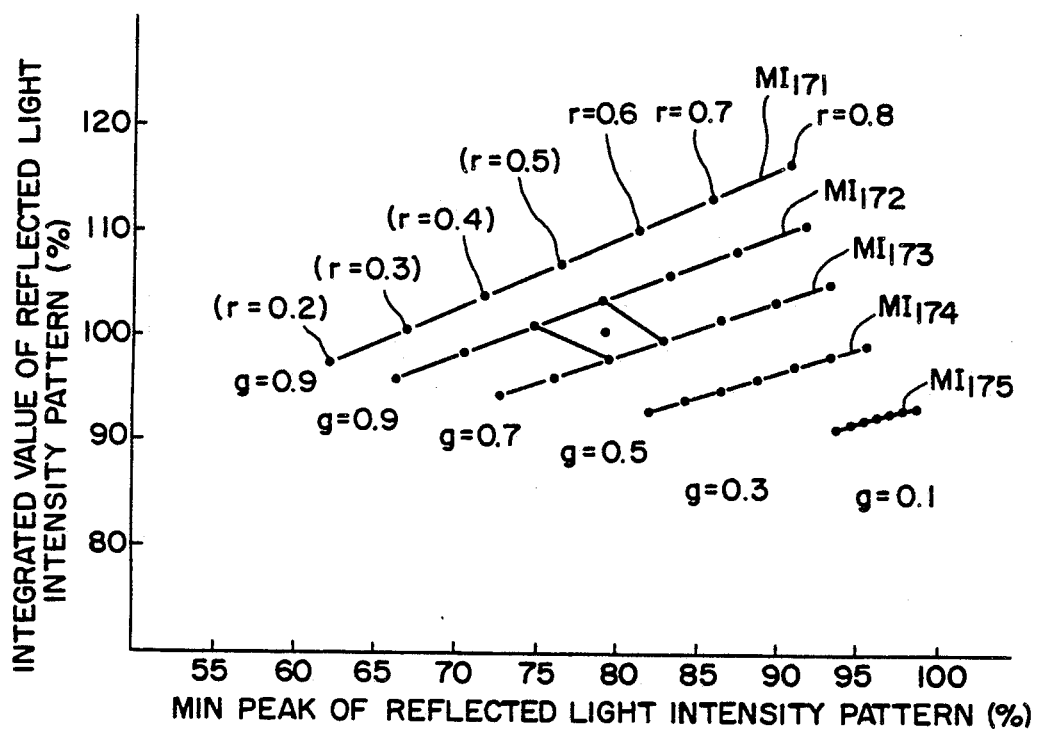

FIG. 17 shows a graph in which five characteristics $IM_{171}$, $IM_{172}$, $IM_{173}$, $IM_{174}$, and $IM_{175}$ are drawn. The characteristics $IM_{171}$, $IM_{172}$, $IM_{173}$, $IM_{174}$, and $IM_{175}$ are obtained by plotting the minimum peak values $P_{MIN}$ and the integrated values $V_{INT}$ as parameters of the sample dimensions g and the sample reflectivity r.

It can be easily understood that, if a minimum peak value, a maximum peak value and an integrated value are obtained from a reflected intensity data pattern prepared for an unknown dimension $g_0$, it is possible to find two distance values $g_1$ and $g_2$ from FIGS. 16 and 17, respectively, by an interpolation, whereby a mean of the two values $g_1$ and $g_2$ may be evaluated as a true distance value of the unknown dimension $g_0$. Of course, only one of the two values $g_1$ and $g_2$ may be evaluated as a distance value of the unknown dimension $g_0$.

According to yet another aspect of the present invention, prior to the measurement, it is determined whether or not a reflected light intensity data pattern obtained from the measuring zone is correct. In particular, if fine dust or foreign matter exists in the measuring zone, the reflected light intensity data pattern is distorted so that the measurement cannot be accurately carried out. The present invention is also directed to the detection of a distortion of the reflected light intensity pattern, to enhance the reliability of the measurement.

Figure 18:
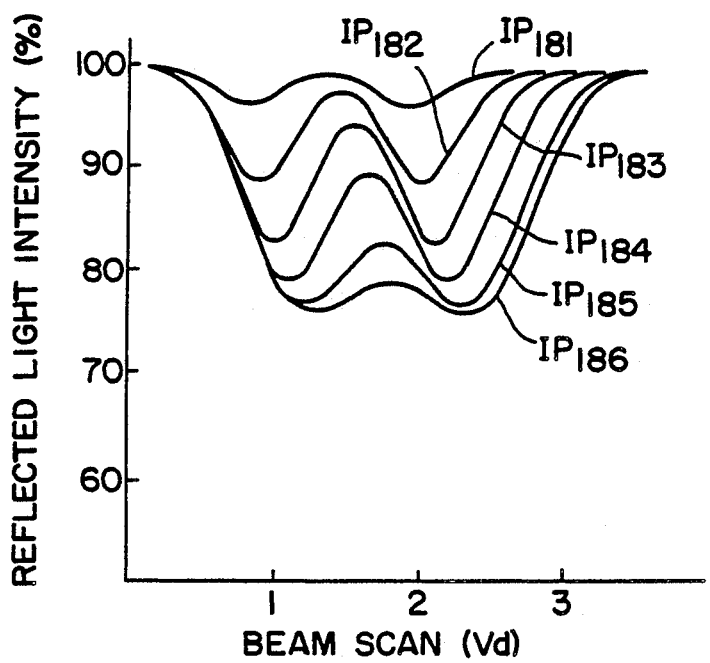
FIGS. 18 and 19 are graphs for explaining the principle of the present invention, showing a series of reflected light intensity patterns derived from sample dimensions under the scanning operation using the twin laser beam.

FIG. 18 shows a series of reflected light intensity sample pattern $IP_{181}$, $IP_{182}$, $IP_{183}$, $IP_{184}$, and $IP_{185}$ prepared with respect to sample dimensions $g = 0.1$, $g = 0.3$, $g = 0.5$, $g = 0.7$, $g = 0.9$ and $g = 1.0$, respectively, under the conditions $PP = 1.1$ and $r = 0.5$. Note, the requirements for preparation of the sample patterns $IP_{181}$, $IP_{182}$, $IP_{183}$, $IP_{184}$ and $IP_{185}$ are the same as in FIG. 8 except that the sample pattern obtained from the sample dimension $g = 1.0$ is added, and that PP is not 0.8.

Figure 19:
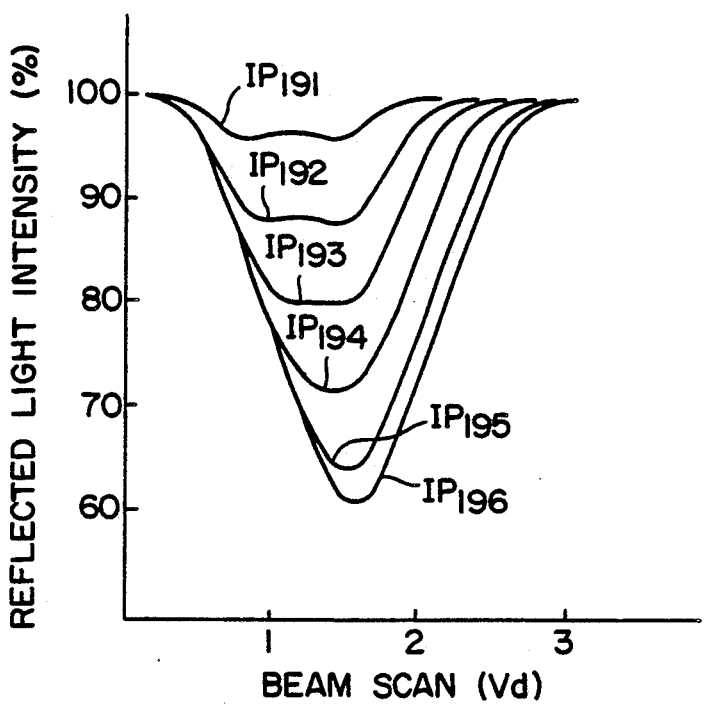

FIG. 19 shows a series of reflected light intensity sample patterns $IP_{191}$, $IP_{192}$, $IP_{193}$, $IP_{194}$, and $IP_{195}$ prepared with respect to sample dimensions $g = 0.1$, $g = 0.3$, $g = 0.5$, $g = 0.7$, $g = 0.9$ and $g = 1.0$, respectively, under the conditions $PP = 0.6$ and $r = 0.5$.

As can be seen from FIGS. 18, 8, and 19, as a peak pitch PP of the twin light beam becomes larger and as a dimension to be measured becomes smaller, the reflected light intensity pattern has a tendency to exhibit a W-shape Conversely, as a peak pitch PP of the twin light beam becomes smaller and as a dimension to be measured become larger, the reflected light intensity pattern has a tendency to exhibit a V-shape. As shown in FIG. 18, if a dimension to be measured is less than the spot diameter D of the original laser beam L and if a peak pitch PP is more than the spot diameter D ($PP = 1.1$), all of the reflected light intensity patterns must exhibit the W-shape. Accordingly, if a reflected light intensity pattern obtained from a known dimension (less than D) by scanning with the twin laser beam ($PP = 1.1$) exhibits shapes other than the W-shape, it is possible to determine that the measurement cannot be correctly carried out.

Note, in comparison with the U-shaped or V-shaped pattern, it is easier to determine whether or not the W-shaped pattern is correct because the correct W-shaped pattern must be symmetrical with respect to the maximum peak.

Furthermore, the present invention is directed to a measurement wherein the scanning operation is repeated at least twice, a peak pitch of the twin laser beam being varied in each scanning operation.

FIG. 20 shows a graph in which five characteristics $CP_{MIN201}$, $CP_{MIN202}$, $CP_{MIN203}$, $CP_{MIN204}$, and $CP_{MIN205}$ are drawn. The characteristics $CP_{MIN201}$, $CP_{MIN202}$, $CP_{MIN203}$, $CP_{MIN204}$, and $CP_{MIN205}$ are obtained by plotting the various minimum peak values $P_{MIN}$ with respect to the sample reflectivities r. The various minimum peak values $P_{MIN}$ are obtained from reflected light intensity sample patterns derived from the scanning operation wherein the twin laser beam having a $PP = 1.1$ is used. As can be seen from FIG. 20 the characteristic $CP_{MIN201}$ shows a relationship between the reflectivities r and the various minimum peak values $P_{MIN}$ when $g = 0.1$, the characteristic $CP_{MIN202}$ shows a relationship between the reflectivities r and the various minimum peak values $P_{MIN}$ when $g = 0.3$, the characteristic $CP_{MIN203}$ shows a relationship between the reflectivities r and the various minimum peak values $P_{MIN}$ when $g = 0.5$, the characteristic $CP_{MIN204}$ shows a relationship between the reflectivities r and the various minimum peak values $P_{MIN}$ when $g = 0.7$, and the characteristic $CP_{MIN205}$ shows a relationship between the reflectivities r and the various minimum peak values $P_{MIN}$ when $g = 0.9$.

FIG. 21 shows a graph in which five characteristics $CP_{MAX211}$, $CP_{MAX212}$, $CP_{MAX213}$, $CP_{MAX214}$, and $CP_{MAX215}$ are drawn. The characteristics $CP_{MAX211}$, $CP_{MAX212}$, $CP_{MAX213}$ $CP_{MAX214}$, and $CP_{MAX215}$ are obtained by plotting the various maximum peak values $CP_{MAX}$ with respect to the sample reflectivities r. The various maximum peak values $P_{MAX}$ are obtained from reflected light intensity sample patterns derived from the scanning operation wherein a twin laser beam having a $PP = 1.1$ is used. As can be seen from FIG. 21, the characteristic $CP_{MAX211}$ shows a relationship between the reflectivities r and the various maximum peak values $P_{MAX}$ when $g = 0.1$, the characteristic $CP_{MAX212}$ shows a relationship between the reflectivities r and the various maximum peak values $P_{MAX}$ when $g = 0.3$, the characteristic $CP_{MAX213}$ shows a relationship between the reflectivities r and the various maximum peak values $P_{MAX}$ when $g = 0.5$, the characteristic $CP_{MAX214}$ shows a relationship between the reflectivities r and the various maximum peak values $P_{MAX}$ when $g = 0.7$, and the characteristic $CP_{MAX215}$ shows a relationship between the reflectivities r and the various maximum peak values $P_{MAX}$ when $g = 0.9$.

Figure 22:
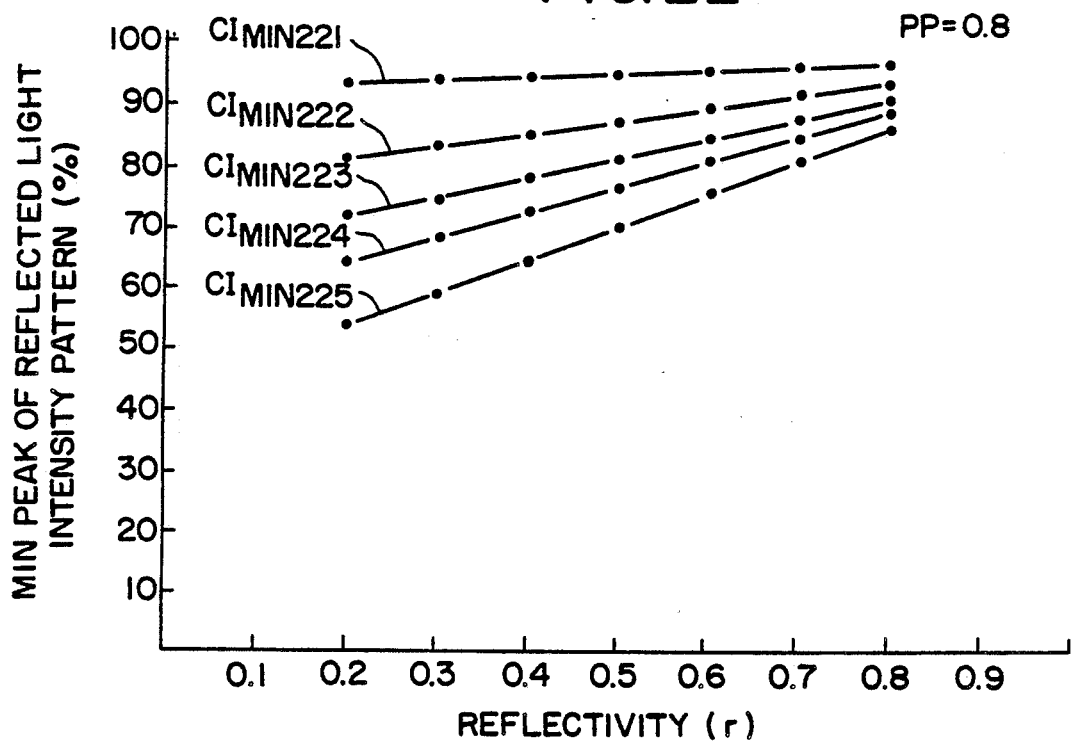

FIG. 22 shows a graph in which five characteristics $CP_{MIN221}$, $CP_{MIN222}$, $CP_{MIN223}$, $CP_{MIN224}$, and $CP_{MIN225}$ are drawn. The characteristics $CP_{MIN221}$, $CP_{MIN222}$, $CP_{MIN223}$, $CP_{MIN224}$, and $CP_{MIN225}$ are obtained by plotting the various minimum peak values $P_{MIN}$ with respect to the sample reflectivities r. The various minimum peak values $P_{MIN}$ are obtained from reflected light intensity sample patterns derived from the scanning operation wherein the twin laser beam having a $PP = 0.8$ is used. As can be seen from FIG. 22 the characteristic $CP_{MIN221}$ shows a relationship between the reflectivities r and the various minimum peak values $P_{MIN}$ when $g = 0.1$, the characteristic $CP_{MIN222}$ shows a relationship between the reflectivities r and the various minimum peak values P when $g = 0.3$, the characteristic $CP_{MIN223}$ shows a relationship between the reflectivities r and the various minimum peak values $P_{MIN}$ when g=0.5, the characteristic $CP_{MIN224}$ shows a relationship between the reflectivities r and the various minimum peak values $P_{MIN}$ when g=0.7, and the characteristic $CP_{MIN225}$ shows a relationship between the reflectivities r and the various minimum peak values $P_{MIN}$ when g=0.9.

Figure 23:
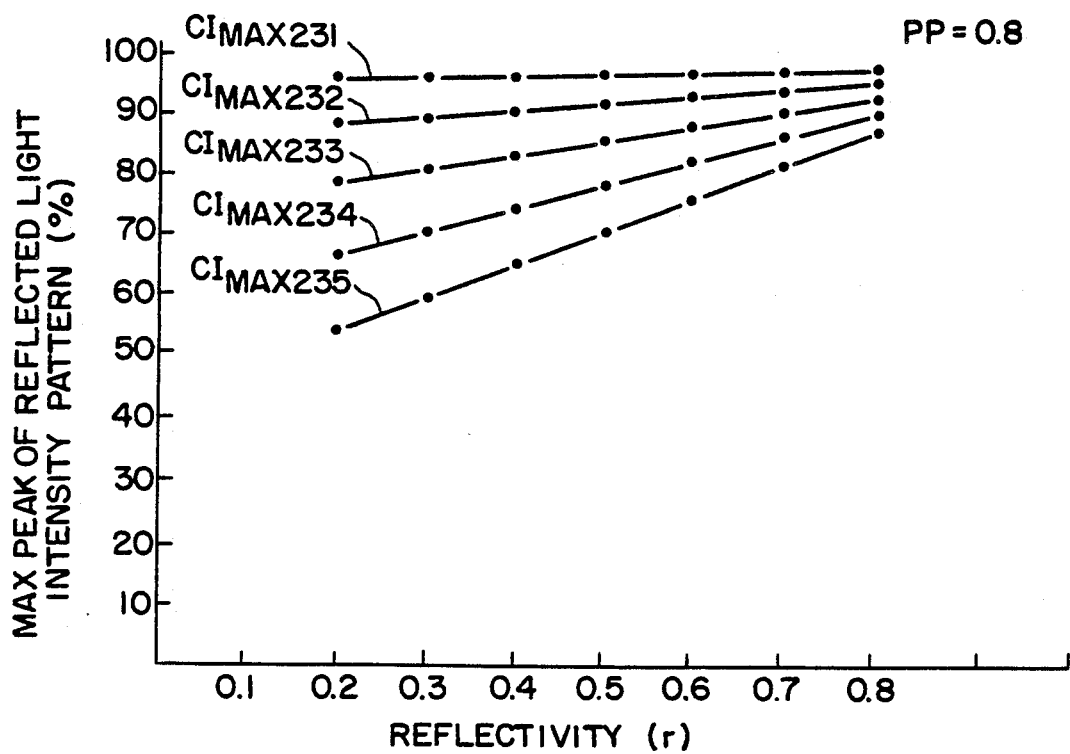

FIG. 23 shows a graph in which five characteristics $CP_{MAX231}$, $CP_{MAX232}$, $CP_{MAX233}$, $CP_{MAX234}$, and $CP_{MAX235}$ are drawn. The characteristics $CP_{MAX231}$, $CP_{MAX232}$, $CP_{MAX233}$, $CP_{MAX234}$, and $CP_{MAX235}$ are obtained by plotting the various maximum peak values $CP_{MAX}$ with respect to the sample reflectivities r. The various maximum peak values $P_{MAX}$ are obtained from reflected light intensity sample patterns derived from the scanning operation wherein a twin laser beam having a PP=0.8 is used. As can be seen from FIG. 23, the characteristic $CP_{MAX231}$ shows a relationship between the reflectivities r and the various maximum peak values $P_{MAX}$ when g=0.1, the characteristic $CP_{MAX232}$ shows a relationship between the reflectivities r and the various maximum peak values $P_{MAX}$ when g=0.3, the characteristic $CP_{MAX233}$ shows a relationship between the reflectivities r and the various maximum peak values $P_{Max}$ when g=0.5, the characteristic $CP_{MAX234}$ shows a relationship between the reflectivities r and the various maximum peak values $P_{MAX}$ when g=0.7, and the characteristic $CP_{MAX235}$ shows a relationship between the reflectivities r and the various maximum peak values $P_{Max}$ when g=0.9.

As can be easily understood from FIG. 20, when a dimension g to be measured is in a range of between 0.5 and 0.9, it is difficult to carry out an accurate measurement because of a poor discreteness of the characteristics $CP_{MIN203}$ (g=0.5), $CP_{MIN204}$ (g=0.7) and $CP_{MIN205}$ (g=0.7). On the other hand, in FIG. 21 the discreteness of the characteristics $CP_{MAX211}$ (g=0.1) and $CP_{MAX212}$ (g=0.3) is poor. This means that, when a twin laser beam having the peak pitch PP =1.1 is used in the scanning operation, a dimension g of more than 0.3 and less than 0.5 can be accurately measured, but it is difficult to measure a dimension g of less than 0.3 or more than 0.5 with a high accuracy. In this case, the scanning operation is repeated with the twin beam having, for example, the peak pitch PP =0.8, because the peak pitch PP=0.8 gives the characteristics a good discreteness, as shown in FIGS. 22 and 23.

FIG. 24 shows two characteristics $P_{MIN24}$ and $P_{MAX24}$ which are obtained from FIGS. 20 and 21, respectively. In particular, the characteristic $P_{MIN24}$ is represented by the minimum peak values $P_{MIN}$ read when the reflectivity is 0.3, and the characteristic $P_{MAX24}$ is represented by the maximum peak values $P_{MAX}$ read when the reflectivity is 0.3.

FIG. 25 shows two characteristics $P_{MIN25}$ and $P_{MAX25}$ which are obtained from FIGS. 22 and 23 respectively. In particular, the characteristic $P_{MIN25}$ is represented by the minimum peak values $P_{MIN}$ read when the reflectivity is 0.3, and the characteristic $P_{MAX25}$ is represented by the maximum peak values $P_{MAX}$ read when the reflectivity is 0.3.

It can be easily understood that the four characteristics $P_{MIN24}$, $P_{MAX24}$, $P_{MIN25}$, and $P_{MAX25}$ can be suitably utilized to carry out the measurement by repeating the scanning operation twice.

According to another aspect of the present invention, a peak pitch PP of the twin laser beam is used as a parameter for the measurement.

Figure 26:
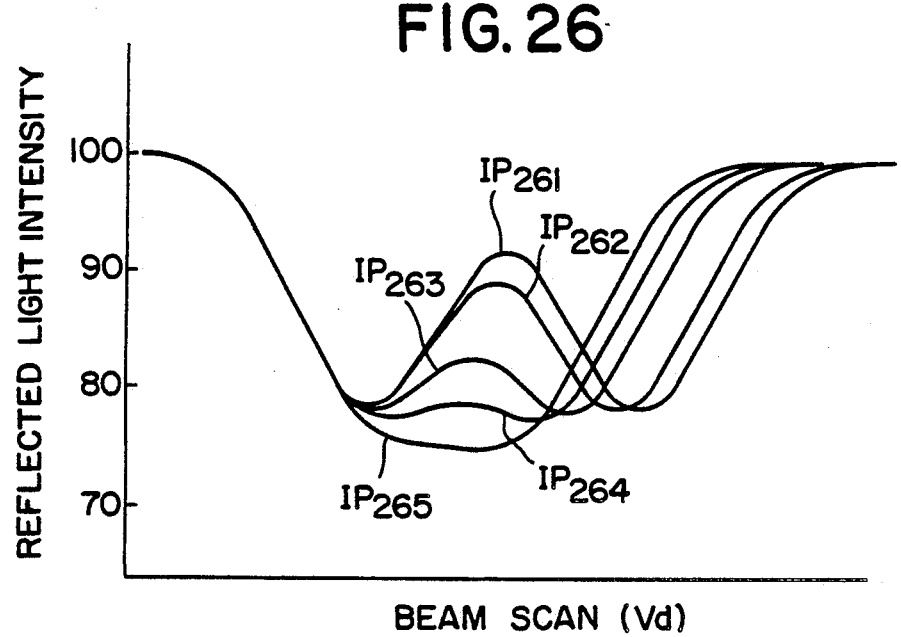
FIG. 26 is a graph for explaining the principle of the present invention, showing a series of reflected light intensity patterns derived from sample dimensions under the scanning operation using the twin laser beam.

FIG. 26 shows a series of reflected light intensity sample patterns $IP_{261}$, $IP_{262}$, $IP_{263}$, $IP_{264}$, and $IP_{265}$ prepared with respect to predetermined sample peak pitches PP=1.2, PP=1.1, PP=0.9 PP =0.8 and PP=0.7, respectively, under the condition g =0.5 and r=0.5. As can be seen from FIG. 26, each of the peak pitches PP=1.2, PP=1.1, PP=0.9, PP=0.8 and PP=0.7 distinctly represents a corresponding pattern. Accordingly, it is possible to use the peak pitch PP of the twin laser beam as a parameter for the measurement.

Figure 27:
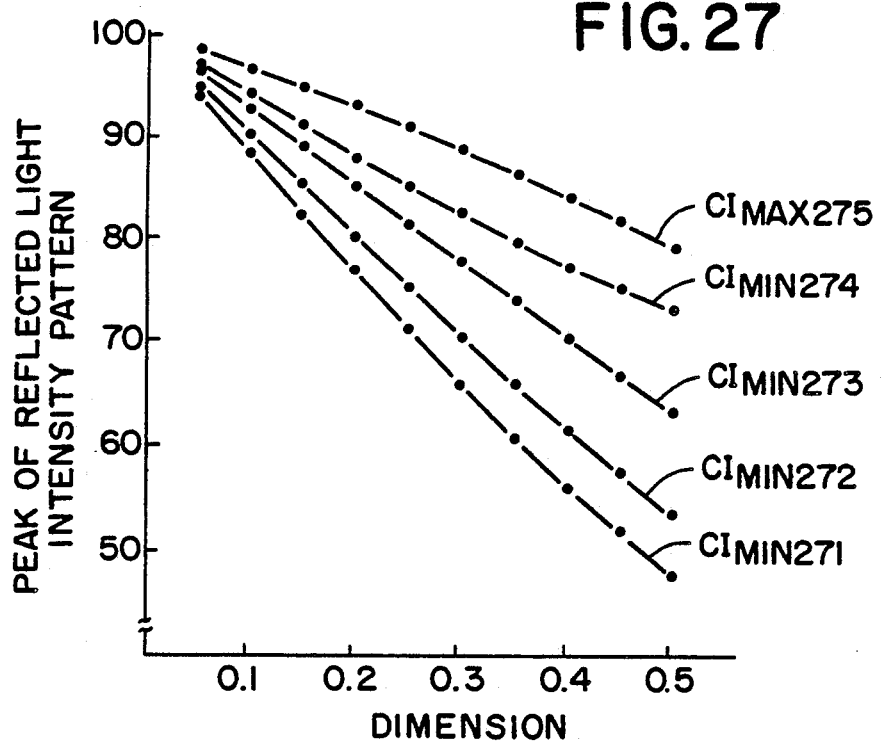
FIG. 27 is a graph for explaining the principle of the present invention, showing characteristics of minimum and maximum peak values of the series of reflected light intensity patterns.

FIG. 27 shows a graph in which five characteristics $CI_{MIN271}$, $CI_{MIN272}$, $CI_{MIN273}$, $CI_{MIN274}$, and $CI_{MAX275}$ are drawn. The five characteristics $CI_{MIN271}$, $CI_{MIN272}$, $CI_{MIN273}$, $CI_{MIN274}$, and $CI_{MAX275}$ are obtained from reflected light intensity sample patterns prepared in substantially the same manner as in FIG. 16. The characteristic $CI_{MIN271}$ shows a relationship between the various minimum peak values $P_{MIN}$ and the dimension g when PP=0.1, the characteristic $CI_{MIN272}$ shows a relationship between the various minimum peak values $P_{MIN}$ and the dimension g when PP=0.3, the characteristic $CI_{MIN273}$ shows a relationship between the various minimum peak values $P_{MIN}$ and the dimension g when PP=0.5, the characteristic $CI_{MIN274}$ shows a relationship between the various minimum peak values $P_{MIN}$ and the dimension g when PP =0.8, and the characteristic $CI_{MAX275}$ shows relationship between the various maximum peak value $P_{MAX}$ and the dimension g when PP=0.8. It can be easily understood that, if at least two peak values are read from the reflected light intensity data pattern obtained for an unknown dimension $g_0$ to be measured, it is possible to find a distance value of the unknown dimension $g_0$ in substantially the same manner as in FIG. 10.

The operation of the control circuit 40 of FIG. 1 will be now explained.

Figure 28:
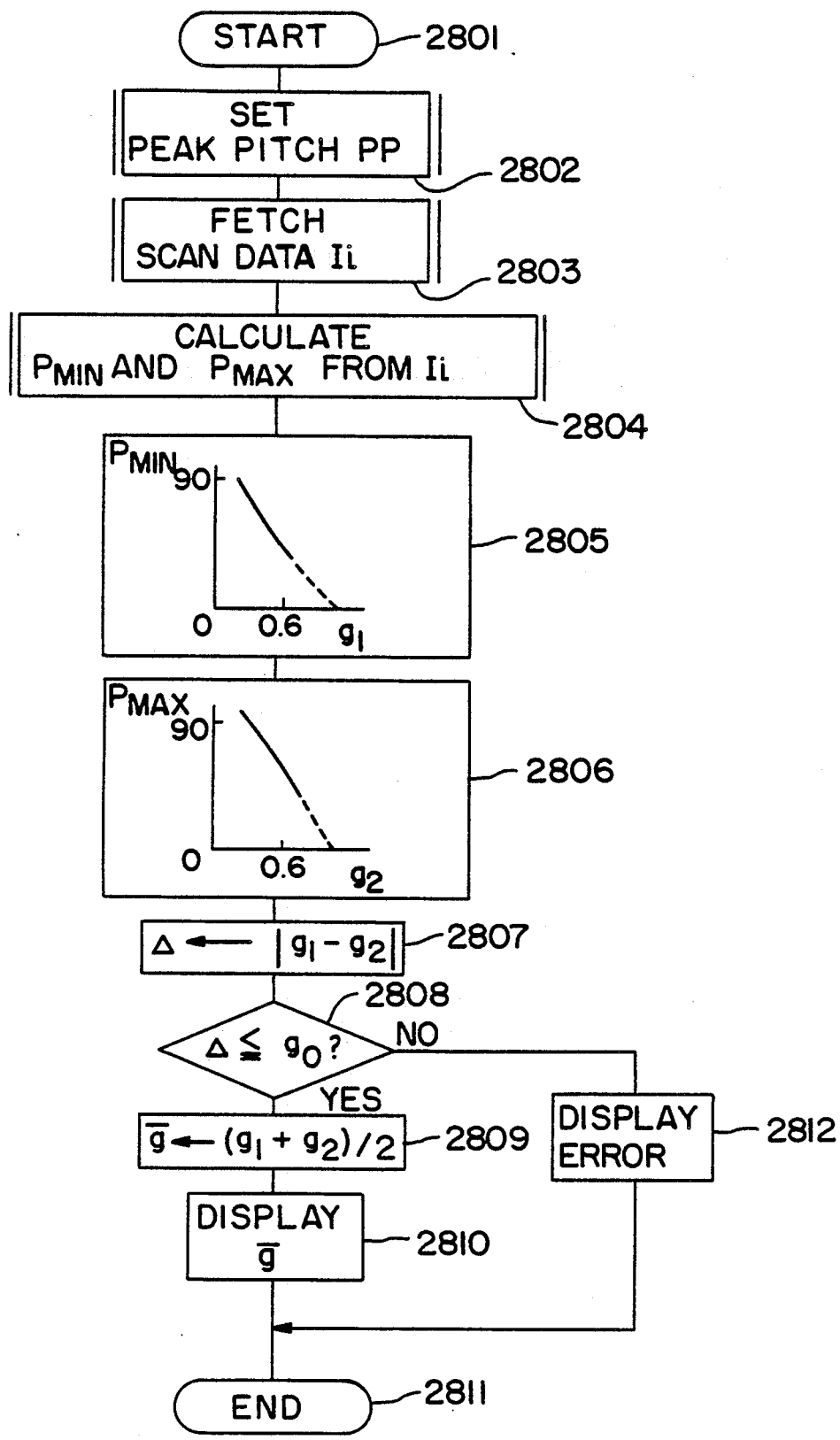
FIGS. 28 and 29 are flow charts showing the operation of the control circuit of FIG. 1.

FIG. 28 is a routine for calculating a dimension between the opposed edges formed on the substrate S from a minimum peak value and a maximum peak value obtained from a reflected light intensity pattern representing the dimension between the opposed edges.

The control is begun at step 2801 by actuating the switch SW (FIG. 1).

The control then proceeds to step 2802 in which the peak pitch PP of the twin laser beam is set at a predetermined value. In this operation, since the peak pitch PP may be fixed, if necessary, step 2802 may be eliminated. This routine will be explained hereinafter in detail.

The control then proceeds to step 2803 in which scan data I is fetched. The scan data I comprises a light intensity of the laser beam reflected from the substrate S at each of the scanning steps of one scanning operation. In the micro-dimensional measurement as mentioned above, about five hundred scanning steps can be obtained so that the scan data $I_i$ (i=0−499) can be fetched. However, the scan data $I_i$ (i=150−249) or (100−399) is fetched from the three hundred scanning steps corresponding to the middle range of the scanning operation because the starting and ending ranges thereof are deteriorated as shown in FIG. 7A. Namely, the reflected light intensity information is detected by the photo detector 38, is then applied to the A/D 50 as an analog voltage signal, and read as a digital signal. The fetched scan data $I_i$ is stored in the RAM as a reflected light intensity data pattern. The scan data fetching step 2803 will be explained hereinafter in detail.

The control proceeds to step 2804 which calculates a minimum peak value $P_{MIN}$ and a maximum peak value $P_{MIN}$ of the reflected light intensity data pattern. This calculation step 2804 will be also explained hereinafter.

At step 2805, $g_1$ is calculated from a one-dimensional map by the parameter $P_{MIN}$. This map corresponds to $CP_{min}$ of FIG. 10, and thus, the calculated $g_1$ may be considered to be a dimension to be measured between the opposed edges.

At step 2806, $g_2$ is calculated from an one-dimensional map by the parameter $P_{MAX}$. This map corresponds to $CP_{MAX}$ of FIG. 10, and thus, the calculated $g_2$ may be also considered to be a dimension to be measured between the opposed edges.

The control further proceeds to step 2807, in which a difference $\Delta$ between $g_1$ and $g_2$ is calculated by $$\Delta \leftarrow g_1 - g_2$$

At step 2808, it is determined whether or not the difference $\Delta$ is smaller than a predetermined constant $g_0$. As a result, if $\Delta \leq g_0$, the control proceeds to step 2809, which calculates the mean value $\bar{g}$ of $g_1$ and $g_2$ as follows:

$$\bar{g} \leftarrow (g_1 + g_2)/2$$

At step 2810, $\bar{g}$ is displayed at the display unit (not shown).

This routine of FIG. 28 is completed by step 2811

On the other hand, at step 2808, if $\Delta > g_0$, the control proceeds to step 2812 in which an error indicating the impossibility of measurement is displayed at the display unit, and then proceeds to step 2811 Note, the control may proceed to another step (not shown) which commands a shift of the substrate carrier 56 so that the substrates S are successively measured.

When the error is displayed, that is, when $g_1$ and $g_2$ do not fall within the permissible range ($g_0$), two cases may be considered as the main factors leading to the error display: one, the measurement is carried out under adverse circumstances such as vibration, impact or the like: the other, dirt, dust or the like is stuck on the substrate S or the substrate S per se has blemishes at the edges and/or the surfaces thereof. Accordingly, when the error is displayed, preferably the measurement is repeated.

Figures 29, 30:
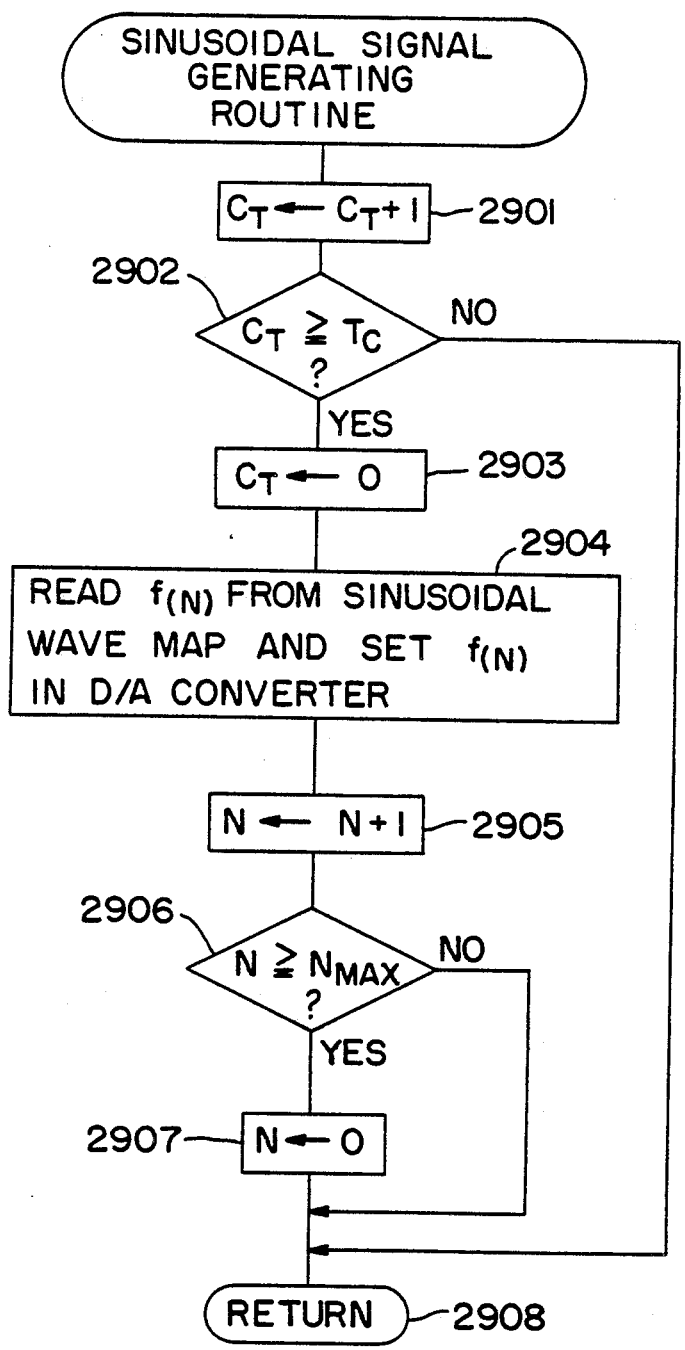
FIG. 30 is a schematic view of a sinusoidal wave signal generating map.

FIG. 29 shows a routine for generating a sinusoidal waveform signal applied to the acoustic-opical element driver to adjust the peak pitch PP of the twin laser beam in the manner as mentioned above. This routine is a time interruption routine executed at a predetermined time period.

At step 2901, a counter $C_T$ is incremented by 1.

The control then proceeds to step 2902, in which it is determined whether or not the counter $C_T$ is counted up by a constant $T_C$ which is variable for the purpose mentioned hereinafter. If $C_T \geq T_C$, the control proceeds to step 2903.

At step 2903, the counter $C_T$ is reset.

The control then proceeds to step 2904 in which f(n) is read from the sinusoidal waveform signal generating map as shown in FIG. 30, and set in the D/A 54. The control proceeds to step 2905.

At step 2905, a counter N is incremented by 1.

The control then proceeds to step 2906, in which it is determined whether or not the counter N is counted up by a constant $N_{MAX}$. If $N \geq N_{MAX}$, the control proceeds to step 2907.

At step 2907, the counter N is reset. The control proceeds to step 2908 and is returned to step 2802 of FIG. 28.

At step 2902, if $C_T < T_C$, the control proceeds to step 2908 and is then returned to step 2802 of FIG. 28.

At step 2906, if $N < N_{MAX}$, the control proceeds to step 2908 and is then returned to step 2802 of FIG. 28.

As apparent from the foregoing, a frequency of the sinusoidal waveform signal output from the D/A converter 54 is varied by changing the constant $T_C$ so that the peak pitch PP of the twin laser beam is adjusted. In the operation of FIG. 28, the peak pitch PP of the twin laser beam is not adjusted, but the adjustment is necessary when the measurement is carried out with the twin laser beam having a different peak pitch PP.

Figure 31:
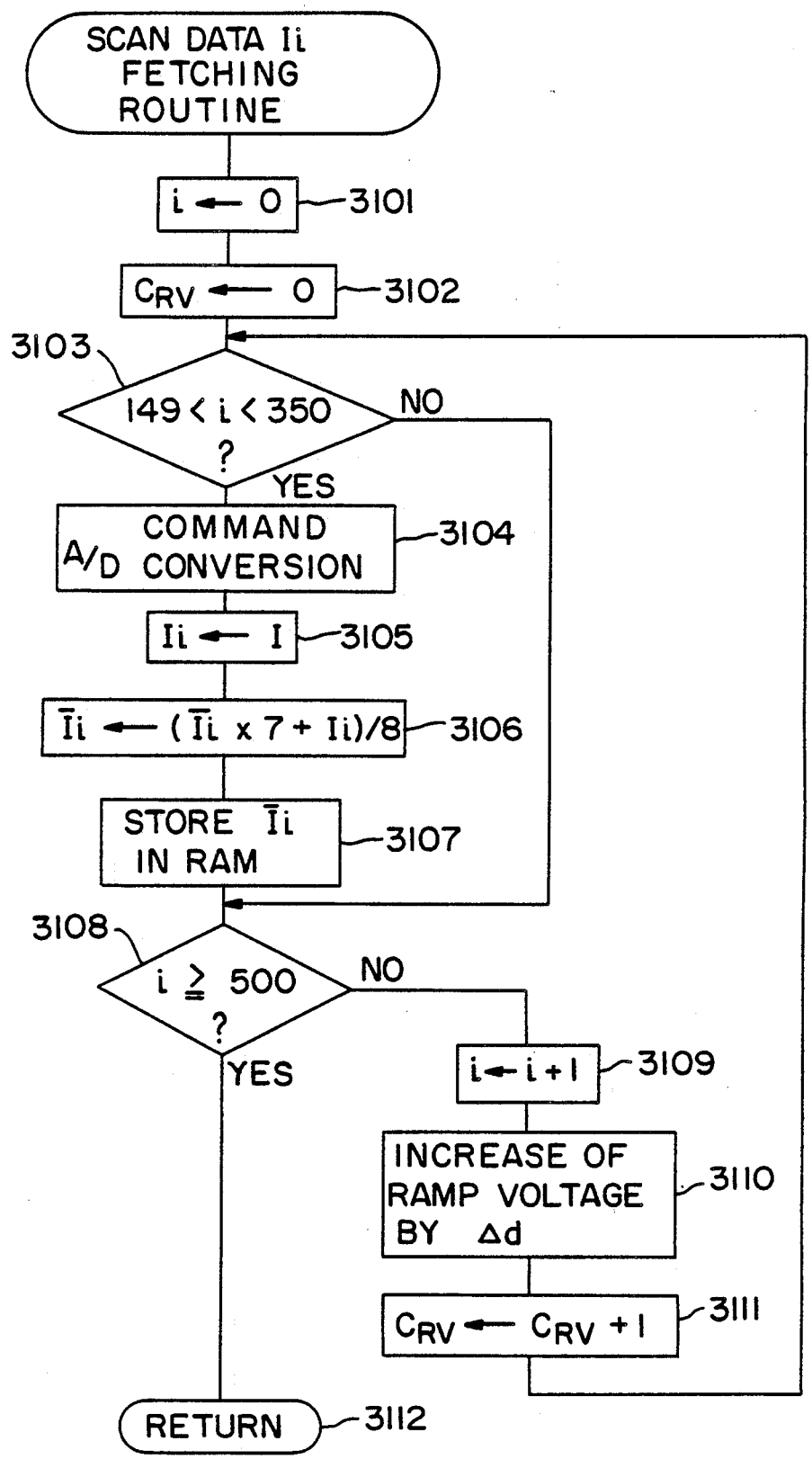

FIG. 31 shows a routine for fetching the scan data I.

At step 3101, a counter i is reset, and then at step 3102, a counter $C_{RV}$ is reset. The control proceeds to step 3103, in which a count number counted by the counter i falls within the range between 149 and 350. If $149 < i < 350$, the control proceeds to step 3104.

At step 3104, the CPU 42 generates an analog-digital conversion start command and transmits same to the A/D converter 50 so that the scan data $I_i$ is fetched. The control then proceeds to step 3104.

Step 3104, the fetched scan data I is made to be $I_i$.

The control then proceeds to step 3105 which carries out, for example, a blunt calculation, as shown below:

$$I_i \leftarrow (I_i \times 7 + i_j)/8$$

whereby the fetched data $I_i$ is smoothed. This smoothing may be carried out in the A/D 50 by a smoothing circuit (not shown).

At step 3106, the smoothed scan data $I_i$ is stored in the RAM 46.

At step 3107, if $i < 500$, the control proceeds to step 3108.

At step 3108, the counter i is incremented by 1.

The control then proceeds to step 3109, in which the CPU 42 generates a ramp voltage increasing signal and then transmits same to the D/A converter 52, whereby the ramp voltage is increased by $\Delta V_d$.

At step 3110, the counter $C_{RV}$ is incremented by 1.

The control proceeds then to step 3104. Note, as long as the count number counted by the counter i falls between 149 and 350, the routine including steps 3103 to 3110 is repeated three hundred times so that the three hundred scan data $I_i$ (i = 150 − 349) are stored in the RAM 46. These scan data form a reflected light intensity data pattern. On the other hand, if $i \leq 149$ or $i \geq 351$, the control skips steps 3104 to 3106 and proceeds to step 3107.

At step 3107, if $i \geq 500$, the control proceeds to step 3111 and then to step 2803 of FIG. 28.

Note, although the fetched scan data I is stored in $I_{150}$ to $I_{349}$ of the RAM 46 as mentioned above, it is assumed that the scan data is stored in $I_0$ to $I_{299}$, for convenience during the explanation given hereinafter.

Figure 32:
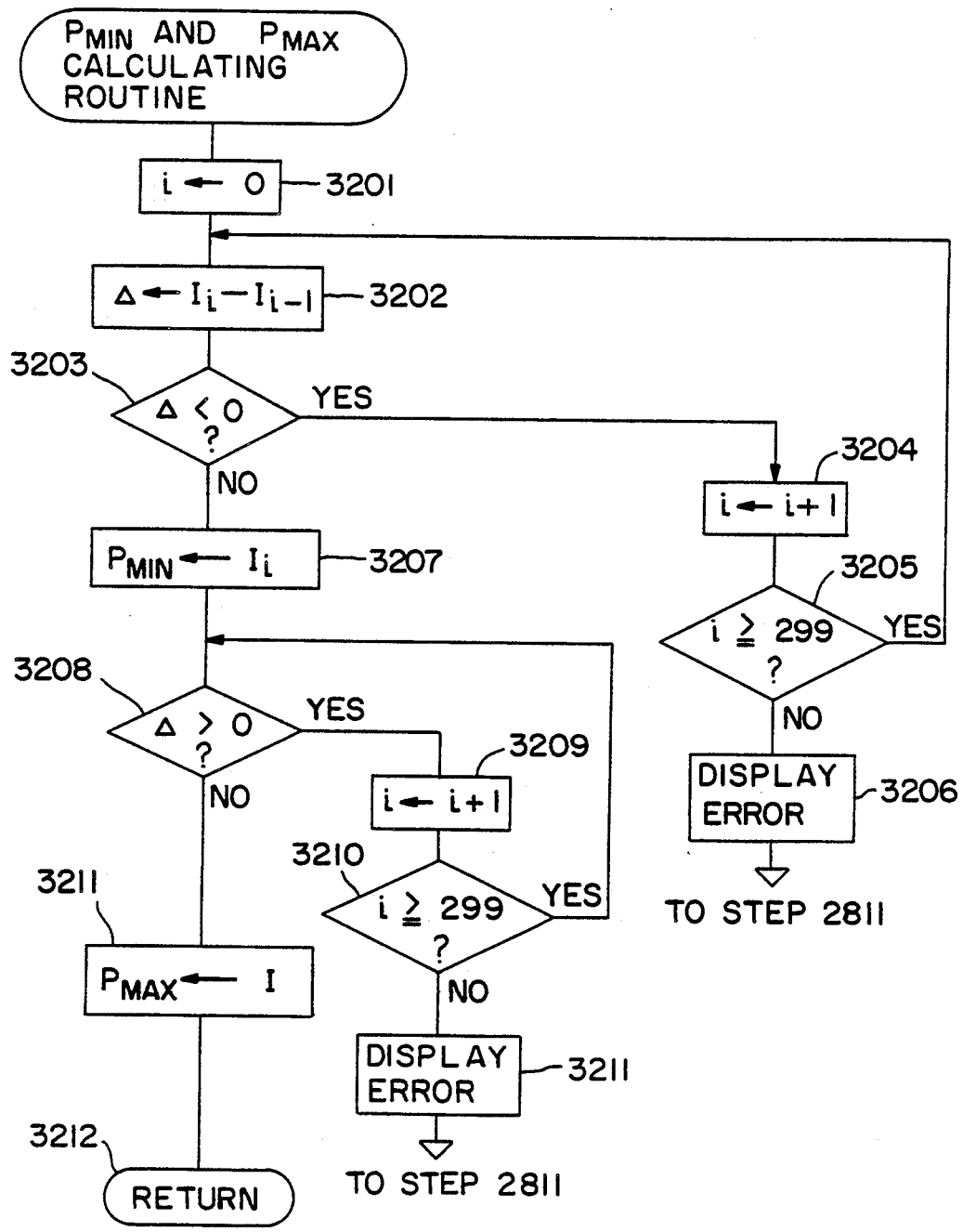

FIG. 32 shows a routine for calculating $P_{MIN}$ and $P_{MAX}$ from the reflected light intensity data pattern ($I_i$).

At step 3201, the counter reset i is reset. The control proceeds to step 3202 which calculates a difference $\Delta$ between $I_i$ and $I_{i-1}$, as shown below:

$$\Delta \leftarrow I_i - I_{i-1}$$

At step 3203, if $\Delta<0$, the control proceeds to step 3204, at step 3204, the counter i is incremented by 1 and then the control proceeds to step 3205. At step 3205, if $i \geq 299$, the control proceeds to step 3202.

As long as $\Delta$ is minus, the routine including steps 3202 to 3205 is repeated until the counter i is counted up by 299. Then, the control proceeds to step 3206 in which an error is displayed on the display unit, and further proceeds to step 2811 of FIG. 28.

At step 3203, if $\Delta \geq 0$, the control proceeds to step 3207, and at step 3207, $P_{MIN}$ is made $I_i$ and the control then proceeds to step 3208. At step 3208 if $\Delta >0$, the control proceeds to step 3209, and at step 3209, the counter i is incremented by 1. Then, at step 3210, if $i \geq 299$, the control proceeds to step 3208.

As long as $\Delta$ is minus, the routine including steps 3208 to 3210 is repeated until the counter i is counted up by 299. Then, the control proceeds to step 3211 in which an error is displayed on the display unit, and further proceeds to step 2811 of FIG. 28.

At step 3208, if $\Delta>0$, the control proceeds to step 3211, and at step 3211, $P_{MAX}$ is made $I_i$. The MAX control then proceeds to step 3212 and is returned to step 2804 of FIG. 28.

Figure 33:
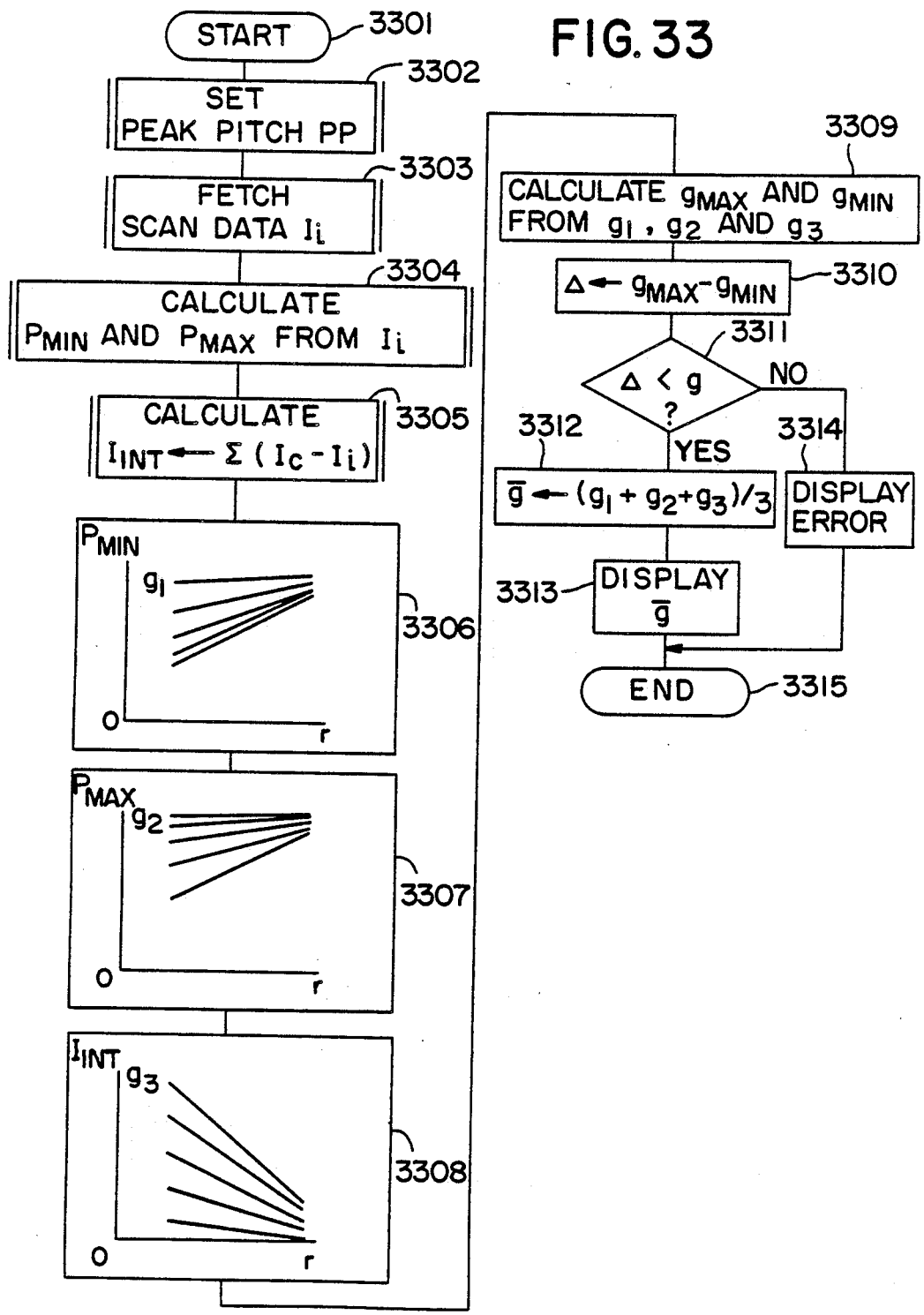

FIG. 33 is a routine for calculating a dimension between the opposed edges formed on the substrate S from a minimum peak value, a maximum peak value, and an integrated value obtained from a reflected light intensity pattern representing the dimension between the opposed edges. Note, in this operation, a reflectivity r of the measuring zone between the opposed edges is previously known.

The control is begun at step 3301 actuating the switch SW (FIG. 1).

The control then proceeds to step 3302 in which is the peak pitch PP of the twin laser beam is set at a predetermined value. In this operation, since the peak pitch PP may be fixed, if necessary, step 3302 may be eliminated. This routine will be explained hereinafter in detail.

The control then proceeds to step 3303 in which three hundred scan data $I_i$ (i-299) are fetched in the same manner as in step 2802 of FIG. 28. The fetched data $I_i$ represents the reflected light intensity pattern.

The control proceeds to step 3304, which calculates a minimum peak value $P_{MIN}$ and a maximum peak value $P_{MAX}$ of the reflected light intensity data pattern in the same manner as in step 2804 of FIG. 24.

The control further proceeds to step 3305 which calculates an integrated value $I_{INT}$ for the reflected light intensity pattern ($I_i$). This calculation step will be explained in detail hereinafter.

At step 3306, $g_1$ is calculated from a two-dimensional map by the parameters $P_{MIN}$ and r, wherein r is a reflectivity of the measuring zone. This map corresponds to FIG. 12. Thus, the calculated $g_1$ may be considered to be a dimension to be measured between the opposed edges.

At step 3307, $g_2$ is calculated from a two-dimensional map by the parameters $P_{MAX}$ and r. This map corresponds to $CP_{MAX}$ of FIG. 13. Thus, the calculated $g_2$ may be also considered to be a dimension to be measured between the opposed edges.

At step 3308, $g_3$ is calculated from a two-dimensional map by the parameters $I_{INT}$ and r. This map corresponds to $I_{INT}$ of FIG. 14. Thus, the calculated $g_3$ may be also considered to be a dimension to be measured between the opposed edges.

The control then proceeds to step 3309 in which calculation is carried out to determine a maximum $g_{MAX}$, a middle $g_{MID}$, and a minimum $g_{MIN}$ among the calculated $g_1$, $g_2$, and $g_3$.

At step 3310, a difference $\Delta$ between $g_{MAX}$ and $g_{MIN}$ is calculated by $$\Delta \leftarrow g_{MAX} - g_{MIN}$$

At step 3311, it is determined whether or not the difference $\Delta$ is smaller than a predetermined constant $g_0$. If $\Delta<g_0$, the control proceeds to step 3312.

At step 3312, a mean value of $g_1$, $g_2$ and $g_3$ is calculated by $$\bar{g} \leftarrow (g_1 + g_2 + g_3)/3$$

The control then proceeds to step 3313 in which the $\bar{g}$ displayed at the display unit.

At step 3311, if $\Delta>g_0$, the control proceeds to step 3314 in which an error indicating the impossibility of measurement is displayed at the display unit.

The control of this routine is completed by step 3315. Note, the control may proceed to another step (not shown) which commands a shift of the substrate carrier 56 so that the substrates S are successively measured. Also, the measurement is repeated for the same reasons as mentioned above.

Figure 34:
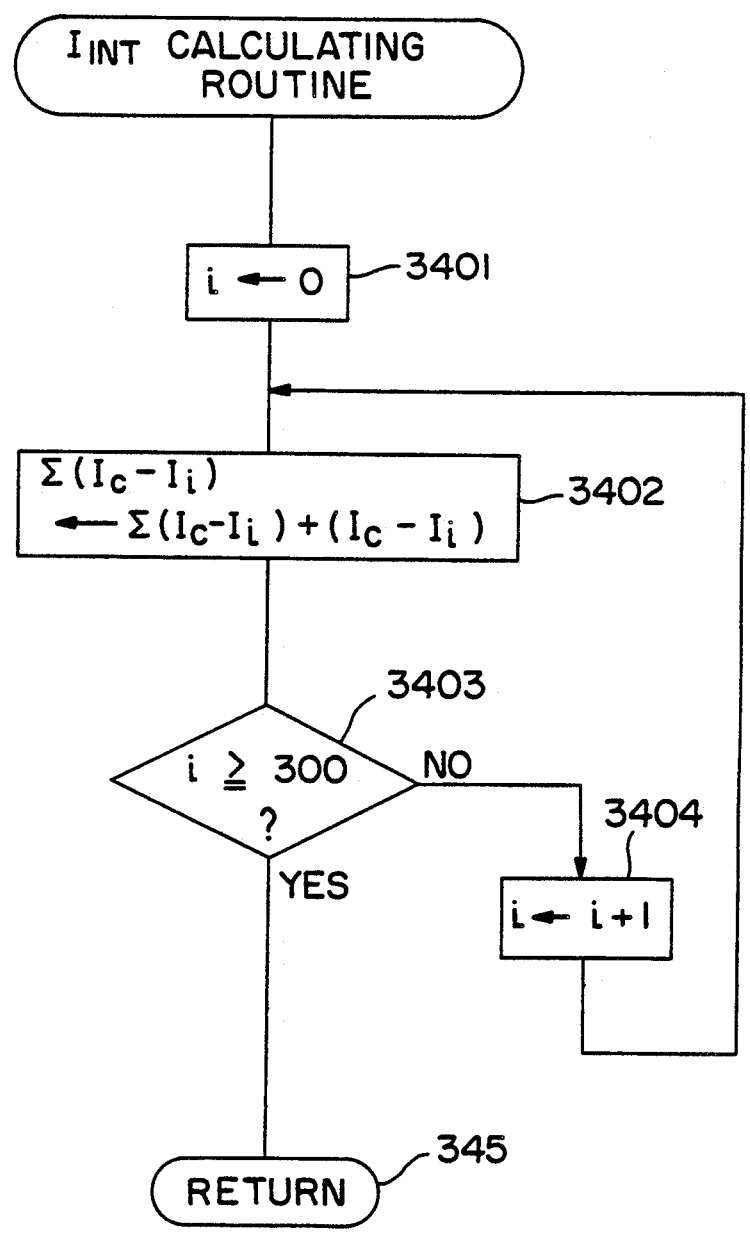

FIG. 34 shows a routine for calculating the integrated value $I_{INT}$ from the scan data $I_i$. The integrated value $I_{INT}$ is given below:

$$I_{INT} = \Sigma(I_c - I_i)$$

Wherein: $I_c$ is a constant corresponding to a light intensity reflected from the surface of the substrate. Namely, the $I_{INT}$ is defined by the hatched area shown in FIG. 15.

At step 3401, the counter i is reset.

The control proceeds to step 3402 in which a value of $I_{INT}$ is calculated by $$\Sigma(I_c - I_i) \leftarrow \Sigma(I_c - I_i) + (I_c - I_i)$$

At step 3402, if $i<300$, the control proceeds to step 3404 in which the counter i is incremented by 1. Therefore, the routine including steps 3402, 3403, and is repeated until the counter i is counted up by 299 at step 3404.

Figure 35:
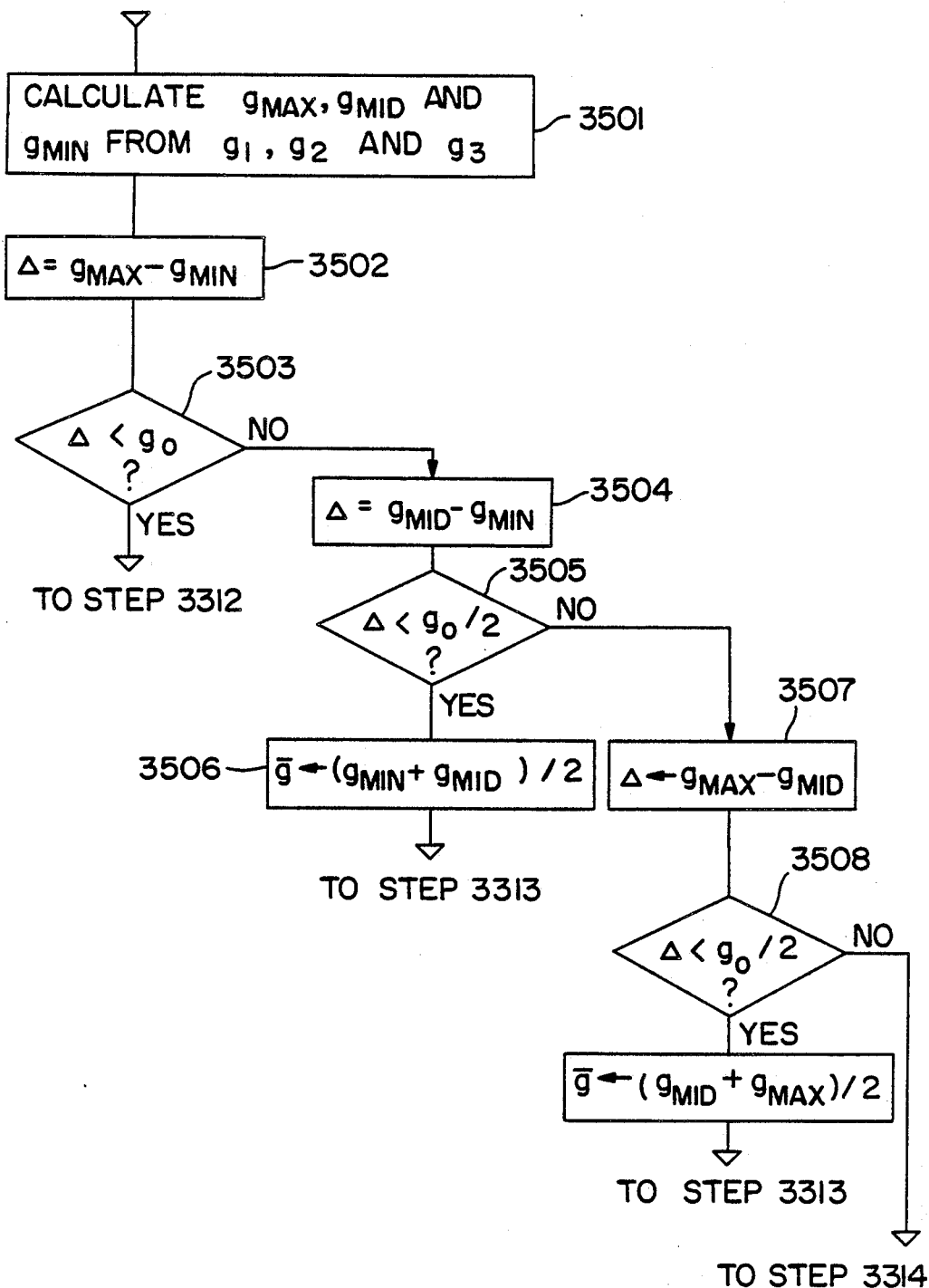

At step 3403, if $i \geq 300$, the control proceeds to step 3405 and then returns to step 3306 of FIG. 33. FIG. 35 is a modification of FIG. 33. At step 3501, calculation is carried out to determine a maximum $g_{MAX}$, a middle $g_{MID}$ and a minimum $g_{MIN}$ among the calculated $g_1$, $g_2$, and $g_3$.

At step 3502, a difference $\Delta$ between $g_{MAX}$ and $g_{MIN}$ is calculated by $$\Delta \leftarrow g_{MAX} - g_{MIN}$$

At step 3503, it is determined whether or not the difference $\Delta$ is smaller than a predetermined constant $g_0$. If $\Delta<g_0$, the control proceeds to step 3312.

At step 3503, if $\Delta>g_0$, the control proceeds to step 3504 which calculates a difference $\Delta$ between $g_{MID}$ and $g_{MIN}$ by $$\Delta \leftarrow g_{MID} - g_{MIN}$$

and then to step 3505.

At step 3505, if $\Delta < g_0/2$, the control proceeds to step 3506 which calculates a mean value $\bar{g}$ of $g_{MID}$ and $g_{MIN}$ by $$\bar{g} \leftarrow (g_{MID} + g_{MIN})/2$$

The control then proceeds to step 3313 of FIG. 33 At step 3505, if $\Delta > g_0/2$, the control proceeds to step 3507, which calculates a difference $\Delta$ between $g_{MID}$ and $g_{MAX}$ by $$\Delta \leftarrow g_{MAX} - g_{MID}$$

and then to step 3508.

At step 3508 if $\Delta < g_0/2$, the control proceeds to step 3509 which calculates a mean value $\bar{g}$ of $g_{MID}$ and $g_{MAX}$ by $$\bar{g} \leftarrow (g_{MID} + g_{MIN})/2$$

The control then proceeds to step 3313 of FIG. 33.

At step 3508, if $\Delta > g_0/2$, the control proceeds to step 3314.

Figure 36:
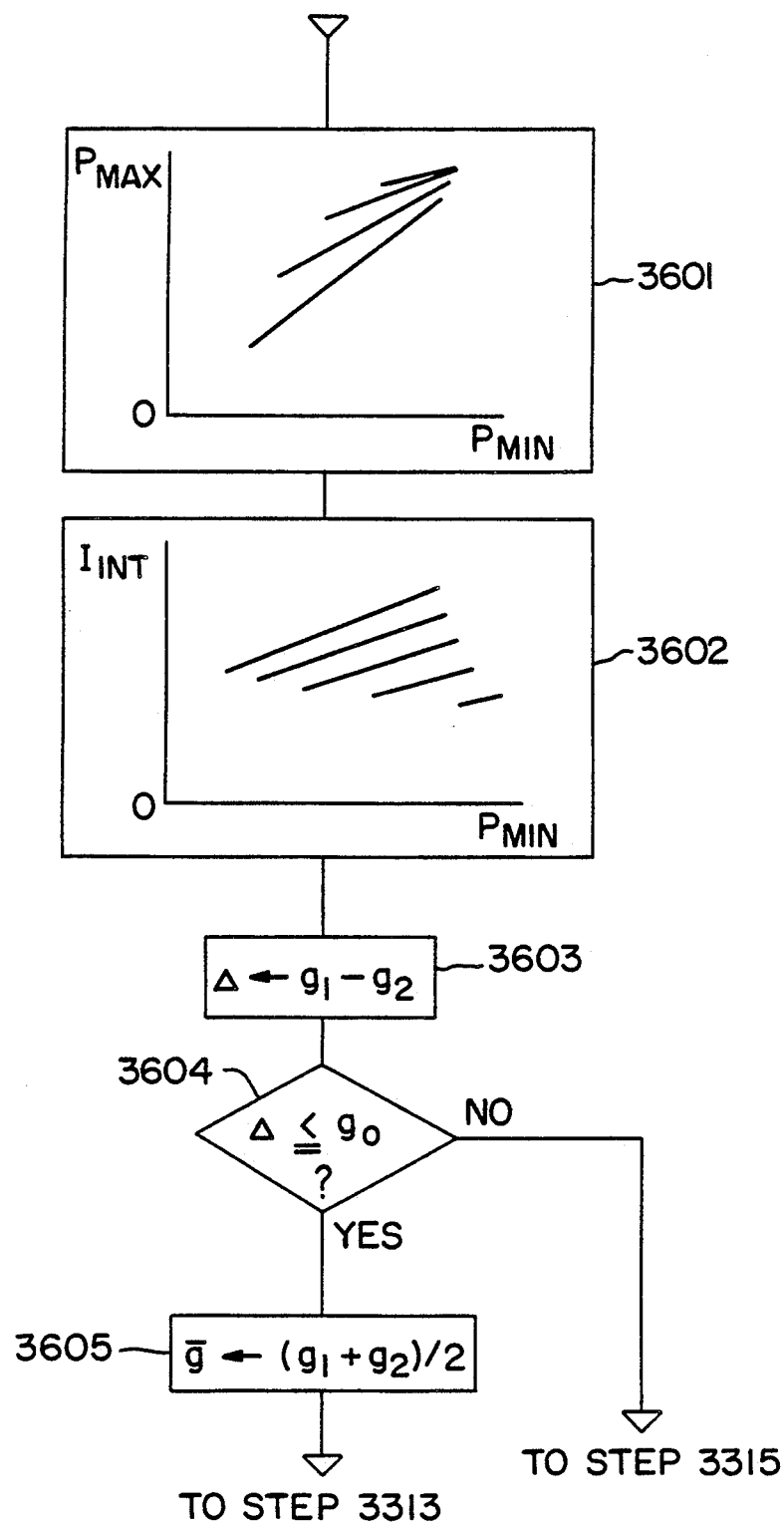

FIG. 36 shows another modification of FIG. 33. Note, in this operation, a reflectivity r of the measuring zone between the opposed edges is unknown.

At step 3601, $g_1$ is calculated from a two-dimensional map by the parameters minimum peak $P_{MIN}$ and the maximum $P_{MAX}$. This map corresponds to FIG. 16, and thus the calculated $g_1$ may be evaluated as a dimension to be measured.

At step 3602, $g_2$ is calculated from a two-dimensional map by the parameters minimum peak $P_{MIN}$ and integrated value $I_{INT}$. This map corresponds to FIG. 17, and thus $g_2$ may be also evaluated as a dimension to be measured.

The control proceeds to step 3603 in which a difference $\Delta$ between $g_1$ and $g_2$ is calculated by $$\Delta \leftarrow g_1 - g_2$$

and to step 3604.

At step 3604, it is determined whether or not the difference $\Delta$ is smaller than a predetermined constant $g_0$. As a result, if $\Delta \leq g_0$, the control proceeds to step 3605, which calculates a mean value $\bar{g}$ of $g_1$ and $g_2$ as follows:

$$\bar{g} \leftarrow (g_1 + g_2)/2$$

and, the control proceeds to step 3313 of FIG. 33

At step 3604, if $\Delta > g_0$, the control proceeds to step 3315 of FIG. 33.

Figures 1, 37A:
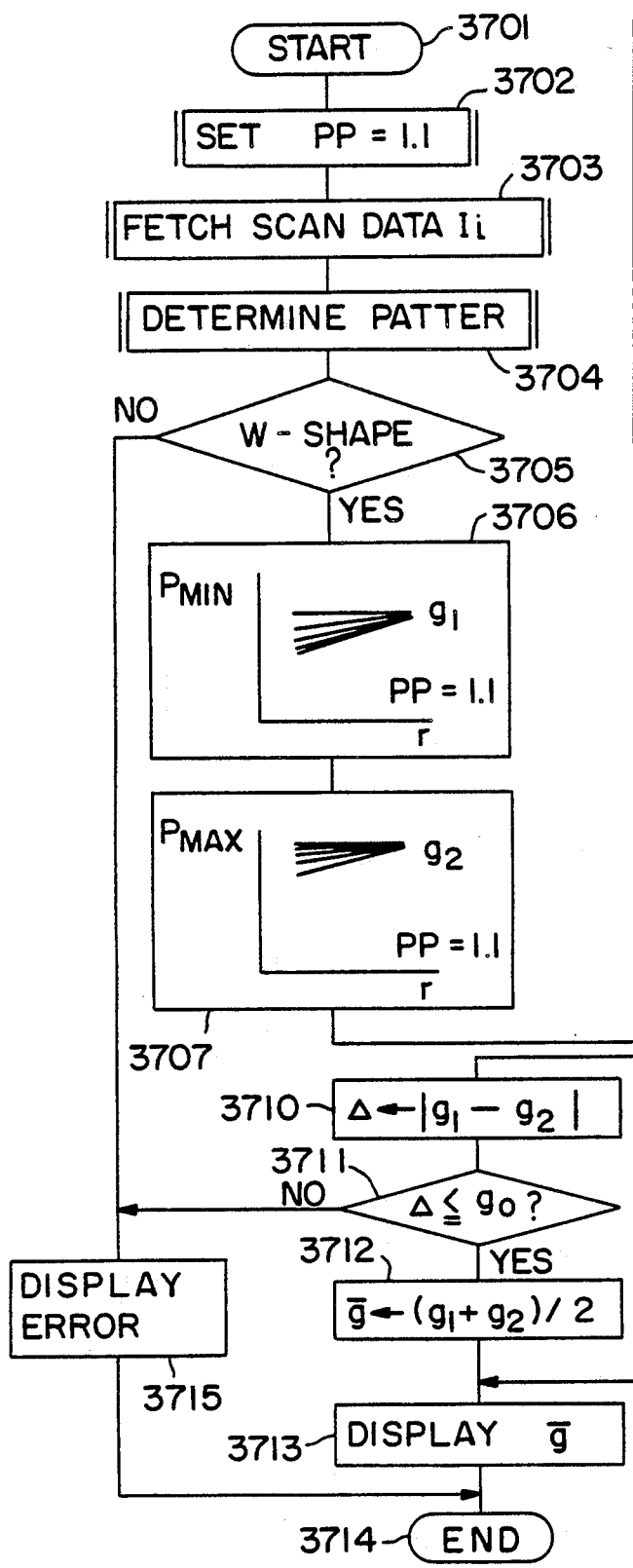
Figures 2, 37A:
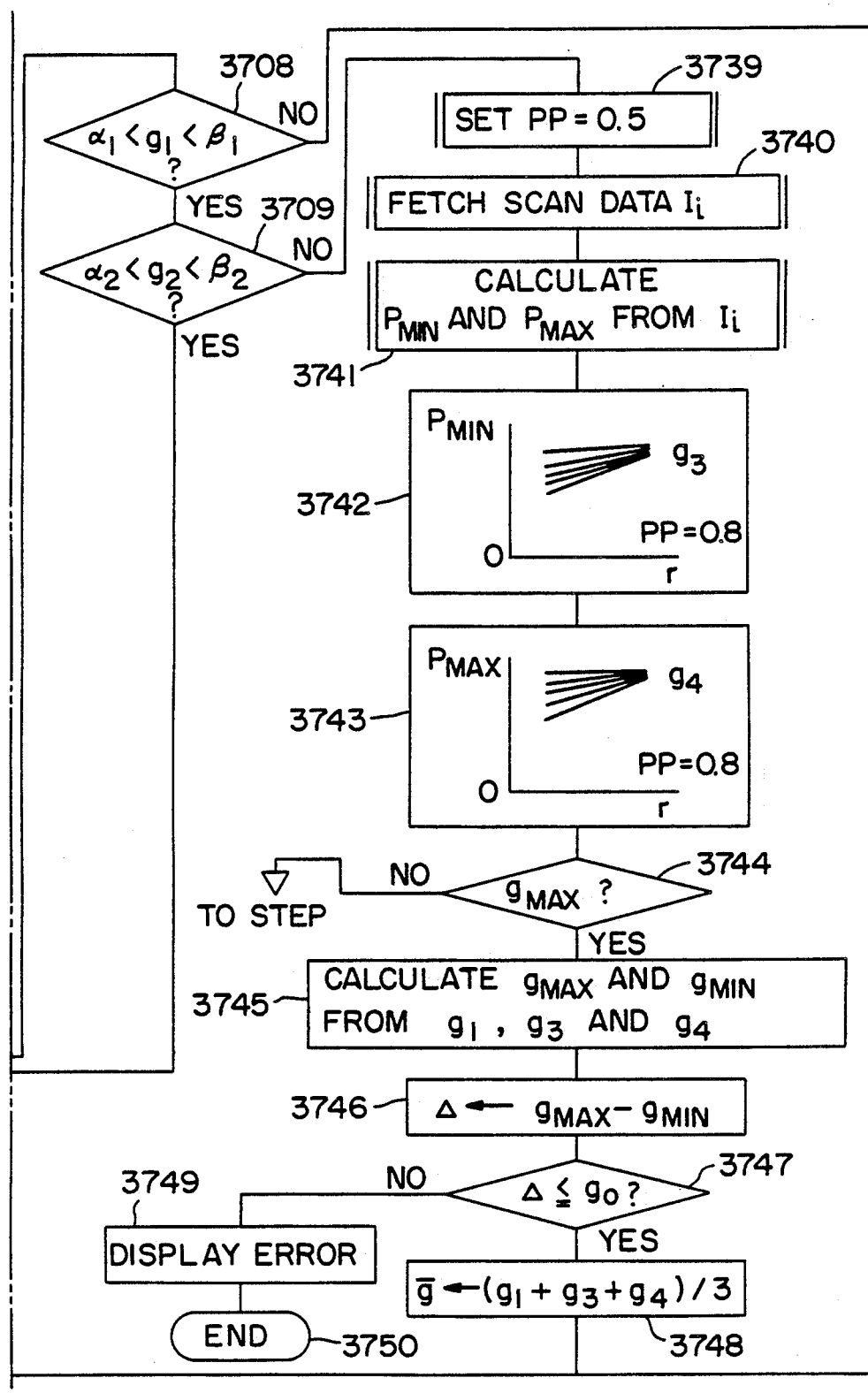
Figures 3, 37A:
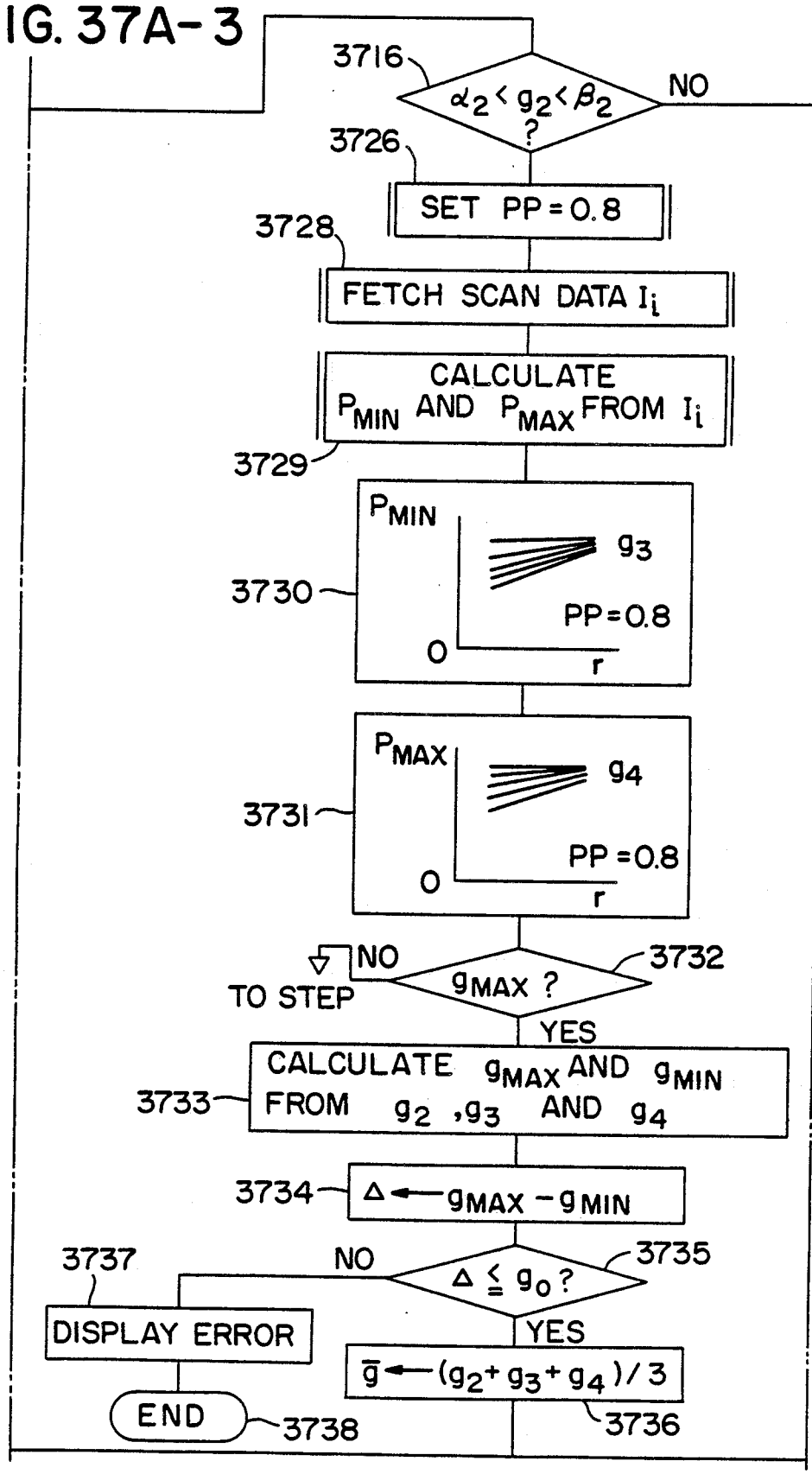
Figures 4, 37A:
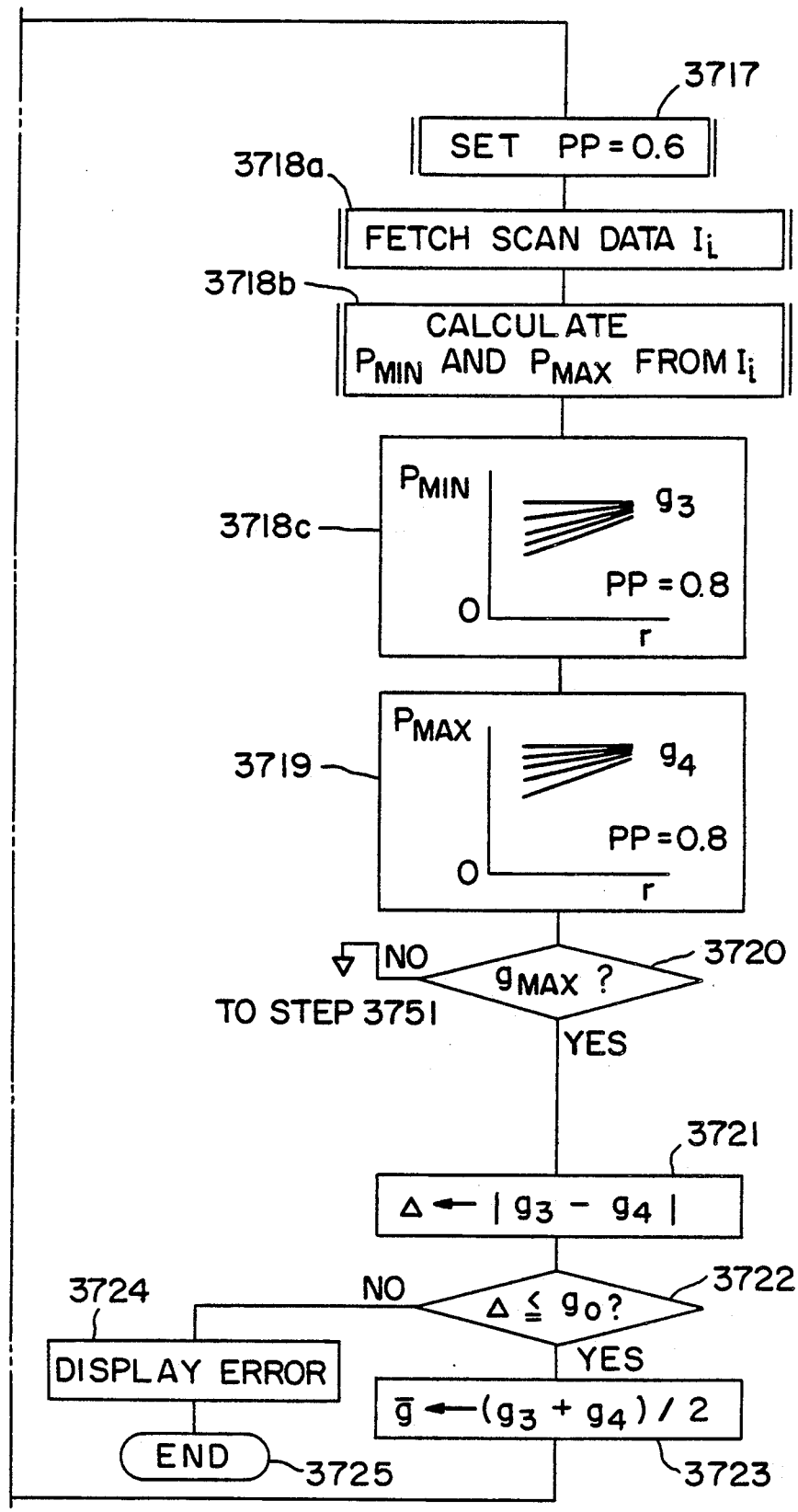
Figures 1, 37B:
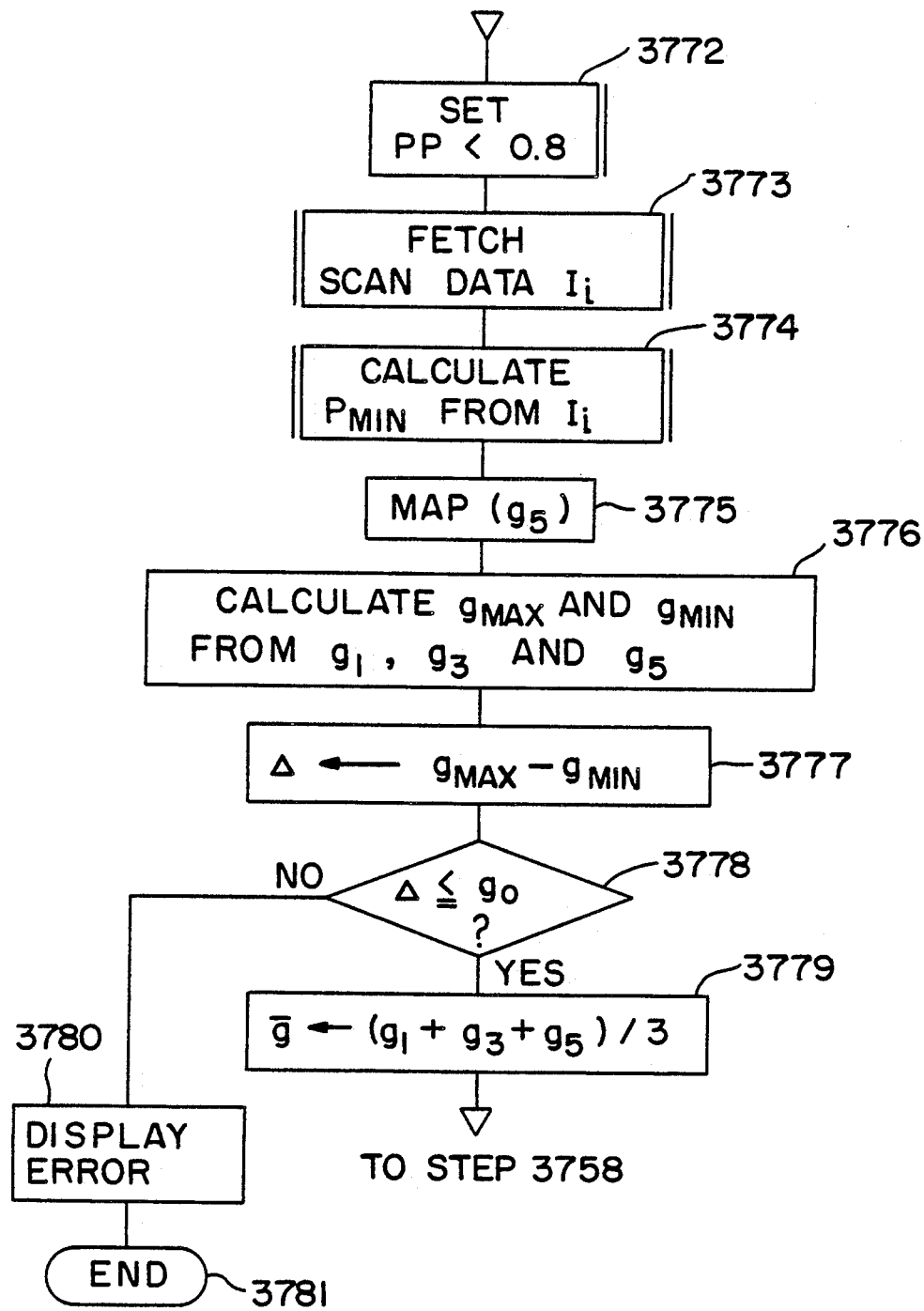
Figures 2, 37B:
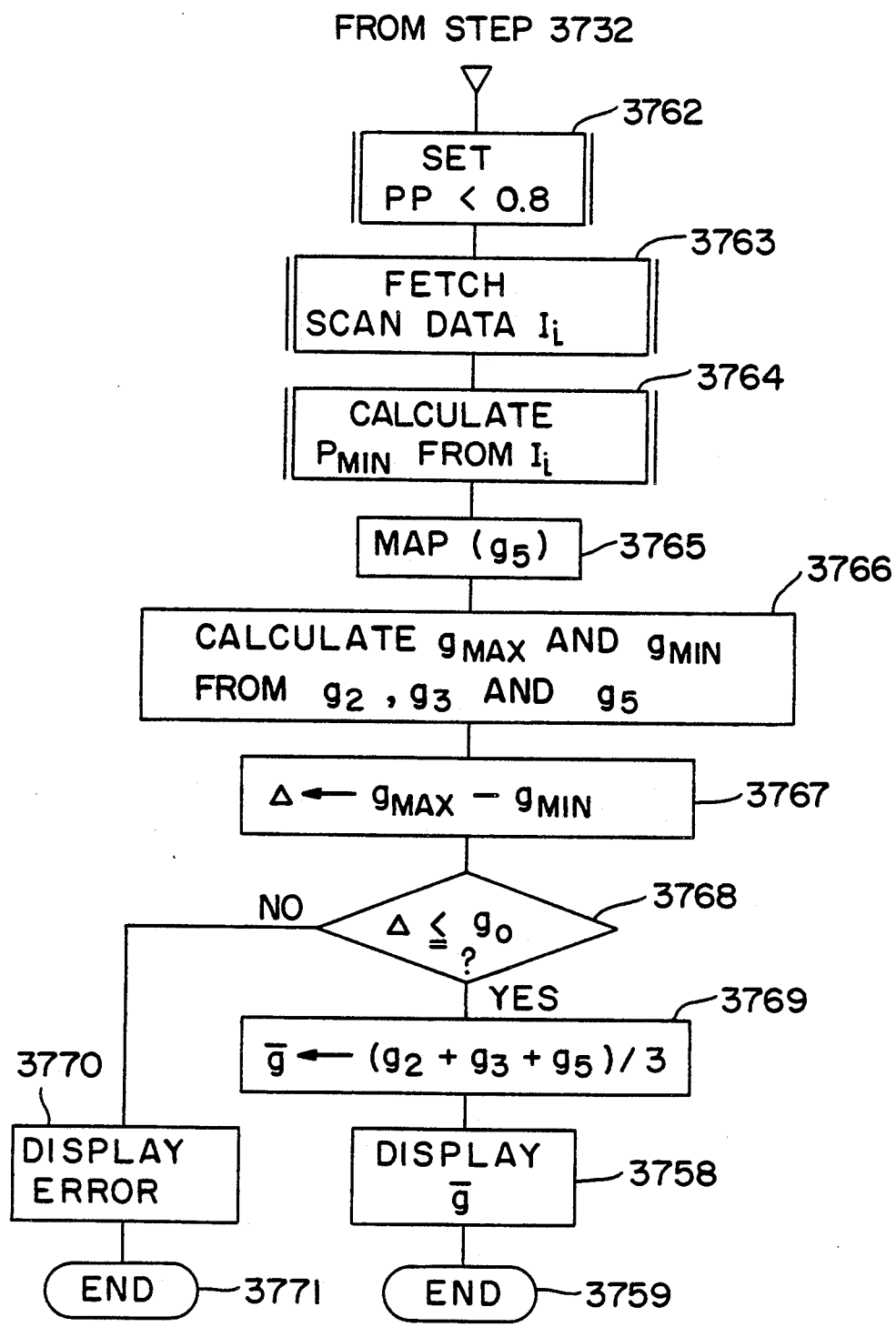
Figures 3, 37B:
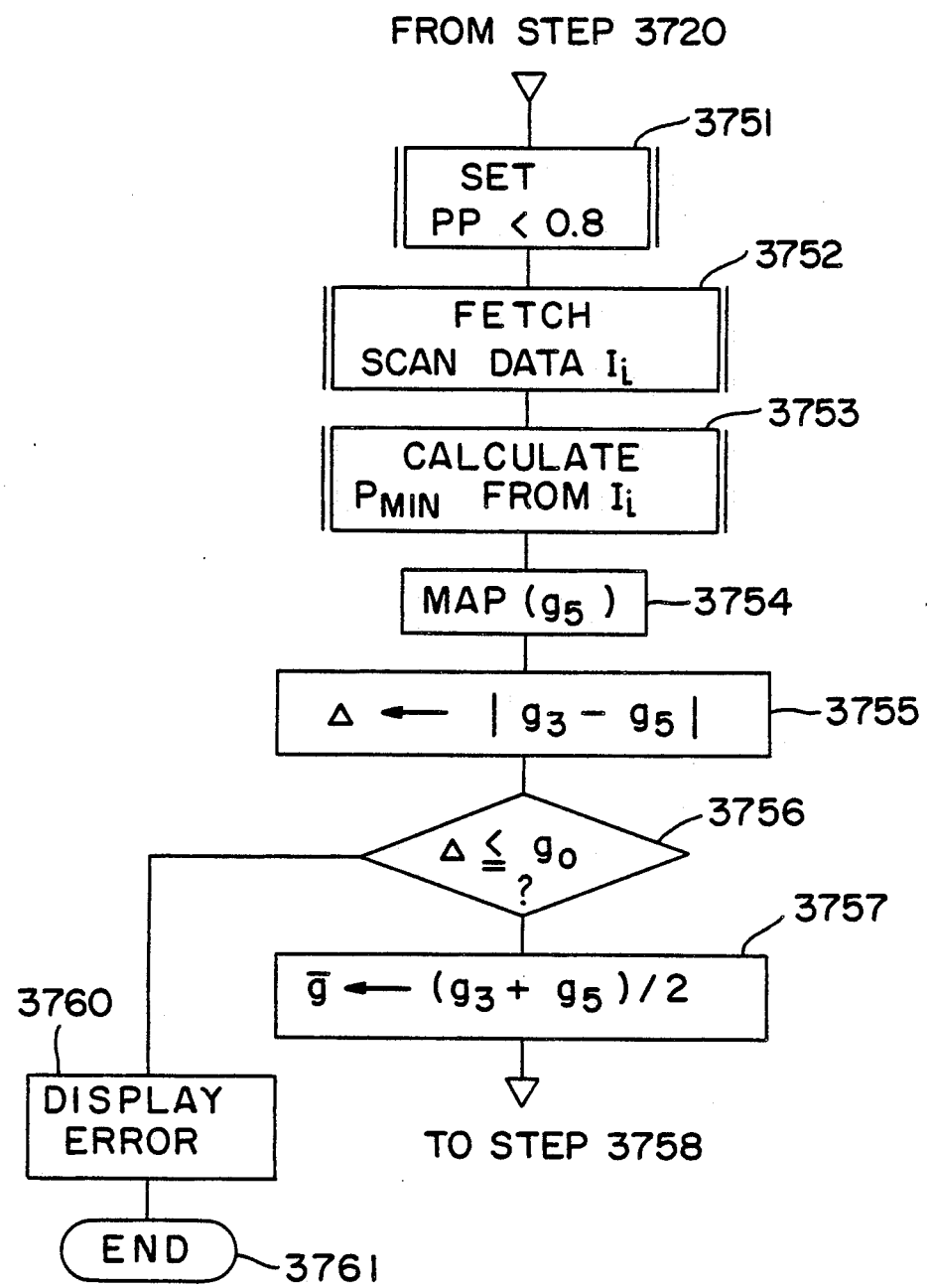

FIGS. 37A and 37B show a routine for calculating a dimension between the opposed edges formed on the substrate S from a minimum peak value and a maximum peak value obtained from a reflected light intensity pattern representing the dimension between the opposed edges. In this operation, it is determined whether or not a shape of the reflected light intensity pattern is correct, and a peak pitch PP of the twin laser beam is adjustable Note, a reflectivity r of the measuring zone between the opposed edges is previously known in this operation.

The control is begun at step 3701 by actuating the switch SW (FIG. 1).

The control proceeds to step 3702 which is the same as the routine of FIG. 29. At step 3702, the peak pitch PP of the twin laser beam is first set to a predetermined suitable value For example, when a dimension to be measured is less than 1 $\mu$m and when a spot diameter of the original laser beam is about 1 $\mu$m, the peak pitch PP is given a value such as 1.1 $\mu$m, which is somewhat larger than 1 $\mu$m. This is because, if a fine dirt, dust or the like does not exist on the measuring zone between opposed edges or the substrate per se has no blemishes at the edges and/or the surfaces thereof, the reflected light intensity pattern necessarily has a correct W-shape, as mentioned hereinbefore in connection with FIG. 18.

The control then proceeds to step 3703 in which three hundred scan data $I_i$ ($i - 299$) are fetched in the manner as in step 2802 of FIG. 28. The fetched data $I_i$ represents the reflected light intensity pattern.

At step 3704, it is determined whether or not the reflected light intensity pattern has a correct W-shape. In the embodiments mentioned hereinbefore, since it is assumed that the measuring zone has a lower reflectivity than that of the surface of the substrate, the determination is carried out on the W-shape. However, it should be understood that if a reflectivity of the measuring zone is higher than that of the surface of the substrate, the determination is carried out whether or not the reflected light intensity pattern has a correct M-shape At step 3704, it should be noted that, during the pattern determination, a minimum peak value $P_{MIN}$ and a maximum peak value $P_{MAX}$ also calculated and stored in the RAM 46. This routine will be explained in detail hereinafter.

At step 3705, if the reflected light intensity pattern has the correct W-shape, the control proceeds to step 3706.

At step 3706, $g_1$ is calculated from a two-dimensional map by the parameters minimum peak $P_{MIN}$ and the reflectivity r. This two-dimensional map corresponds to FIG. 20 (PP=1.1), and thus the calculated $g_1$ may be evaluated as a dimension to be measured between the opposed edges.

At step 3707, $g_2$ is calculated from a two-dimensional map by the parameters minimum peak $P_{MAX}$ and the reflectivity r. This two-dimensional map corresponds to FIG. 21 (PP=1.1), and thus the calculated $g_2$ may be evaluated as a dimension to be measured between the opposed edges.

The control then proceeds to step 3708, which determines whether or not $g_1$ falls within a predetermined permissible range. As discussed with reference to FIG. 20, when $g_1$ is evaluated as a value less than a predetermined constant, for example, 0.3, or as a value more than a predetermined constant, for example, 0.5, the calculated $g_1$ should be reevaluated. However, if $g_1$ falls within the permissible range, it is possible to process $g_1$ as a correct value without reevaluation. At step 3708, if $\alpha_1 < g_1 < \beta_1$, the control proceeds to step 3709.

At step 3709, it is determined whether or not $g_2$ falls within a predetermined permissible range. As discussed with reference to FIG. 21, $g_2$ should be reevaluated when it does not fall within a predetermined permissible range. If $\alpha_2 < g_2 < \beta_2$, the control proceeds to step 3710.

At step 3710, a difference $\Delta$ between $g_1$ and $g_2$ is calculated by $$\Delta \leftarrow g_1 - g_2$$

At step 3711, it is determined, whether or not the difference $\Delta$ is smaller than a predetermined constant $g_0$. If $\Delta \leq g_0$, the control proceeds to step 3712.

At step 3712, a mean value $\bar{g}$ of $g_1$ and $g_2$ calculated by $$\bar{g} \leftarrow (g_1 + g_2)/2$$

The control proceeds to step 3713 in which $\bar{g}$ is displayed at the display unit, and is then completed by step 3714.

At step 3705, if the reflected light intensity pattern does not have the correct W-pattern, the control proceeds to step 3715 which displays an error indicating the impossibility of measurement, and then proceeds to step 3714.

At step 3711, if $\Delta > g_0$, the control proceeds to step 3715 which displays an error indicating the impossibility of measurement, and then proceeds to step 3714.

At step 3708, if $g_1$ does not fall within the permissible range, the control proceeds to step 3716 which again determines whether or not $g_1$ falls within the permissible range. If $\alpha_2 < g_2 < \beta_2$, the control proceeds to step 3717 in which the peak pitch PP is given the value 0.6, for example, by varying a value $T_c$ shown in FIG. 29.

The control proceeds to step 3718a in which the scan data $I_i$ is fetched in the same manner as in the routine of step 3702.

The control then proceeds to step 3718b which calculates a minimum peak value $P_{MIN}$ a maximum peak value $P_{MAX}$ from the scan data $I_i$. Note, at step 3718a, if it is impossible to calculate the maximum peak value $P_{MAX}$ from the scan data $I_i$ representing a V-shape, only the minimum peak value is calculated. This routine will be explained in detail hereinafter.

At step 3718c, $g_3$ is calculated from a two-dimensional map by the parameters minimum peak $P_{MIN}$ and the reflectivity r. This two-dimensional map corresponds to FIG. 22 (PP=0.6), and thus the calculated $g_3$ may be evaluated as a dimension to be measured between the opposed edges.

At step 3719, $g_4$ is calculated from a two-dimensional map by the parameters maximum peak $P_{MAX}$ and the reflectivity r. This two-dimensional map corresponds to FIG. 23 (PP=0.6), and thus the calculated $g_4$ may be evaluated as a dimension to be measured between the opposed edges.

The control then proceeds to step 3720 which determines whether or not the maximum peak value $P_{MAX}$ exists. If the maximum peak value $P_{MAX}$ exists, the control proceeds to step 3721.

At step 3721, a difference $\Delta$ between $g_3$ and $g_4$ is calculated by $$\Delta \leftarrow g_3 - g_4$$

At step 3722, it is determined whether or not the difference $\Delta$ is smaller than a predetermined constant $g_0$. As a result, if $\Delta \leq g_0$, the control proceeds to step 3723, which calculates the mean value $\bar{g}$ of $g_3$ and $g_4$ as follows:

$$\bar{g} \leftarrow (g_3 + g_4)/2$$

The control proceeds to step 3713 which displays $\bar{g}$ at the display unit.

At step 3722, if $\Delta > g_0$, the control proceeds to step 3724 in which an error indicating the impossibility of measurement is displayed at the display unit, and is then completed by step 3725. Note, the control may proceed to another step (not shown) which commands a shift of the substrate carrier 56 so that the substrates S are successively measured.

At step 3716, if $g_1$ falls within the permissible range, the control proceeds to step 3726 in which the peak pitch PP is given the value 0.8 by varying a value of $T_c$ shown in FIG. 29.

The control proceeds to step 3728 in which the scan data $I_i$ is fetched in the same manner as in the routine of step 3702.

The control then proceeds to step 3729 which calculates a minimum peak value $P_{MIN}$ and a maximum peak value $P_{MAX}$ from the scan data $I_i$ in the same manner as in the routine of step 3718b.

At step 3730, $g_3$ is calculated from a two-dimensional map by the parameters minimum peak $P_{MIN}$ and the reflectivity r. This two-dimensional map corresponds to FIG. 22 (PP=0.8), and thus the calculated $g_3$ may be evaluated as a dimension to be measured between the opposed edges.

At step 3731, $g_4$ is calculated from a two-dimensional map by the parameters maximum peak $P_{MAX}$ and the reflectivity r. This two-dimensional map corresponds to FIG. 23 (PP=0.8), and thus the calculated $g_4$ may be evaluated as a dimension to be measured between the opposed edges.

The control then proceeds to step 3732 which determines whether or not the maximum peak value $P_{MAX}$ exists. If the maximum peak value $P_{MAXA}$ exists, the control proceeds to step 3733.

At step 3733, calculation is carried out to determine a maximum $g_{MAX}$, a middle $g_{MID}$, and a minimum $g_{MIN}$ among $g_1$, $g_3$, and $g_4$.

At step 3734, a difference $\Delta$ between $g_{MAX}$ and $g_{MIN}$ is calculated by $$\Delta \leftarrow g_{MAX} - g_{MIN}$$

At step 3735, it is determined whether or not the difference $\Delta$ is smaller than a predetermined constant $g_0$. If $\Delta < g_0$, the control proceeds to step 3736.

At step 3736, a mean value of $g_1$, $g_3$ and $g_4$ is calculated by $$\bar{g} \leftarrow (g_1 + g_3 + g_4)/3$$

The control then proceeds to step 3713 in which $\bar{g}$ is displayed at the display unit.

At step 3735, if $\Delta > g_0$, the control proceeds to step 3737 in which an error indicating the impossibility of measurement is displayed at the display unit.

The control of this routine is completed by step 3738. Note, the control may proceeds to another step (not shown) which commands a shift of the substrate carrier 56 so that the substrates S are successively measured. Also, the measurement is repeated for the same reasons as mentioned above.

At step 3709, if $g_2$ does not fall within the permissible range, the control proceeds to step 3739 in which the peak pitch PP is given the value 0.5 for example, by varying a value $T_c$ shown in FIG. 29.

The control proceeds to step 3740 in which the scan data $I_i$ is fetched in the same manner as in the routine of step 3702.

The control then proceeds to step 3741 which calculates a minimum peak value $P_{MIN}$ and a maximum peak value $P_{MAX}$ from the scan data $I_i$ in the same manner as in the routine of step 3718b.

At step 3742, $g_3$ is calculated from a two-dimensional map by the parameters minimum peak $P_{MIN}$ and the reflectivity r. This two-dimensional map corresponds to FIG. 22 (PP=0.8), and thus the calculated $g_3$ may be evaluated as a dimension to be measured between the opposed edges.

At step 3743, $g_4$ is calculated from a two-dimensional map by the parameters maximum peak $P_{MAX}$ and the reflectivity r. This two-dimensional map corresponds to FIG. 23 (PP=0.8), and thus the calculated $g_4$ may be evaluated as a dimension to be measured between the opposed edges.

The control then proceeds to step 3744 which determines whether or not the maximum peak value $P_{MAX}$ exists. If the maximum peak value $P_{MAX}$ exists, the control proceeds to step 3745.

At step 3745, calculation is carried out to determine a maximum $g_{MAX}$, a middle $g_{MID}$, and a minimum $g_{MIN}$ among $g_2$, $g_3$, and $g_4$.

At step 3746, a difference $\Delta$ between $g_{MAX}$ and $g_{MIN}$ is calculated by $$\Delta \leftarrow g_{MAX} - g_{MIN}$$

At step 3747, it is determined whether or not the difference $\Delta$ is smaller than a predetermined constant $g_0$. If $\Delta < g_0$, the control proceeds to step 3748.

At step 3748, a mean value of $g_2$, $g_3$ and $g_4$ is calculated by $$\bar{g} \leftarrow (g_2 + g_3 + g_4)/3$$

The control then proceeds to step 3713 in which $\bar{g}$ is displayed at the display unit.

At step 3747, if $\Delta > g_0$, the control proceeds to step 3749 in which an error indicating the impossibility of measurement is displayed at the display unit.

The control of this routine is completed by step 3750. Note, the control may proceed to another step (not shown) which commands a shift of the substrate carrier 56 so that the substrates S are successively measured. Also, the measurement is repeated for the same reasons as mentioned above.

At step 3720, if the maximum peak value $P_{MAX}$ does not exist, the control proceeds to 3751 in which the peak pitch PP is given a value lower than 0.6 (for example, 0.3) by varying a value $T_c$ shown in FIG. 29.

The control proceeds to step 3752 in which the scan data $I_i$ is fetched in the same manner in the routine of step 3702.

The control then proceeds to step 3753 which calculates a minimum peak value $P_{MIN}$ from the scan data $I_i$ in the same manner as in the routine of step 3718b.

At step 3754, $g_5$ is calculated from a two-dimensional map by the parameters minimum peak $P_{MIN}$ and the reflectivity r, and thus the calculated $g_5$ may be evaluated as a dimension to be measured between the opposed edges.

At step 3755, a difference $\Delta$ between $g_3$ and $g_5$ is calculated by $$\Delta \leftarrow g_3 - g_5$$

At step 3756, it is determined whether or not the difference $\Delta$ is smaller than a predetermined constant $g_0$. As a result, if $\Delta \leq g_0$, the control proceeds to step 3757, which calculates the mean value $\bar{g}$ of $g_3$ and $g_5$ as follows:

$$\bar{g} \leftarrow (g_3 + g_5)/2$$

The control proceeds to step 3758 which displays $\bar{g}$ at the display unit, and is the completed by step 3759.

At step 3756, if $\Delta > g_0$, the control proceeds to step 3760 in which an error indicating the impossibility of measurement is displayed at the display unit, and is then completed by step 3761. Note, the control may proceeds to another step (not shown) which commands a shift of the substrate carrier 56 so that the substrates S are successively measured.

At step 3732, if the maximum peak value $P_{MAX}$ does not exist, the control proceeds to 3762 in which the peak pitch PP is given a value lower than 0.8 (for example, 0.6) by varying a value of $T_c$ shown in FIG. 29.

The control proceeds to step 3763 in which the scan data $I_i$ is fetched in the same manner as in the routine of step 3702.

The control then proceeds to step 3764 which calculates a minimum peak value $P_{MIN}$ from the scan data $I_i$ in the same manner as in the routine of step 3718b.

At step 3765, $g_5$ is calculated from a two-dimensional map by the parameters minimum peak $P_{MIN}$ and the reflectivity r, and thus the calculated $g_5$ may be evaluated as a dimension to be measured between the opposed edges.

At step 3766, calculation is carried out to determine a maximum $g_{MAX}$, a middle $g_{MID}$ and a minimum $g_{MIN}$ among $g_1$, $g_3$ and $g_5$.

At step 3767, a difference $\Delta$ between $g_{MAX}$ and $g_{MIN}$ is calculated by $$\Delta \leftarrow g_{MAX} - g_{MIN}$$

At step 3768, it is determined whether or not the difference $\Delta$ is smaller than a predetermined constant $g_0$. If $\Delta < g_0$, the control proceeds to step 3769

At step 3769, a mean value of $g_1$, $g_3$, and $g_5$ is calculated by $$\bar{g} \leftarrow (g_1 + g_3 + g_5)/3$$

The control then proceeds to step 3758 in which $\bar{g}$ is displayed on the display unit, and is then completed by step 3759.

At step 3768, if $\Delta > g_0$, the control proceeds to step 3770 in which an error indicating the impossibility of measurement is displayed at the display unit.

The control of this routine is completed by step 3771. Note, the control may proceed to another step (not shown) which commands a shift of the substrate carrier 56 so that the substrates S are successively measured. The measurement is also repeated for the same reasons as mentioned above.

At step 3744, if the maximum peak value $P_{MAX}$ does not exist, the control proceeds to 3772 in which the peak pitch PP is given a value lower than 0.8 (for example, 0.6) by varying a value $T_c$ shown in FIG. 29.

The control proceeds to step 3773 in which the scan data $I_i$ is fetched in the same manner as in the routine of step 3702.

The control then proceeds to step 3774 which calculates a minimum peak value $P_{MIN}$ from the scan data $I_i$ in the same manner as in the routine of step 3718b.

At step 3775, $g_5$ is calculated from a two-dimensional map by the parameters minimum peak $P_{MIN}$ and the reflectivity r, and thus the calculated $g_5$ may be evaluated as a dimension to be measured between the opposed edges.

At step 3776, calculation is carried out to determine a maximum $g_{MAX}$, a middle $g_{MID}$ and a minimum $g_{MIN}$ among $g_2$, $g_3$, and $g_5$.

At step 3777, a difference $\Delta$ between $g_{MAX}$ and $g_{MIN}$ is calculated by $$\Delta \leftarrow g_{MAX} - g_{MIN}$$

At step 3778, it is determined whether or not the difference $\Delta$ is smaller than a predetermined constant $g_0$.

If $\Delta < g_0$, the control proceeds to step 3779.

At step 3769, a mean value of $g_2$, $g_3$, and $g_5$ is calculated by $$\bar{g} \leftarrow (g_2 + g_3 + g_5)/3$$

The control then proceeds to step 3758 in which $\bar{g}$ is displayed at the display unit, and is then completed by step 3759.

At step 3778, if $\Delta > g_0$, the control proceeds to step 3770 in which an error indicating the impossibility of measurement is displayed at the display unit.

The control of this routine is completed by step 3771. Note, the control may proceeds to another step (not shown) which commands a shift of the substrate carrier 56 so that the substrates S are successively measured. The measurement is also repeated for the same reasons as mentioned above.

Figure 38A:
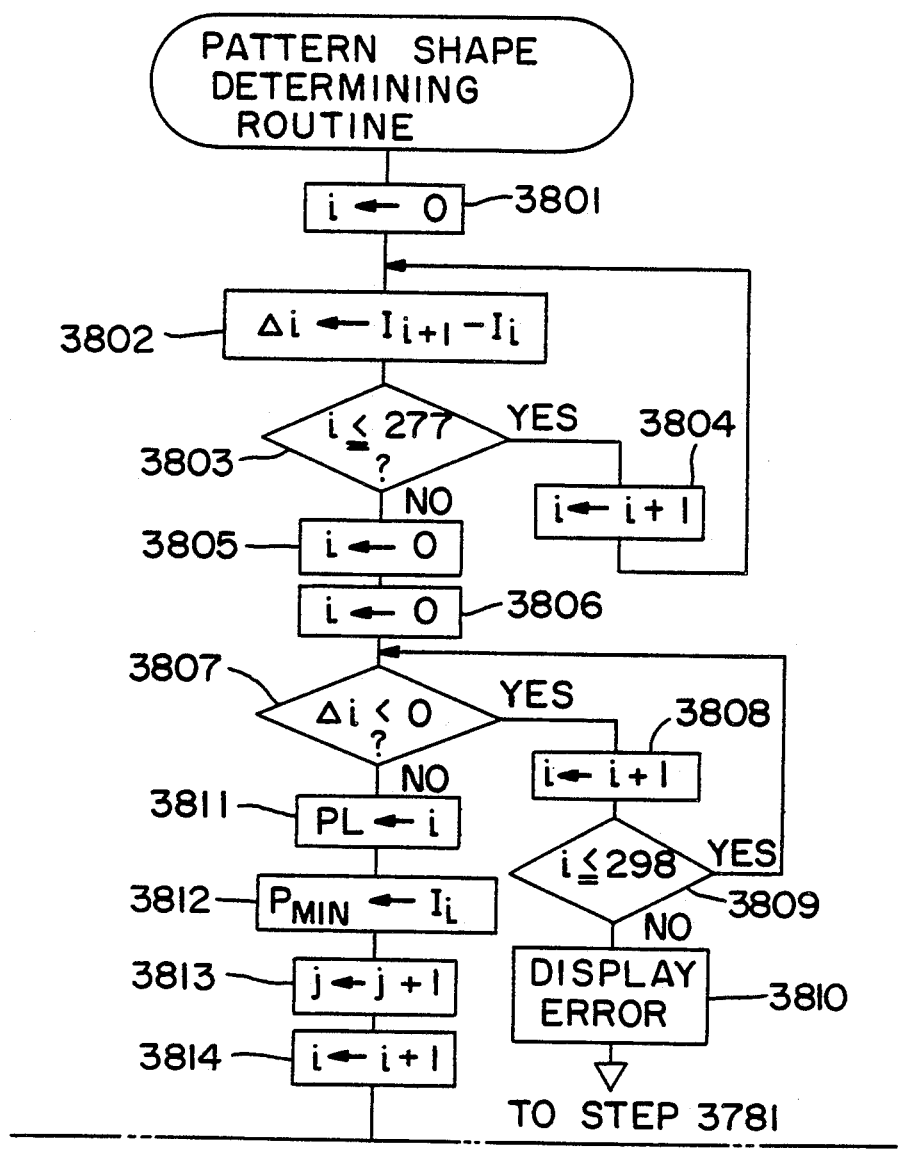
Figure 38B:
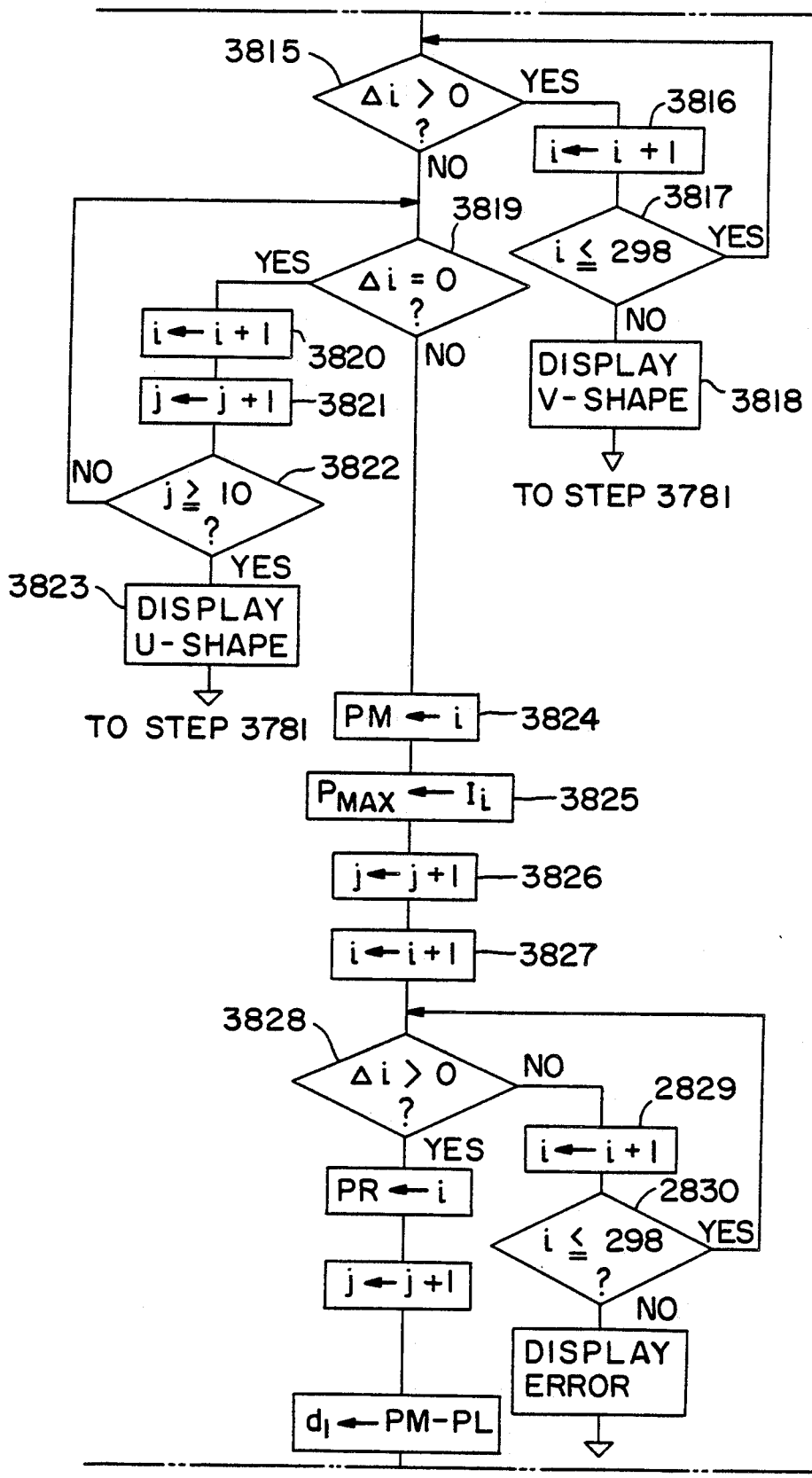
Figure 38C:
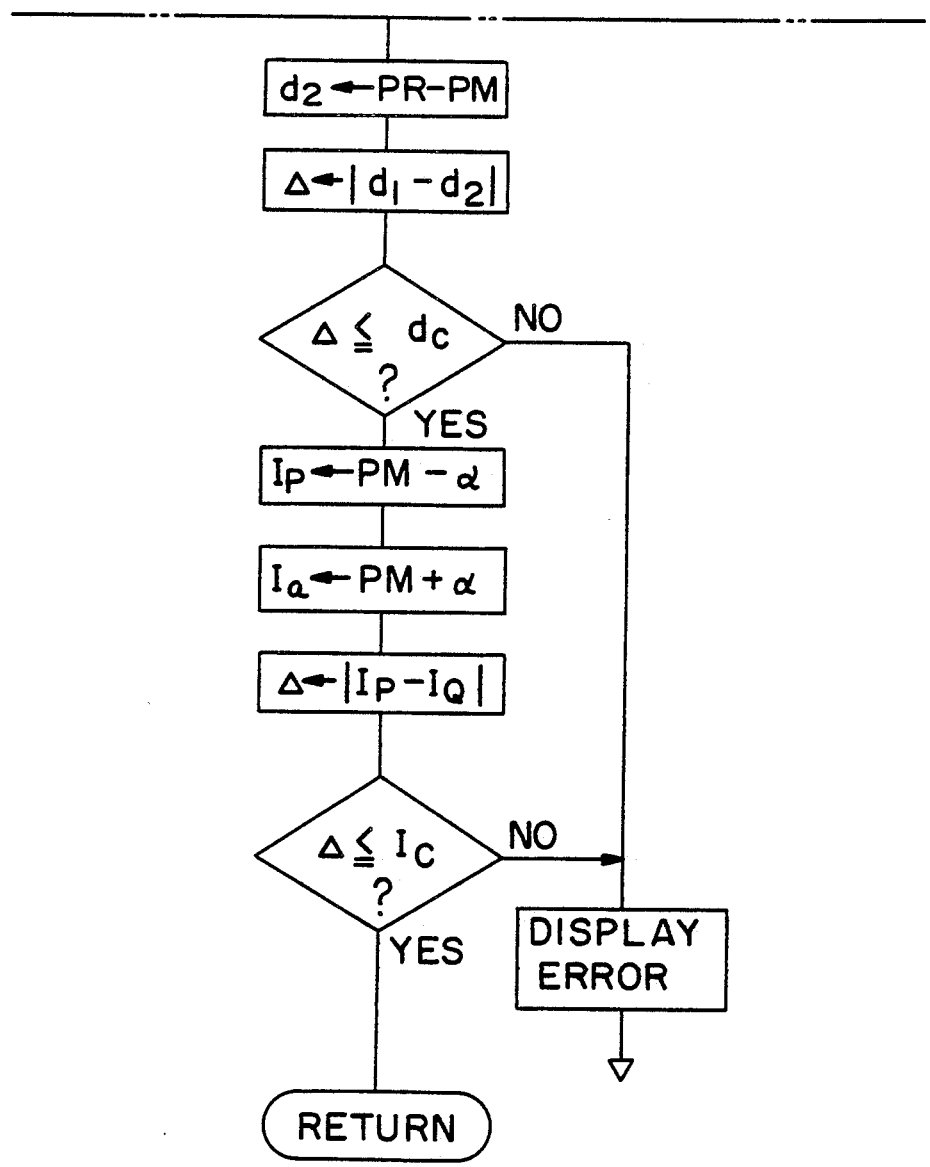
Figure 39:
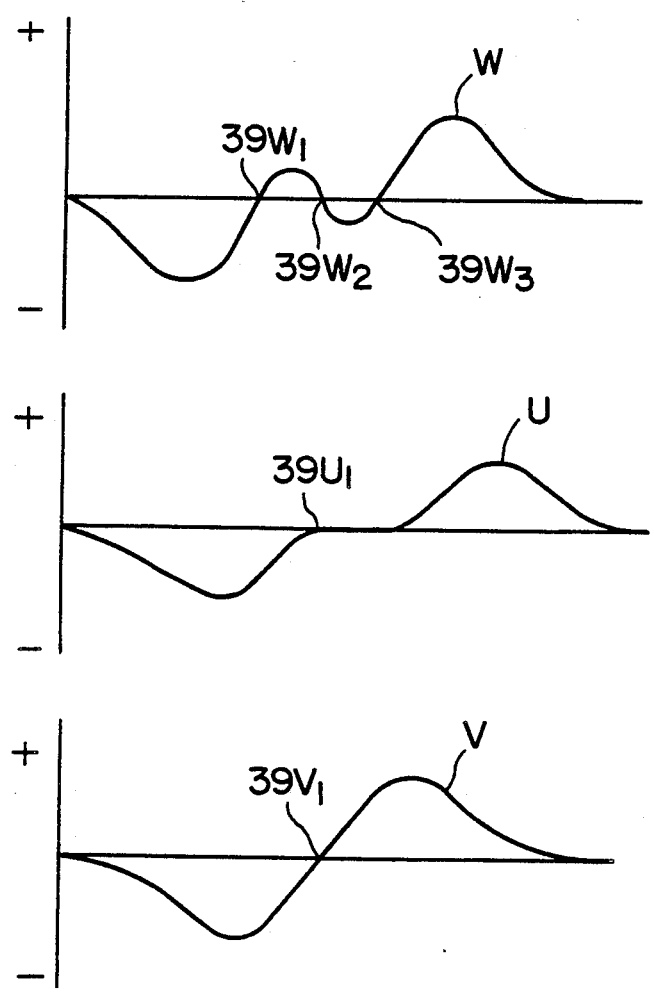
FIG. 39 is a graph for explaining of the flow chart of FIG. 38.

FIG. 38 shows a routine for determining a shape of the reflected light intensity pattern. This routine will be explained with reference to FIG. 39 which shows three curves W, U, and V obtained by differentiating the W-shaped, U-shaped, and V-shaped patterns, respectively.

At step 3801, the counter i is reset.

The control then proceeds to step 3802 in which a differentiation $\Delta_i$ is calculated by $$\Delta_i \leftarrow I_{i+1} - I_i$$

At step 3803, if $i \leq 297$, the control proceeds to step 3804 in which the counter i is incremented by 1. The routine including steps 3802, 3803, and 3804 is repeated until the counter i is counted up by 297.

At step 3803, if $i > 297$, the control proceeds to step 3805, and at step 3805, the counter i is reset.

At step 3806, a counter j is reset. The counter j counts the number of times at which the rate of change becomes zero.

At step 3807, if $\Delta_1 < 0$, the control proceeds to step 3808 in which the counter i is incremented by 1.

At step 3809, if $i \leq 298$, the control proceeds to step 3807. As long as $\Delta_1$ does not become plus, the routine including steps 3807, 3808 and 3809 is repeated until the counter i is counted up by 298. When $\Delta_i$ does not become plus until the counter i is counted up by 298, the reflected light intensity pattern concerned does not have any of the W-shape, U-shape and V-shape. The control proceeds to step 3810 in which an error indicating the impossibility of measurement is displayed at the display unit. The control is then completed by step 3781 of FIG. 37A.

At step 3807, if $\Delta_i > 0$, the control proceeds to step 3811 at which PL is made i. This time point may correspond to one of points $39W_1$, $39U_1$ and $39V_1$ of FIG. 39. If the pattern concerned has the correct W-shape, PL corresponds to one of the two minimum peaks At step 3812, $P_{MIN}$ is caused to be $I_i$.

At step 3813, the counter j is incremented by 1, at step 3814, the counter i is incremented by 1.

At step 3815, if $\Delta > 0$, the control proceeds to step 3816 in which the counter i is incremented by 1.

At step 3817, if $i \leq 298$, the control proceeds to step 3815. As long as $\Delta_i$ does not become minus, the routine including steps 3815, 3816, and 3817 is repeated until the counter i is counted up by 298. When $\Delta_i$ does not become minus until the counter i is counted up by 298, the pattern concerned can be considered to have the V-shape. The control proceeds to step 3818 in which an error indicating the impossibility of reliable measurement is displayed at the display unit. The control is then completed by step 3781 of FIG. 37A.

At step 3815, if $\Delta_i \leq 0$, the control proceeds to 3819 in which it is determined whether or not $\Delta_1$ is zero. In this case, $\Delta_1$ which is nearly equal to zero is considered to be a zero. For example, assuming that $\Delta_i$ is represented by eight bits, when the upper four bits thereof are "0000", it is considered to be a zero.

At step 3819, if $\Delta_i = 0$, the control proceeds to step 3820 in which the counter i is incremented by 1 and at step 3821, the counter j is incremented by 1.

At step 3822, if $j \leq 10$, the control proceeds to step 3819. The routine including steps 3819, 3820, and 3821 is repeated until the counter j is counted up by 10. If $j \geq 10$, at step 3822, it is determined that the pattern concerned has a U-shape, and the control then proceeds to step 3823 in which an error indicating the impossibility of reliable measurement is displayed at the display unit. The control is then completed by step 3781 of FIG. 37A.

At step 3819, if $\Delta_i \neq 0$ or $\Delta_i < 0$, the control proceeds to step 3824 at which PM is made i. Assuming that the pattern concerned has the correct W-shape this time point corresponds to a point of $39W_2$ of FIG. 39 and PM corresponds to the maximum peak.

At step 3825, $P_{MAX}$ is made $I_i$.

At step 3826, the counter j is incremented by 1, and at step 3827, the counter i is incremented by 1.

At step 3828, if $\Delta_i < 0$, the control proceeds to step 2829 in which the counter i is incremented by 1.

At step 3830, if $i \leq 298$, the control proceeds to step 2828. As long as $\Delta_i$ does not become minus, the routine including steps 3828, 3839, and 3830 is repeated until the counter i is counted up by 298. When $\Delta_i$ does not become plus until the counter i is counted up by 298, the pattern concerned can be considered to have a shape other than the W-shape. The control proceeds to step 3831 in which an error indicating the impossibility of reliable measurement is displayed at the display unit. The control is then completed by step 3781 of FIG. 37A.

At step 3828, if $\Delta_i > 0$, the control proceeds to step 3832 at which PR is made i. Assuming that the pattern concerned has the correct W-shape, this time point corresponds to a point of $39W_3$ of FIG. 39, and to the other minimum peak of the W-shape.

At step 3833, the counter j is incremented by 1, i.e., j=3. At this point, it is found that the pattern concerned has a W-shape, but it is possible to determine whether or not the W-shaped pattern is correct or symmetrical.

The control proceeds to step 3834 which calculates a distance $d_1$ between one PL of the minimum peaks and the maximum peak PM by $$d_1 \leftarrow PM - PL$$

At step 3835, a distance $d_2$ between the other minimum peak and the maximum peak is calculated by $$d_2 \leftarrow PR - PM$$

The control then proceeds to step 3836 which calculates a difference $\Delta$ between $d_1$ and $d_2$ by $$\Delta \leftarrow d_1 - d_2$$

At step 3837, it is determined whether or not $\Delta$ falls within a predetermined permissible range. Namely, if $\Delta \leq d_c$ ($d_c$=constant), the control proceeds to step 3838. Note, if the pattern concerned has the correct W-shape, $d_1$ and $d_2$ must be equal.

At step 3838, a reflected light intensity $I_p$ is calculated at a point apart from the maximum peak by $\alpha$. The calculation is carried out by $$I_p \leftarrow PM + \alpha$$

At step 3839, reflected light intensity $I_Q$ is calculated at the other point apart from by $\alpha$. The calculation is carried out by $$I_P \leftarrow PM + \alpha$$

At step 3840, a difference $\Delta$ between $I_P$ and $I_Q$ is calculated by $$\Delta \leftarrow I_P - I_Q$$

At step 3841, it is determined whether or not $\Delta$ falls within a predetermined permissible range. Note, if the pattern concerned has the correct W-shape, $I_P$ and $I_Q$ must be equal. Of $\Delta \leq I_c$ ($I_c$=constant), the control proceeds to step 3842 and is then returned to step 3704 of FIG. 37.

At step 3837, if $\Delta > d_c$, the control proceeds to step 3843 in which an error indicating the impossibility of reliable measurement is displayed at the display unit. The control is then completed by step 3781 of FIG. 37A.

At step 3841, if $\Delta > I_c$, the control also proceeds to step 3843 and then to step 3781 of FIG. 37A.

Figure 40:
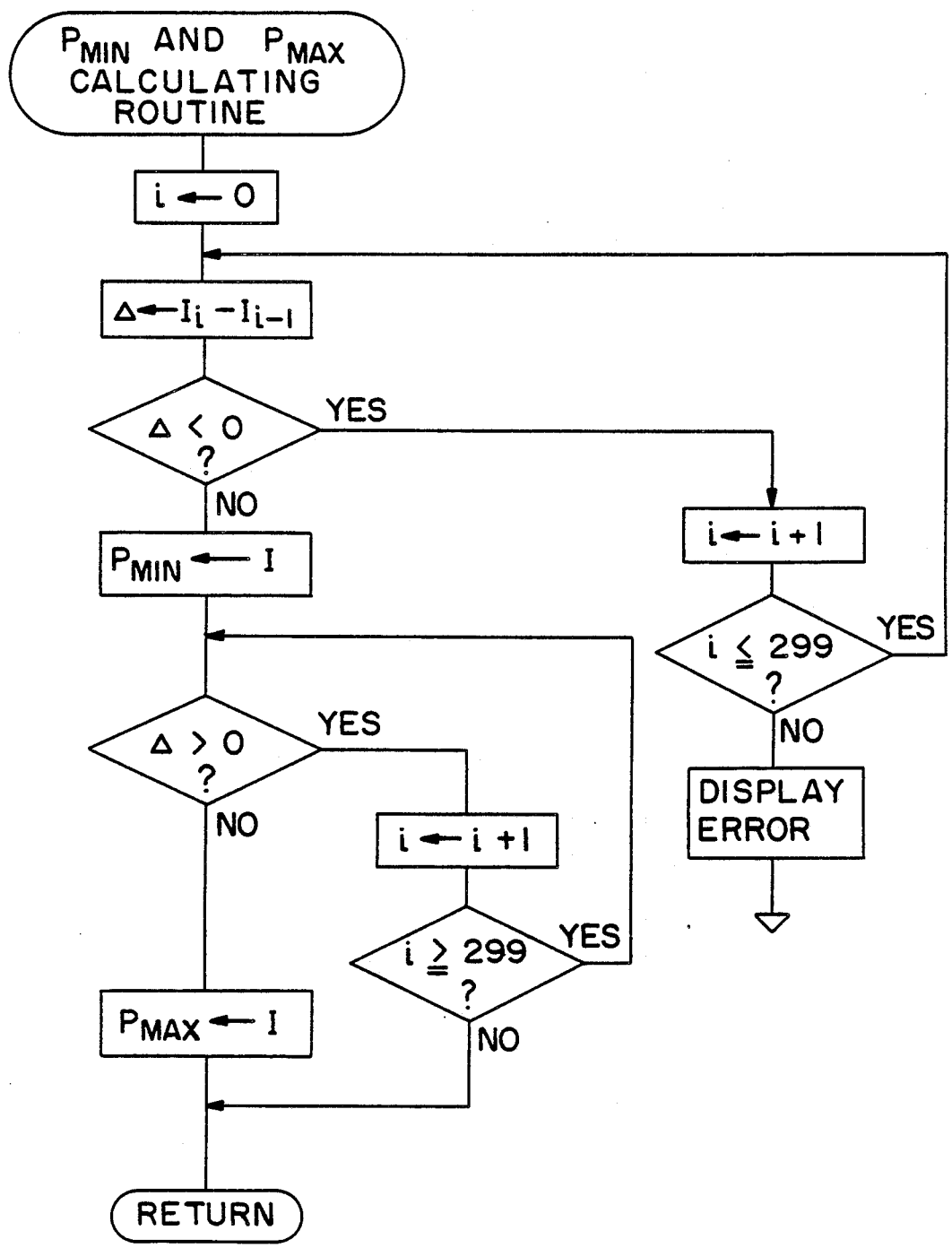

FIG. 40 shows a routine for calculating a minimum peak value $P_{MIN}$ a maximum peak value $P_{MAX}$ from the reflected light intensity data pattern ($I_i$) in such a manner that only the minimum peak value $P_{MIN}$ is obtained if the maximum peak value $P_{MAX}$ does not exist.

At step 4001, the counter reset i is reset.

The control then proceeds to step 4002 which calculates a difference $\Delta$ between $I_i$ and $I_{i-1}$ below:

$$\Delta \leftarrow I_i - I_{i-1} /$$

At step 4003, if $\Delta < 0$, the control proceeds to step 4004.

At step 4004, the counter i is incremented by 1 and the control proceeds to step 4005.

At step 4005, if $i \leq 299$, the control proceeds to step 4002.

As long as $\Delta$ is minus, the routine including step 4002 to 4005 is repeated until the counter i is counted up by 299. The control proceeds to step 4006 in which an error is displayed on the display unit, and then proceeds to step 3714 of FIG. 37A.

At step 4003, if $\Delta \leq 0$, the control proceeds to step 4007.

At step 4007, $P_{MIN}$ is made $I_i$ and the control then proceeds to step 4008.

At step 4008, if $\Delta < 0$, the control proceeds to step 4009 at which $P_{MAX}$ is made $I_i$.

The control proceeds to step 4010 and is then returned to step 3718b of FIG. 37A.

At step 4008, if $\Delta > 0$, the control proceeds to step 4011 in which the counter i is incremented by 1.

At step 4012, if $i \leq 299$, the control proceeds to step 4008. As long as $\Delta$ is plus, the routine including step 4008, 4011, and 4012 is repeated until the counter i is counted up by 299. Then, the control proceeds to step 4010 and is returned to step 3718b of FIG. 37A.

FIG. 41 is a routine for calculating a dimension between the opposed edges formed on the substrate S from a minimum peak value and a maximum peak value obtained from a reflected light intensity pattern representing the dimension between the opposed edges. In this operation, the scanning operation is repeated at least two times in such a manner that a peak pitch of the twin laser beam used in the first scanning operation is different from that of the twin laser beam used in the second scanning operation.

The control is begun at step 4101 by actuating the switch SW (FIG. 1).

The control then proceeds to step 4102 which is the same as the routine of FIG. 29. At step 4102, the peak pitch PP of the twin laser beam is first set at a predetermined suitable value. For example, the peak pitch PP of the twin laser beam is set at a value 0.8.

The control then proceeds to step 4103 in which three hundred scan data $I_i(i-299)$ are fetched in the manner as in step 2802 of FIG. 28. The fetched data $I_i$ represents the reflected light intensity pattern.

At step 4104, a minimum peak value $P_{MIN}$ and a maximum peak $P_{MAX}$ value are calculated from the scan data $I_i$. This routine is the same as the routine of FIG. 40.

The control then proceeds to step 4105 which determines whether or not the maximum peak value $P_{MAX}$ is obtained at step 4104. If the maximum peak value $P_{MAX}$ exists, the control proceeds to step 4106.

At step 4106, $g_1$ is calculated from a one-dimensional map by the parameter minimum peak $P_{MIN}$. This one-dimensional map corresponds to $CI_{MIN271}$, $CI_{MIN272}$, $CI_{MIN273}$, and $CI_{MIN274}$ of FIG. 27, and thus the calculated $g_1$ may be evaluated as a dimension to be measured between the opposed edges.

At step 4107, $g_2$ is calculated from a one-dimensional map by the parameter maximum peak $P_{MAX}$. This one-dimensional map corresponds to $CI_{MAX}$ of FIG. 21, and thus the calculated $g_2$ may be evaluated as a dimension to be measured between the opposed edges.

The control then proceeds to step 4108 in which a difference $\Delta$ between $g_1$ and $g_2$ is calculated by $$\Delta \leftarrow g_1 - g_2$$

At step 4109, it is determined whether or not the difference $\Delta$ is smaller than a predetermined constant $g_0$. If $\Delta \leq g_0$, the control proceeds to step 4110.

At step 4110, a mean value $\bar{g}$ of $g_1$ and $g_2$ is calculated by $$\bar{g} \leftarrow (g_1 + g_2)/2$$

The control proceeds to step 4111 in which $\bar{g}$ is displayed at the display unit, and is then completed by step 4112.

At step 4109, if $\Delta > g_0$, the control proceeds to step 4113 in which an error indicating the impossibility of measurement is displayed at the display unit, and the control is then completed by step 4112. At step 4105, if the maximum peak value $P_{MAX}$ does not exist, the control proceeds to step 4114.

At step 4114, $P_{MINO}$ is made $P_{MIN}$.

The control proceeds to step 4115 which is the same as the routine of FIG. 29. At step 4115, the peak pitch PP of the laser beam is set at 0.5, for example.

At step 4116, the second scanning operation is carried out with the twin beam having the pitch of 0.5 At step 4116, three hundred scan data $I_i(i-299)$ are also fetched in the same manner as in step 2802 of FIG. 28. The fetched data $I_i$ represents the second reflected light intensity pattern.

At step 4117, $P_{MIN}$ is calculated from the scan data $I_i$ in the same manner as in step 4104.

At step 4118, $g_1$ and $g_3$ is calculated from the one-dimensional map by the parameters minimum peak values $P_{MINO}$ and $P_{MIN}$, respectively.

The control then proceeds to step 4119 in which a difference $\Delta$ between $g_1$ and $g_3$ is calculated by $$\Delta \leftarrow g_1 - g_3$$

At step 4120, it is determined whether or not the difference $\Delta$ is smaller than a predetermined constant $g_0$. If $\Delta \leq g_0$, the control proceeds to step 4121.

At step 4121, a mean value $\bar{g}$ of $g_1$ and $g_3$ is calculated by $$\bar{g} \leftarrow (g_1 + g_3)/2$$

The control proceeds to step 4111 in which $\bar{g}$ is displayed at the display unit, and is completed by step 4112.

At step 4120, if $\Delta > g_0$, the control proceeds to step 4113 in which an error indicating the impossibility of measurement is displayed at the display unit, and the control is the completed by step 4112.

In the routine of FIG. 41, in order to enhance the accuracy and reliability of the measurement, a third scanning operation may be carried out with the twin laser beam having a different peak pitch. In this case, three distance values, which may be evaluated as a dimension to be measured, are obtained. These distance values can be processed as mentioned in the routines of FIGS. 33 and 34. Also, the routine of FIG. 41 may include the pattern shape determining routine of FIG. 38.

Figure 42A:
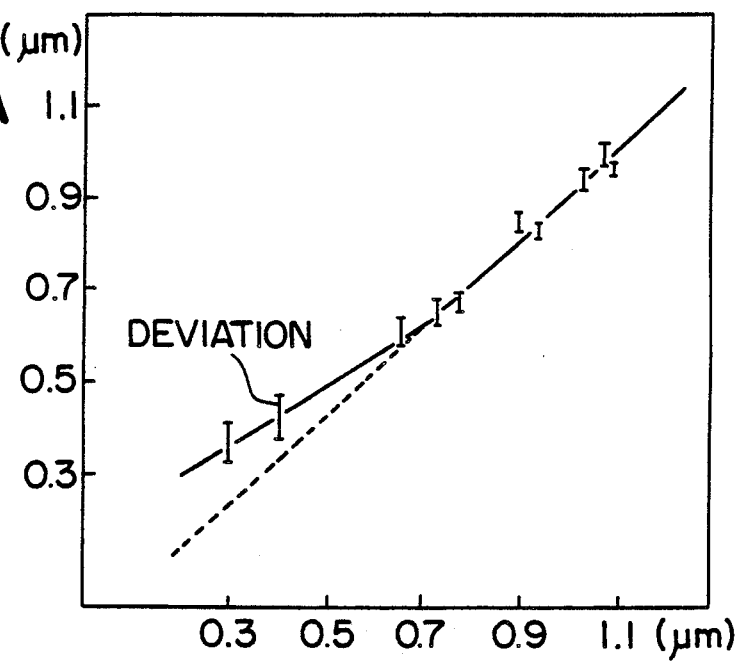
FIGS. 42A and 42B show results of the measurement carried out by a conventional measurement apparatus and an measurement apparatus according to the present invention.
Figure 42B:
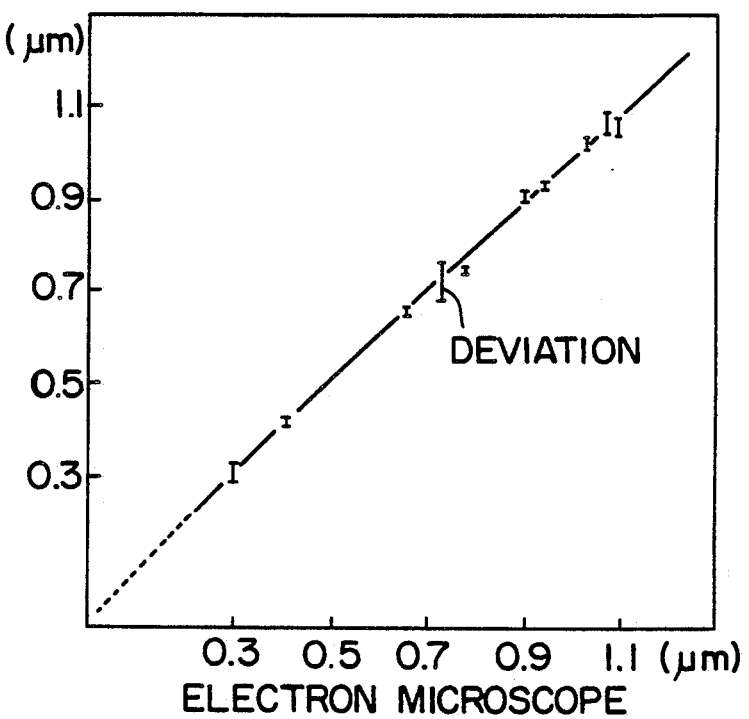

FIG. 42A shows a result of the measurement carried out by the conventional measurement apparatus using the television camera as mentioned in the introduction. FIG. 42B shows a result of a measurement according to the present invention. In FIGS. 42A and 42B, the straight line, part of which is shown by a broken line, is a characteristic obtained from an electron microscope. As can be easily understood from FIGS. 42A and 42B, a deviation of the measurement according to the present invention is considerably smaller in comparison with the prior art.

In all of the embodiments as disclosed hereinbefore, although a fine gap formed on a substrate, such as magnetic head, has been selected as the object to be measured, the micro-dimensional measurement apparatus according to the present invention can be, of course, used to measure any other fine object. Also, the measuring zone may be above the surface of a substrate or may be flush therewith. Namely, it should be understood that whenever the measuring zone has a reflectivity different from that of another surface, the measurement can be carried out by the present invention.

It will be further understood by those skilled in the art that the foregoing description is a preferred embodiment of the disclosed apparatus and that various changes and modifications may be made to the present invention without departing from the spirit and scope thereof.

I claim:

1. A micro-dimensional measurement apparatus for optically measuring a dimension between opposed edges formed on a surface of a substrate, the zone between said opposed edges and the surface of said substrate having a uniform reflectivity, the reflectivity of the zone between said opposed edges being different from that of said substrate surface, the reflectivity of the zone between said opposed edges being known, said apparatus comprising:

an optical scanning system for scanning the substrate with a twin light beam so that said beam crosses a distance between the opposed edges of said substrate, said twin light beam being defined as a beam composed of two parallel light beams having substantially the same spot diameter and substantially the same light intensity distribution having a maximum peak intensity at a center of the spot thereof, so that a light intensity distribution of said twin light beam is composed of both light intensity distributions of said two parallel light beams;

means for detecting light intensity information of the twin light beam reflected from the substrate during the scanning operation;

means for fetching the light intensity information detected by said detection means and for storing the fetched light intensity information to form a reflected light intensity data pattern;

means for calculating a minimum peak value and a maximum peak value from said reflected light intensity data pattern;

means for storing two kinds of reference data which correspond to said minimum and maximum peak values, respectively, said two kinds of reference data being obtained from a series of reflected light intensity sample pattern which are prepared with respect to predetermined sample dimensions;

means for calculating two distance values as a dimension to be measured between said opposed edges from said two kinds of reference data, receptively, on the basis of said minimum and maximum peak values calculated from said reflected light intensity data pattern;

means for calculating a difference value between said two distance values;

means for determining whether or not said difference value falls within a permissible range; and means for calculating a mean value from said distance values to evaluate said mean value as a true dimension to be measured between said opposed edges when said difference value falls within said permissible range.

2. A micro-dimensional measurement apparatus as set forth in claim 1, further comprising means for smoothing said reflected light intensity data pattern before said minimum and maximum peak values are calculated therefrom.

3. A micro-dimensional measurement apparatus as set forth in claim 1, wherein an interpolation method is introduced when said two distance values are calculated from said two kinds of reference data on the basis of said minimum and maximum peak values calculated from said reflected light intensity data pattern.

4. A micro-dimensional measurement apparatus as set forth in claim 1, wherein said optical scanning system comprises a light source for emitting a single light beam, an acoustic optical element through which said single light beam is passed, and an acoustic optical element driver for driving said acoustic optical element to generate the twin light beam from said single light beam and to deflect said twin light beam to scan the substrate therewith.

5. A micro-dimensional measurement apparatus as set forth in claim 4, wherein said single light beam comprises a laser beam having a Gaussian distribution as a light intensity distribution so that said twin light beam has a light intensity distribution composed of the two Gaussian distributions.

6. A micro-dimensional measurement apparatus for optically measuring a dimension between opposed edges formed on a surface of a substrate, the zone between said opposed edges and the surface of said substrate having a uniform reflectivity, the reflectivity of the zone between said opposed edges being different from that of said substrate surface, the reflectivity of the zone between said opposed edges being unknown, said apparatus comprising:

an optical scanning system for scanning the substrate with a twin light beam so that said beam crosses a distance between the opposed edges of said substrate, said twin light beam being defined as a beam composed of two parallel light beams having substantially the same spot diameter and substantially the same light intensity distribution having a maximum peak intensity at a center of the spot thereof, so that a light intensity distribution of said twin light beam is composed of both light intensity distributions of said two parallel light beams;

means for detecting light intensity information of the twin light beam reflected from the substrate during the scanning operation;

means for fetching the light intensity information detected by said detection means and for storing the fetched light intensity information to form a reflected light intensity data pattern;

means for calculating at least two of a minimum peak value, a maximum peak value and an integrated value from said reflected light intensity data pattern;

means for storing two kinds of reference data which correspond to the two values selected from said minimum peak value, said maximum peak value and said integrated value, respectively, said two kinds of reference data being obtained from a series of reflected light intensity sample patterns prepared with respect to predetermined sample dimensions which are selected for each of predetermined reflectivities;

means for calculating two distance values as a dimension to be measured between said opposed edges from said two kinds of reference data, respectively, on the basis of the selected two values calculated form said reflected light intensity data pattern;

means for calculating a difference value between said two distance values;

means for determining whether or not said difference value falls within a permissible range; and means for calculating a mean value from said two distance values to evaluate said mean value as a true dimension to be measured between said opposed edges when said difference value falls within said permissible range.

7. A micro-dimensional measurement apparatus as set forth in claim 6, further comprising means for smoothing said reflected light intensity data pattern before the two values selected from said minimum peak value, said maximum peak value and said integrated value are calculated therefrom.

8. A micro-dimensional measurement apparatus as set forth in claim 6, wherein an interpolation method is introduced when said two distance values are calculated from said two kinds of reference data on the basis of said minimum, maximum peak and integrated values calculated from said reflected light intensity data pattern.

9. A micro-dimensional measurement apparatus as set forth in claim 6, wherein said optical scanning system comprises a light source for emitting a single light beam, an acoustic optical element through which the single light beam is passed, and an acoustic optical element driver for driving said acoustic optical element to generate said twin light beam from the single light beam and to deflect said twin light beam to scan the substrate therewith.

10. A micro-dimensional measurement apparatus as set forth in claim 9, wherein said single light beam comprises a laser beam having a Gaussian distribution as a light intensity distribution so that said twin light beam has a light intensity distribution composed of two Gaussian distributions.

11. A micro-dimensional measurement apparatus for optically measuring a dimension between opposed edges formed on a surface of a substrate, the zone between said opposed edges and the surface of said substrate having a uniform reflectivity, the reflectivity of the zone between said opposed edges being different from that of said substrate surface, the reflectivity of the zone between said opposed edges being known, said apparatus comprising:

an optical scanning system for scanning the substrate with a twin light beam so that said beam crosses a distance between the opposed edges of said substrate, said twin light beam being defined as a beam composed of two parallel light beams having substantially the same spot diameter and substantially the same light intensity distribution having a maximum peak intensity at a center of the spot thereof, so that a light intensity distribution of said twin light beam is composed of both light intensity distribution of said two parallel light beams;

means for detecting light intensity information of the twin light beam reflected from the substrate during the scanning operation;

means for fetching the light intensity information detected by said detection means and for storing the fetched light intensity information to form a reflected light intensity data pattern;

means for calculating a minimum peak value, a maximum peak value and an integrated value from said reflected light intensity data pattern;

means for storing three kinds of reference data which correspond to said minimum peak value, said maximum peak value and said integrated value, respectively, said three kinds of reference data being obtained from a series of reflected light intensity sample patterns prepared with respect to predetermined sample dimensions which are selected for each of predetermined sample reflectivities;

means for calculating three distance values as a dimension to be measured between said opposed edges from said three kinds of reference data, respectively, on the basis of said minimum peak value, said maximum peak value and said integrated value calculated from said reflected light intensity data pattern;

means for calculating three difference values between said three distance values;

means for determining whether or not said three difference values fall within a permissible range; and means for calculating a mean value from said three distance values to evaluate said mean value as a true dimension to be measured between said opposed edges when said difference value falls within said permissible range.

12. A micro-dimensional measurement apparatus as set forth in claim 11, further comprising means for smoothing said reflected light intensity data pattern before said minimum peak value, said maximum peak value and said integrated value are calculated therefrom.

13. A micro-dimensional measurement apparatus as set forth in claim 11, wherein an interpolation method is introduced when said three distance values are calculated from said three kinds of reference data on the basis of said minimum peak value, said maximum peak value and said integrated value calculated from said reflected light intensity data pattern.

14. A micro-dimensional measurement apparatus as set forth in claim 11, wherein said optical scanning system comprises a light source for emitting a single light beam, an acoustic optical element through which the single light beam is passed, and an acoustic optical element driver for driving said acoustic optical element to generate the twin light beam from said single light beam and to deflect said twin light beam to scan the substrate therewith.

15. A micro-dimensional measurement apparatus as set forth in claim 14, wherein said single light beam comprises a laser beam having a Gaussian distribution as a light intensity distribution so that said twin light beam has a light intensity distribution composed of two Gaussian distributions.

16. A micro-dimensional measurement apparatus as set forth in claim 11, further comprising:

means for determining whether or not said difference values fall within a permissible range narrower than one half of said permissible range when at least one of said three difference values is outside said permissible range;

means for calculating a mean value from two distance values selected from said three distance values when one of said three difference values falls within said narrower permissible range, to evaluate said mean value as a true dimension to be measured between said opposed edges, the difference value which falls within said narrower permissible range resulting from the selected two distance values.

17. A micro-dimensional measurement apparatus for optically measuring a dimension between opposed edges formed on a surface of a substrate, the zone between said opposed edges and the surface of said substrate having a uniform reflectivity, the reflectivity of the zone between said opposed edges being different from that of said substrate surface, the reflectivity of the zone between said opposed edges being unknown, said apparatus comprising:

an optical scanning system for scanning the substrate with a twin light beam so that said beam crosses a distance between the opposed edges of said substrate, said twin light beam being defined as a beam composed of two parallel light beams having substantially the same spot diameter and substantially the same light intensity distribution having a maximum peak intensity at a center of the spot thereof, so that a light intensity distribution of said twin light beam is composed of both light intensity distributions of said two parallel light beams;

means for detecting light intensity information of the twin light beam reflected from the substrate during the scanning operation;

means for fetching the light intensity information detected by said detection means and for storing the fetched light intensity information to form a reflected light intensity data pattern;

means for calculating a minimum peak value, a maximum peak value and an integrated value from said reflected light intensity data pattern;

means for storing three kinds of reference data which correspond to said minimum peak value, said maximum peak value and said integrated value, respectively, said three kinds of reference data being obtained from a series of reflected light intensity sample patterns prepared with respect to predetermined sample dimensions which are selected for each of predetermined sample reflectivities;

means for calculating a distance value as a dimension to be measured between said opposed edges from two kinds of said three kinds of reference data, respectively, on the basis of the corresponding two values of said minimum peak value, said maximum peak value and said integrated value calculated from said reflected light intensity data pattern;

means for calculating a distance value as a dimension to be measured between said opposed edges from another two kinds of said three kinds of reference data, respectively, on the basis of the corresponding two values of said minimum peak value, said maximum peak value and said integrated value calculated from said reflected light intensity data pattern;

means for calculating a difference value between said two distance values;

means for determining whether or not said difference value falls within a permissible range; and means for calculating a mean value from said two distance values to evaluate said mean value as a true dimension to be measured between said opposed edges when said difference value falls within said permissible range.

18. A micro-dimensional measurement apparatus as set forth in claim 17, further comprising means for smoothing said reflected light intensity data pattern before said minimum peak value, said maximum peak value and said integrated value are calculated therefrom.

19. A micro-dimensional measurement apparatus as set forth in claim 17, wherein an interpolation method is introduced when said two distance values are calculated from said three kinds of reference data on the basis of said minimum peak value, said maximum peak value and said integrated value calculated from said reflected light intensity data pattern.

20. A micro-dimensional measurement apparatus as set forth in claim 17, wherein said optical scanning system comprises a light source for emitting a single light beam, an acoustic optical element through which the single light beam is passed, and an acoustic optical element driver for driving said acoustic optical element to generate the twin light beam from said single light beam and to deflect said twin light beam to scan the substrate therewith.

21. A micro-dimensional measurement apparatus as set forth in claim 20, wherein said single light beam comprises a laser beam having a Gaussian distribution as a light intensity distribution so that said twin light beam has a light intensity distribution composed of two Gaussian distributions.

22. A micro-dimensional measurement apparatus for optically measuring a dimension between opposed edges formed on a surface of a substrate, the zone between said opposed edges and the surface of said substrate having a uniform reflectivity, the reflectivity of the zone between said opposed edges being different from that of said substrate surface, the reflectivity of the zone between said opposed edges being unknown, said apparatus comprising:

an optical scanning system for selectivity scanning the substrate with one of first and second twin light beams so that said beam crosses a distance between the opposed edges of said substrate, each of said first and second twin light beam being defined as a beam composed of two parallel light beams having substantially the same spot diameter and substantially the same light intensity distribution having a maximum peak intensity at a center of the spot thereof, so that a light intensity distribution of each of said twin light beams is composed of both light intensity distributions of the two parallel light beams, a peak distance between the two maximum peaks of light intensity distributions of the two parallel light beams corresponding to said second twin light beam being narrower than the distance between the two maximum peaks of light intensity distributions of said two parallel light beams corresponding to said first twin light beam;

a detection means for detecting light intensity information of the twin light beam reflected from the substrate during the scanning operation;

a first data-pattern formation means for fetching the light intensity information detected by said detection means and for storing the fetched light intensity information to form a first reflected light intensity data pattern when the substrate is scanned with said first twin light beam by said optical scanning system;

a pattern-shape determination means for determining whether or not said first reflected light intensity data pattern is a suitable W-shaped pattern;

a first peak-value calculation means for calculating a minimum peak value and a maximum peak value from said first reflected light intensity data pattern when it is determined as the suitable W-shaped pattern by said pattern-shape determination means;

a first-peak value determination means for determining whether or not said minimum and maximum peak values fall within minimum and maximum peak value ranges, respectively;

said optical scanning system scanning the substrate with said second twin light beam when said minimum and maximum peak values do not fall within said minimum and maximum peak value ranges, respectively;

a second data-pattern formation means for fetching the light intensity information detected by said detection means and for storing the fetched light intensity information to form a second reflected light intensity data pattern when the substrate is scanned with the second twin light beam by said optical scanning system;

a second peak-value calculation means for calculating a minimum peak value and a maximum peak value from said second reflected light intensity data pattern;

a reference-data storage means for storing a first group of two kinds of reference data corresponding to said minimum and maximum peak values calculated from said first reflected light intensity data pattern, a second group of two kinds of reference data corresponding to said minimum and maximum peak values calculated from said second reflected light intensity data pattern, said first and second groups of two kinds of reference data being obtained from two series of reflected light intensity sample patterns, respectively, prepared with respect to predetermined sample dimensions selected for each of predetermined sample reflectivities, said sample dimensions and said sample reflectivities being able to be individually selected on each of said two series of reflected light intensity sample patterns;

a first distance-value calculation means for calculating two distance values as a dimension to be measured between said opposed edges from said first group of two kinds of reference data, respectively, on the basis of said minimum and maximum peak values calculated from said first reflected light intensity data pattern when said values fall within said minimum and maximum peak value permissible ranges, respectively;

a first difference-value calculation means for calculating a difference value between the two distance values calculated by said first distance-value calculation means;

a first difference-value determination means for determining whether or not the difference value calculated by said first difference-value calculation means falls within a first difference-value permissible range;

a first means-value calculation means for calculating a mean value from said two distance values to evaluate said mean value as a true dimension to be measured between said opposed edges when said difference value falls within said first permissible range;

a second distance-value calculation means for calculating two distance value as a dimension to be measured between said opposed edges from said second group of two kinds of reference data, respectively, on the basis of said minimum and maximum peak values calculated form said second reflected light intensity data pattern when said minimum and maximum peak values calculated from said first reflected light intensity data pattern by said first peak-value calculation means permissible ranges;

a second difference-value calculation means for calculating a difference value between the two distance values calculated from said second group of two kinds of reference data by said second distance-value calculation means;

a second difference-value determination means for determining whether or not the difference value between the two distance values calculated from said second group of two kinds of reference data by said second distance-value calculation means falls within a second difference-value permissible range; and a second mean-value calculation means for calculating a mean value from the two distance values, which are calculated from said second group of two kinds of reference data by said second distance-value calculation mans, to evaluate said mean value as a true dimension to be measured between said opposed edges when the difference value calculated by said second difference-value calculation means falls within said second difference-value permissible range.

23. A micro-dimensional measurement apparatus as set forth in claim 22, further comprising means for smoothing said first reflected light intensity data pattern before the pattern shape thereof is determined by the pattern-shape determination means, and for further smoothing said second reflected light intensity data pattern before said minimum and maximum peak values are calculated therefrom by said second peak-value calculation means.

24. A micro-dimensional measurement apparatus as set forth in claim 22, wherein an interpolation method is introduced when the two distance values are calculated from said first group of two kinds of reference data by said first distance-value calculation means on the basis of said minimum and maximum peak values calculated from said first reflected light intensity data pattern by said first peak-value calculation means; and wherein an interpolation method is also introduced when the two distance values are calculated from said second group of two kinds of reference data by said second distance-value calculation means on the basis of said minimum and maximum peak values calculated from said second reflected light intensity data pattern by said second peak-value calculation means.

25. A micro-dimensional measurement apparatus as set forth in claim 22, wherein said optical scanning system comprises a light source for emitting a single light beam, an acoustic optical element through which the single light beam is passed, and an acoustic optical element driver for driving said acoustic optical element to selectively generate; one of said first and second twin light beams from the single light beam and to deflect said twin light beam to scan the substrate therewith.

26. A micro-dimensional measurement apparatus as set forth in claim 25, wherein said single light beam comprises a laser beam having a Gaussian distribution as a light intensity distribution so that said twin light beam has a light intensity distribution composed of two Gaussian distributions.

27. A micro-dimensional measurement apparatus as set forth in claim 22, wherein when only one of said minimum and maximum peak values is obtained from said second reflected light intensity data pattern by the calculation of said second peak-value calculation means, said second distance-value calculation means calculates a single distance value, on the basis of the single peak value obtained by said second peak-value calculation means, from the corresponding one kind of reference data included in said second group of two kinds of reference data, the single distance value calculated by said second distance-value calculation means being evaluated as a true dimension to be measured between said opposed edges.

28. A micro-dimensional measurement apparatus as set forth in claim 27, further comprising means for smoothing said first reflected light intensity data pattern before the pattern shape thereof is determined by said pattern-shape determination means, and for further smoothing said second reflected light intensity data pattern before the single peak value is calculated therefrom by said second peak-value calculation means.

29. A micro-dimensional measurement apparatus as set forth in claim 27, wherein an interpolation method is introduced when the two distance values are calculated by said first distance-value calculation means; and wherein an interpolation method is also introduced when the single distance value is calculated by said second distance-value calculation means.

30. A micro-dimensional measurement apparatus as set forth in claim 27, wherein said optical scanning system comprises a light source for emitting a single light beam, an acoustic optical element through which the single light beam is passed, and an acoustic optical element driver for driving said acoustic optical element to selectively generate one of said first and second twin light beams from said single light beam and to deflect said twin light beam to scan the substrate therewith.

31. A micro-dimensional measurement apparatus as set forth in claim 30, wherein said single light beam comprises a laser beam having a Gaussian distribution as a light intensity distribution so that said twin light beam has a light intensity distribution composed of the two Gaussian distributions.

32. A micro-dimensional measurement apparatus as set forth in claim 22, wherein said optical scanning system is further able to selectively scan the substrate with a third twin light beam so that said beam crosses a distance between the opposed edges of said substrate, said third twin light beam being also defined as a beam composed of two parallel light beams having substantially the same spot diameter and substantially the same light intensity distribution having maximum peak intensity at a center of the spot thereof, so that a light intensity distribution of said third twin light beam is composed of both the light intensity distributions of said two parallel light beams, a peak distance between the two maximum peaks of light intensity distributions of the two parallel light beams corresponding to said third twin light beam being narrower than the peak distance between the two maximum peaks of light intensity distributions of the two parallel light beams corresponding to said second twin light beam;

wherein said optical scanning system scans the substrate with said third twin light beam when only one of said minimum and maximum peak values is obtained from said second reflected light intensity data pattern by the calculation of said second peak-value calculation means; and wherein said second distance value calculation means calculates a single distance value as a dimension to be measured between said opposed edges, on the basis of the single peak value obtained by the calculation of said second peak-value calculation means, from the corresponding one kind of reference data included in said second group of two kinds of reference data, said apparatus further comprising:

a third data-pattern formation means for fetching the light intensity information detected by said detection means and for storing the fetched light intensity information to form a second reflected light intensity data pattern when the substrate is scanned with said third twin light beam by said optical scanning system;

a third peak-value calculation means for calculating single peak value, which corresponds to the single peak value obtained by the calculation of said second peak-value calculation means, from said third reflected light intensity data pattern;

said reference-data storage means further storing a single kind of reference data corresponding to the single peak value calculated by said third peak-value calculation means, said single kind of reference data being obtained from a series of reflected light intensity sample patterns prepared with respect to predetermined sample dimensions selected from each of predetermined sample reflectivities;

a third distance-value calculation means for calculating a single distance value as a dimension to be measured between said opposed edges from said single kind of reference data on the basis of the peak value calculated from said third reflected light intensity data pattern by said third peak-value calculation means;

a third difference-value calculation means for calculating a difference value between the two single distance values calculated by said second distance-value calculation means and by said third distance-value calculation means, respectively;

a third difference-value determination means for determining whether or not the difference value calculated by said third difference-value calculation means falls within a third difference-value permissible range; and a third mean-value calculation means for calculating a mean value from the two single distance values, which are calculated by said second distance-value calculation means and by said third distance-value calculation means, respectively, to evaluate said mean value as a true dimension to be measured between said opposed edges when the difference value calculated by said third difference-value calculation means falls within said third difference-value permissible range.

33. A micro-dimensional measurement apparatus as set forth in claim 32, further comprising means for smoothing said first reflected light intensity data pattern before the pattern shape thereof is determined by said pattern-shape determination means, and for further smoothing said second and third reflected light intensity data patterns before the two single peak values are calculated therefrom by said second peak-value calculation means and by said third peak-value calculation means, respectively.

34. A micro-dimensional measurement apparatus as set forth in claim 32, wherein an interpolation method is introduced when the two distance values are calculated by said first peak-value calculation means; and wherein an interpolation method is introduced when the two single distance values are calculated by said second distance-value calculation means and by said third distance-value calculation means, respectively.

35. A micro-dimensional measurement apparatus as set forth in claim 32, wherein said optical scanning system comprises a light source for emitting a single light beam, an acoustic optical element through which the single light beam is passed, and an acoustic optical element driver for driving said acoustic optical element to selectively generate one of said first, second and third twin light beams from the single light beam and to deflect acid twin light beam to scan the substrate therewith.

36. A micro-dimensional measurement apparatus as set forth in claim 35, wherein said single light beam comprises a laser beam having a Gaussian distribution as a light intensity distribution so that said twin light beam has a light intensity distribution composed of the two Gaussian distributions.

37. A micro-dimensional measurement apparatus as set forth in claim 22, wherein said optical scanning system is further able to selectively scan the substrate with a third twin light beam so that said beam crosses a distance between the opposed edges of said substrate, said third twin light beam being also defined as beam composed of two parallel light beams having substantially the same spot diameter and substantially the same light intensity distribution having a maximum peak intensity at a center of the spot thereof, so that a light intensity distribution of said third twin light beam is composed of both the light intensity distributions of said two parallel light beams, a peak distance between the two maximum peaks of light intensity distributions of the two parallel light beams corresponding to said third twin light beam being narrower than that between the two maximum peaks of light intensity distributions of the two parallel light beams corresponding to said second twin light beam; wherein said optical scanning system scans the substrate with said third twin light beam when only one of said minimum and maximum peak values calculated from said first reflected light intensity data pattern by said first peak-value calculation means falls within the corresponding one of said minimum and maximum peak value permissible ranges; wherein said first distance-value calculation means calculates a first distance value as a dimension to be measured between said opposed edges, on the basis of the peak value which falls within the corresponding one of said minimum and maximum peak value permissible ranges, from the corresponding one kind of reference data included in said first group of two kinds of reference data; and wherein said second distance-value calculation means calculates a second distance value as dimension to be measured between said opened edges, on the basis of one of said minimum and maximum peak values calculated from the second reflected light intensity data pattern by said second peak-value calculation means, from the corresponding one kind of reference data included in said second group of two kinds of reference data, said apparatus comprising:

a third data-pattern formation means for fetching the light intensity information detected by said detection means and for storing the fetched light intensity information to form a second reflected light intensity data pattern when the substrate is scanned with said third twin light beam by said optical scanning system;

a third peak-value calculation means for calculating a minimum peak value and a maximum peak value from said third reflected light intensity data pattern;

said reference-data storage means further storing a third group of two kinds of reference data corresponding to said minimum and maximum peak values calculated by said third peak-value calculation means, said third group of two kinds of reference data being obtained from a series of reflected light intensity sample patterns prepared with respect to predetermined sample dimensions which are selected for each of predetermined sample reflectivities;

a third distance-value calculation means for calculating a third distance values as a dimension to be measured between said opposed edges, on the basis of one of said minimum and maximum peak values calculated by said third peak-value calculation means, from the corresponding one kind of reference data included in said third group of two kinds of reference data;

a third difference-value calculation means for calculating three difference values among said first, second and third distance values;

a third difference-value determination means for determining whether or not said three difference values fall within a third difference-value permissible range; and a third mean-value calculation means for calculating a mean value from said first, second and third values to evaluate said mean value as a true dimension to be measured between said opposed edges when said three difference values fall within said third difference-value permissible range.

38. A micro-dimensional measurement apparatus as set forth in claim 37, further comprising means for smoothing said first reflected light intensity data pattern before the pattern shape thereof is determined by said pattern-shape determination means, and for further smoothing said second and third reflected light intensity data patterns before the two peak values are calculated therefrom by said second peak-value calculation means and by said third peak-value calculation means, respectively.

39. A micro-dimensional measurement apparatus as set forth in claim 37, wherein an interpolation method is introduced when the first, second and third distance values are calculated by said first, second and third distance-value calculation means, respectively.

40. A micro-dimensional measurement apparatus as set forth in claim 37, wherein said optical scanning system comprises a light source for emitting a single light beam, an acoustic optical element through which the single light beam is passed, and an acoustic optical element driver for driving said acoustic optical element to selectively generate one of said first, second and third twin light beams from the single light beam and to deflect said twin light beam to scan the substrate therewith.

41. A micro-dimensional measurement apparatus as set forth in claim 40, wherein said single light beam comprises a laser beam having a Gaussian distribution as a light intensity distribution so that said twin light beam has a light intensity distribution composed of the two Gaussian distributions.

42. A micro-dimensional measurement apparatus as set forth in claim 37, further comprising:

means for determining whether or not said three difference values fall within a fourth permissible range narrower than one half of said third permissible range when at least one of said three difference values is outside said third permissible range; and means for calculating a mean value from two values selected from said three distance values when one of said three difference values falls within said fourth permissible range, to evaluate said mean value as a true dimension to be measured between said opposed edges, the difference value which falls within said fourth permissible range resulting from the selected two distance values.

43. A micro-dimensional measurement apparatus for optically measuring a dimension between opposed edges formed on a surface of a substrate, the zone between said opposed edges and the surface of said substrate having a uniform reflectivity, the reflectivity of the zone between said opposed edges being different from that of said substrate surface, the reflectivity of the zone between said opposed edges being unknown, said apparatus comprising:

an optical scanning system for selectively scanning the substrate with one of first and second twin light beams so that said beam crosses a distance between the opposed edges of said substrate, each of said twin light beams being defined as a beam composed of two parallel light beams having substantially the same spot diameter and substantially the same spot diameter and substantially the same light intensity distribution having a maximum peak intensity at a center of the spot thereof, so that a light intensity distribution of each twin light beam is composed of both light intensity distributions of said two parallel light beams, a peak distance between the two maximum peaks of light intensity of the two parallel light beams corresponding to said second twin light beam being narrower than the peak distance between the two maximum peaks of light intensity distributions of the two parallel light beams corresponding to said first twin light beam;

a detection means for detecting light intensity information of the twin light beam reflected from the substrate during the scanning operation;

a first data pattern formation means for fetching the light intensity information detected by said detection means and for storing the fetched light intensity information to form a first reflected light intensity data pattern when the substrate is scanned with said first twin light beam by said optical scanning system;

a pattern-shape determination means for determining whether or not said first reflected light intensity data pattern is a suitable W-shaped pattern;

a first peak-value calculation means for calculating a minimum peak value and a maximum peak value from said first reflected light intensity data pattern when it is determined to be the suitable W-shaped pattern by said pattern-shape determination means;

a second data-pattern formation means for fetching the light intensity information detected by said detection means and for storing the fetched light intensity information to form a second reflected light intensity data pattern when the substrate is scanned with said second twin light beam by said optical scanning system;

a second peak-value calculation means for calculating a minimum peak value and a maximum peak value from said second reflected light intensity data pattern;

a reference-data storage means for storing a first group of two kinds of reference data corresponding to said minimum and maximum peak values calculated from said first reflected light intensity data pattern, a second group of two kinds of reference data corresponding to said minimum and maximum peak values calculated from said second reflected light intensity data pattern, said first and second groups of two kinds of reference data being obtained from two series of reflected light intensity sample patterns, respectively, prepared with respect to predetermined sample dimensions selected for each of predetermined sample reflectivities, said sample dimensions and said sample reflectivities being able to be individually selected on each of said two series of reflected light intensity sample patterns;

a first distance-value calculation means for calculating a first distance values as a dimension to be measured between said opposed edges, on the basis of one of said minimum and maximum peak values calculated by said third peakvalue calculation means, from the corresponding one kind of reference data included in said first group of two kinds of reference data;

a second distance-value calculation means for calculating a second distance value as a dimension to be measured between said opposed edges, on the basis of one of said minimum and maximum peak values calculated by said second peak-value calculation means, from the corresponding one kind of reference data included in said second group of two kinds of reference data;

said one of the minimum and maximum peak values calculated by said first peak-value calculation means and said one of said minimum and maximum peak values calculated by said second peak-value calculation means being different from each other in peak value type;

a difference-value calculation means for calculating a difference value between said first and second distance values calculated by said first distance-value means and by said second distance-value calculation means, respectively;

a difference-value determination means for determining whether or not said difference value falls within a permissible range; and a mean-value calculation means for calculating a mean value from said first and second distance values to evaluate said mean value as a true dimension to be measured between said opposed edges when said difference value falls within said permissible range.

44. A micro-dimensional measurement apparatus as set forth in claim 43, further comprising means for smoothing said first reflected light intensity data pattern before the pattern shape thereof is determined by the pattern-shape determination means, and for further smoothing said second reflected light intensity data pattern before one of said minimum and maximum peak values are calculated therefrom by said second peak-value calculation means.

45. A micro-dimensional measurement apparatus as set forth in claim 43, wherein an interpolation method is introduced when the first distance and second values are calculated by said first distance-value calculation means and by said second distance-value calculation means, respectively.

46. A micro-dimensional measurement apparatus as set forth in claim 43, wherein said optical scanning system comprises a light source for emitting a single light beam, an acoustic optical element through which the single light beam is passed, and an acoustic optical element driver for driving said acoustic optical element to selectively generate one of said first and second twin light beams from the single light beam and to deflect said twin light beam to scan the substrate therewith.

47. A micro-dimensional measurement apparatus as set forth in claim 46, wherein said single light beam comprises a laser beam having a Gaussian distribution as a light intensity distribution so that said twin light beam has a light intensity distribution composed of two gaussian distributions.

48. A micro-dimensional measurement apparatus for optically measuring a dimension between opposed edges formed on a surface of a substrate, the zone between said opposed edges and the surface of said substrate having a uniform reflectivity, the reflectivity of the zone between said opposed edges being different from that of said substrate surface, the reflectivity of the zone between said opposed edges being known, said apparatus comprising:

an optical scanning system for scanning the substrate with a twin light beam so that said beam crosses a distance between the opposed edges of said substrate, said twin light beams being defined as a beam composed of two parallel light beams having substantially the same diameter and substantially the same light intensity distribution having a maximum peak intensity at a center of the spot thereof, so that a light intensity distribution of said twin light beam is composed of both light intensity distributions of said two parallel light beams, a peak distance between the two maximum peaks of light intensity of said two parallel light beams being adjustable;

a detection means for detecting light intensity information of the twin light beam reflected from the substrate when the scanning operation is repeated at least two times, said peak distance being altered in each of the scanning operations;

a first data-pattern formation means for fetching the light intensity information detected by said detection means and for storing the fetched light intensity information to form a second reflected light intensity data pattern when the substrate is scanned with the twin light beam in the first scanning operation;

a second data-pattern formation means for fetching the light intensity information detected by said detection means and for storing the fetched light intensity information to form a second reflected light intensity data pattern when the substrate is scanned with the twin light beam in the second scanning operation;

a first peak-value calculation means for calculating a minimum peak value and/or a maximum peak value from said first reflected light intensity data pattern;

a second peak-value calculation means for calculating a minimum peak value and/or a maximum peak value from said second reflected light intensity data pattern;

a reference-data storage means for storing reference peak data corresponding to said minimum and/or maximum peak values calculated from each of said first and second reflected light intensity data patterns by said peak value calculation means, said reference peak data being obtained from a series of reflected light intensity sample patterns prepared with respect to predetermined sample dimensions selected for each of predetermined sample peak distances concerning said two parallel light beam;

a first-distance-value calculation means for calculating a first distance value as a dimension to be measured between said opposed edges from said reference peak data on the basis of said minimum and/or maximum peak values calculated from said first reflected light intensity data pattern by said first peak-value calculation means;

a second distance-value calculation means for calculating a second distance value as a dimension to be measured between said opposed edges from said reference peak data on the basis of said minimum and/or maximum peak values calculated from said second reflected light intensity data pattern by said second peak-value calculation means;

a difference-value calculation means for calculating a difference value between the first and second distance values calculated by said first distance-value calculation means and by said second distance-value calculation means, respectively;

a difference-value determination means for determining whether or not the difference value calculated by said difference-value calculation means falls within a permissible range; and a mean-value calculation means for calculating a mean value from said first and second distance values to evaluate said mean value as a true dimension to be measured between said opposed edges when said difference value falls within said permissible range.

49. A micro-dimensional measurement apparatus as set forth in claim 48, further comprising means for smoothing said first and second reflected light intensity data patterns before the pattern shape thereof is determined by the pattern-shape determination means.

50. A micro-dimensional measurement apparatus as set forth in claim 48, wherein an interpolation method is introduced when the first distance and second values are calculated by said distance-value calculation means.

51. A micro-dimensional measurement apparatus as set forth in claim 48, wherein said optical scanning system comprises a light source for emitting a single light beam, an acoustic optical element through which the single light beam is passed, and an acoustic optical element driver for driving said acoustic optical element to generate the twin light beam from the single light beam and to deflect said twin light beam to scan the substrate therewith.

52. A micro-dimensional measurement apparatus as set forth in claim 51, wherein said single light beam comprises a laser beam having a Gaussian distribution as a light intensity distribution so that said twin light beam has a light intensity distribution composed of the two Gaussian distributions.

53. A micro-dimensional measurement apparatus as set forth in claim 48, further comprising:

a third data-pattern formation means for fetching the light intensity information detected by said detection means and for storing the fetched light intensity information to form a second reflected light intensity data pattern when the substrate is scanned with the twin light beam in the third scanning operation.

a third peak-value calculation means for calculating a minimum peak value and/or a maximum peak value from said third reflected light intensity data pattern;

said reference-data storage means further storing reference peak data corresponding to either one or both of said minimum and maximum peak values calculated from said third reflected light intensity data pattern by said third peakvalue calculation means, said reference peak data being obtained from a series of reflected light intensity sample patterns prepared with respect to predetermined sample dimensions selected for a predetermined sample peak distance concerning said two parallel light beam;

a third distance-value calculation means for calculating a third distance value as a dimension to be measured between said opposed edges from said reference peak data on the basis of either one or both of said minimum and maximum peak values calculated from said third reflected light intensity data pattern by said third peak-value calculation means;

a difference-value calculation means for calculating three difference values among said first, second and third distance values calculated by said first, second and third distance-value calculations means, respectively;

a difference-value determination means for determining whether or not said three difference values falls within a permissible range; and a mean-value calculation means for calculating a mean value from said first, second and third distance values to evaluate said mean value as a true dimension to be measured between said opposed edges when said three difference values falls within said permissible range.

54. A micro-dimensional measurement apparatus as set forth in claim 53, further comprising means for smoothing said first, second and third reflected light intensity data patterns before the pattern shape thereof is determined by the pattern-shape determination means.

55. A micro-dimensional measurement apparatus as set forth in claim 53, wherein an interpolation method is introduced when the first, second and third values are calculated by said first, second and third distancevalue calculation means, respectively.

56. A micro-dimensional measurement apparatus as set forth in claim 53, wherein said optical scanning system comprises a light source for emitting a single light beam, an acoustic optical element through which the single light beam is passed, and an acoustic optical element driver for driving said acoustic optical element to generate the twin light beam from the single light beam and to deflect said twin light beam to scan the substrate therewith.

57. A micro-dimensional measurement apparatus as set forth in claim 56, wherein said single light beam comprises a laser beam having a Gaussian distribution as a light intensity distribution so that said twin light beam has a light intensity distribution composed of two Gaussian distributions.

58. A micro-dimensional measurement apparatus as set forth in claim 48, further comprising:
  means for determining whether or not said three difference values fall within a permissible range narrower than one half of said permissible range when at least one of said three difference values is outside said permissible range; and
  means for calculating a mean value from two values selected from said first, second and third distance values when one of said three difference values falls within said narrower permissible range, the difference value which falls within said narrower permissible range resulting from the selected two distance values.

59. A micro-dimensional measurement apparatus for optically measuring a dimension between opposed edges formed on a surface of a substrate, the zone between said opposed edges and the surface of said substrate having a uniform reflectivity, the reflectivity of the zone between said opposed edges being different from that of said substrate surface, the reflectivity of the zone between said opposed edges being known, said apparatus comprising:
  an optical scanning system for scanning the substrate with a twin light beam so that said beam crosses a distance between the opposed edges of said substrate, said twin light beam being defined as a beam composed of two parallel light beams having substantially the same spot diameter and substantially the same light intensity distribution having a maximum peak intensity at a center of the spot thereof, so that a light intensity distribution of said twin light beam is composed of both light intensity distributions of said two parallel light beams;
  means for detecting light intensity information of the twin light beam reflected from the substrate during the scanning operation;
  means for fetching the light intensity information detected by said detection means and for storing the fetched light intensity information to form a reflected light intensity data pattern;
  means for calculating at least one of a minimum peak value, a maximum peak value and an integral value from said reflected light intensity data pattern;
  means for storing at least one reference data which corresponds to one of said minimum peak value, said maximum peak value and said integral value said reference data being obtained from a series of reflected light intensity sample pattern which are prepared with respect to predetermined sample dimensions; and
  means for calculating a distance values as a dimension to be measured between said opposed edges from said reference data on the basis of the corresponding one of said minimum peak value, said maximum peak value and said integrated value calculated from said reflected light intensity data pattern.

60. A micro-dimensional measurement apparatus as set forth in claim 59, further comprising means for smoothing said reflected light intensity data pattern before one of said minimum peak value, said maximum peak value and said integrated value are calculated therefrom.

61. A micro-dimensional measurement apparatus as set forth in claim 59, wherein an interpolation method is introduced when said distance value is calculated from said reference data on the basis of the corresponding one of said minimum peak value, said maximum peak value and said integrated value calculated from said reflected light intensity data pattern.

62. A micro-dimensional measurement apparatus as set forth in claim 59, wherein said optical scanning system comprises a light source for emitting a single light beam, an acoustic optical element through which the single light beam is passed, and an acoustic optical element driver for driving said acoustic optical element to generate the twin light beam from said single light beam and to deflect said twin light beam to scan the substrate therewith.

63. A micro-dimensional measurement apparatus as set forth in claim 62, wherein said single light beam comprises a laser beam having a Gaussian distribution as a light intensity distribution so that said twin light beam has a light intensity distribution composed of the two Gaussian distributions.

64. A micro-dimensional measurement apparatus as set forth in claim 59, wherein said acoustic-optical element driver is arranged so that a peak pitch of said two parallel light beam is adjustable.

65. A micro-dimensional measurement apparatus for optically measuring a dimension between opposed edges formed on a surface of a substrate, the zone between said opposed edges and the surface of said substrate having a uniform reflectivity, the reflectivity of the zone between said opposed edges being different from that of said substrate surface, the reflectivity of the zone between said opposed edges being unknown, said apparatus comprising: an optical scanning system for scanning the substrate with a twin light beam so that said beam crosses a distance between the opposed edges of said substrate, said twin light beam being defined as a beam composed of two parallel light beams having substantially the same spot diameter and substantially the same light intensity distribution having a maximum peak intensity at a center of the spot thereof, so that a light intensity distribution of said twin light beam is composed of both light intensity distributions of said two parallel light beams;
  means for detecting light intensity information of the twin light beam reflected from the substrate during the scanning operation;
  means for fetching the light intensity information detected by said detection means and for storing the fetched light intensity information to form a reflected light intensity data pattern;
  means for calculating at least two of a minimum peak value, a maximum peak value and an integrated value from said reflected light intensity data patterns;
  means for storing two kinds reference data which corresponds to the two values selected from said minimum peak value, said maximum peak value and said integrated value, respectively, said two kinds of reference data being obtained from a series of reflected light intensity sample patterns prepared with respect to predetermined sample dimensions are selected for each of predetermined sample reflectivities; and
  means for calculating a distance values as a dimension to be measured between said opposed edges from said two kinds of reference data, respectively, on the basis of the selected two values calculated from said reflected light intensity data patterns.

66. A micro-dimensional measurement apparatus as set forth in claim 65, further comprising means for smoothing said reflected light intensity data pattern before the two values selected from said minimum peak value, said maximum peak value and said integrated value are calculated therefrom.

67. A micro-dimensional measurement apparatus as set forth in claim 65, wherein an interpolation method is introduced when said distance value is calculated from said two kinds of reference data on the basis of the two values selected from said minimum peak value, said maximum peak value and said integrated value calculated from said reflected light intensity data pattern.

68. A micro-dimensional measurement apparatus as set forth in claim 65, wherein said optical scanning system comprises a light source for emitting a single light beam, an acoustic optical element through which the single light beam is passed, and an acoustic optical element driver for driving said acoustic optical element to generate said twin light beam from the single light beam and to deflect said twin light beam to scan the substrate therewith.

69. A micro-dimensional measurement apparatus as set forth in claim 68, wherein said single light beam comprises a laser beam having a Gaussian distribution as a light intensity distribution so that said twin light beam has a light intensity distribution composed of two Gaussian distributions.

70. A micro-dimensional measurement apparatus as set forth in claim 68, wherein said acoustic-optical element driver is arranged so that a peak pitch of said two parallel light beam is adjustable.

* * * * *

UNITED STATES PATENT AND TRADEMARK OFFICE
CERTIFICATE OF CORRECTION

PATENT NO. : 4,994,990

DATED : February 19, 1991

INVENTOR(S) : HIROO FUJITA ET AL.

It is certified that error appears in the above-identified patent and that said Letters Patent is hereby corrected as shown below:

Claim 6, column 44, line 3, "form" should be --from--.

Claim 22, column 48, line 65, "value" should be --values--;

column 49, line 1, "form" should be --from--.

Claim 25, column 49, line 58, semi-colon (";") after "generate" should be deleted.

Claim 43, column 55, line 24, "peakvalue" should be --peak-value--.

Claim 47, column 56, lines 16-17, "gaussian" should be --Gaussian--.

UNITED STATES PATENT AND TRADEMARK OFFICE
CERTIFICATE OF CORRECTION

PATENT NO. : 4,994,990

DATED : February 19, 1991

INVENTOR(S) : HIROO FUJITA ET AL.

It is certified that error appears in the above-identified patent and that said Letters Patent is hereby corrected as shown below:

Claim 53, column 58, line 4, period (".") should be a semicolon (--;--);

line 41, "falls" should be --fall--.

Claim 55, column 58, line 52, "distancevalue" should be --distance-value--.

Claim 65, column 60, line 53 "corresponds" should be --correspond--.

Signed and Sealed this

Twenty-ninth Day of December, 1992

Attest:

DOUGLAS B. COMER

*Attesting Officer*   *Acting Commissioner of Patents and Trademarks*